United States Patent [19]
Suzuki et al.

[11] Patent Number: 5,809,306
[45] Date of Patent: Sep. 15, 1998

[54] VARIABLE ADDRESS LENGTH COMPILER AND PROCESSOR IMPROVED IN ADDRESS MANAGEMENT

[75] Inventors: Masato Suzuki, Toyonaka; Hiroshi Kamiyama, Moniguchi; Shinya Miyaji, Nara, all of Japan

[73] Assignee: Matsushita Electric Industrial Co., Ltd., Osaka-fu, Japan

[21] Appl. No.: 587,338

[22] Filed: Jan. 16, 1996

Related U.S. Application Data

[63] Continuation of Ser. No. 249,157, May 26, 1994, abandoned.

[30] Foreign Application Priority Data

| May 27, 1993 | [JP] | Japan | 5-126212 |
| May 31, 1993 | [JP] | Japan | 5-129529 |
| Oct. 1, 1993 | [JP] | Japan | 5-247154 |

[51] Int. Cl.⁶ ............................ G06F 9/45
[52] U.S. Cl. ............................ 395/705
[58] Field of Search ............................ 395/705

[56] References Cited

U.S. PATENT DOCUMENTS

| 4,314,332 | 2/1982 | Shiraogawa et al. | 395/411 |
| 4,361,868 | 11/1982 | Kaplinsky | 395/402 |
| 4,447,879 | 5/1984 | Fong | 395/412 |
| 4,453,212 | 6/1984 | Gaither et al. | 395/402 |
| 4,602,330 | 7/1986 | Ikeya | 395/421.02 |
| 4,679,140 | 7/1987 | Gotou et al. | 395/570 |
| 4,739,471 | 4/1988 | Baum et al. | 395/566 |
| 4,763,255 | 8/1988 | Hopkins et al. | 395/709 |
| 5,307,492 | 4/1994 | Benson | 395/707 |
| 5,420,992 | 5/1995 | Killian et al. | 395/800 |

FOREIGN PATENT DOCUMENTS

| 0148478 | 12/1984 | European Pat. Off. . |
| 0180077 | 10/1985 | European Pat. Off. . |
| 0503514 | 3/1992 | European Pat. Off. . |
| 62-259140 | 11/1987 | Japan . |
| 3248240 | 11/1991 | Japan . |
| WO9215943 | 9/1992 | WIPO . |

OTHER PUBLICATIONS

Hennessy et al., Computer Architecture . . . , 1990 pp. 90–113 and 139–161.
Sebesta, Concepts of Programming Languages, 1989 pp. 16–23, 72–79 and 106–115, 121–122.
Harman et al., The Motorola MC.68000 . . . , 1985 pp. 30–31, 52–53, 84–89, 134–137, 142–159, 174–177 & 200–203.
"Address Size Independence in a 16–Bit Minicomputer", by Philip E. Stanley, the 5th Annual Symposium on Computer Architecture, Apr. 1978.
"High–Performance Simgle–Chip Microcontroller H8/300 Series", by Nobuo Shibasaki et al., Hitachi Review, vol. 40 (1991), No. 1.

*Primary Examiner*—Parshotam S. Lall
*Assistant Examiner*—Kenneth R. Coulter
*Attorney, Agent, or Firm*—Price, Gess & Ubell

[57] ABSTRACT

The present invention discloses a program converting unit for generating a machine language instruction from a source program for a processor that manages an N-bit address while processing M-bit data, N being greater than M, and such a processor that runs the converted program. The program converting unit comprising: a parameter holding unit for holding a data width and a pointer width designated by a user; the data width representing the number of bits of data used in the source program while the pointer width representing the number of bits of an address; and a generating unit for generating an instruction to manage the data width when a variable operated by the instruction represents the data, and for generating an instruction to manage the pointer width when a variable operated by the instruction represents the address.

61 Claims, 26 Drawing Sheets

| OP MOVE | SIZE 32bit | SRC A1 | DEST @A2 |
|---|---|---|---|

FIG. 5    PRIOR ART

```
         SUB   D0,D0                ─────(1)
         MOVI  #H8000,A0            ─────(2)──→MOVI  #H00008000,A0 (2')
LABEL A  MOV
         ADD   @A0,D1               ─────(3)
         ADDI  #H0010,D0            ─────(4)
         CMPI  #H0010,A0            ─────(5)──→ADDI  #H00000010,A0 (5')
         BLT   #H8100,A0            ─────(6)──→CMPI  #H00008100,A0 (6')
               LABEL A              ─────(7)
LABEL B  MOV   D0,@H10000000        ─────(8)
```

FIG. 8  PRIOR ART

```
            SUB   D0,D0              ——(1)
            MOVI  #H8000,A0          ——(2-1)
            ANDI  #H0000FFFF,A0      ——(2-2)
LABEL A
            MOV   @A0,D1             ——(3)
            ADD   D1,D0              ——(4)
            ADDI  #H0010,A0          ——(5)
            MOVI  #H8100,A0          ——(6-1)
            ANDI  #H0000FFFF,A1      ——(6-2)
            CMP   A1,A0              ——(6-3)
            BLT   LABEL A            ——(7)
LABEL B
            MOV   D0,@H10000000      ——(8)
```

ADD/SUBTRACT/COMPARE INSTRUCTIONS

CONDITIONAL BRANCH INSTRUCTION

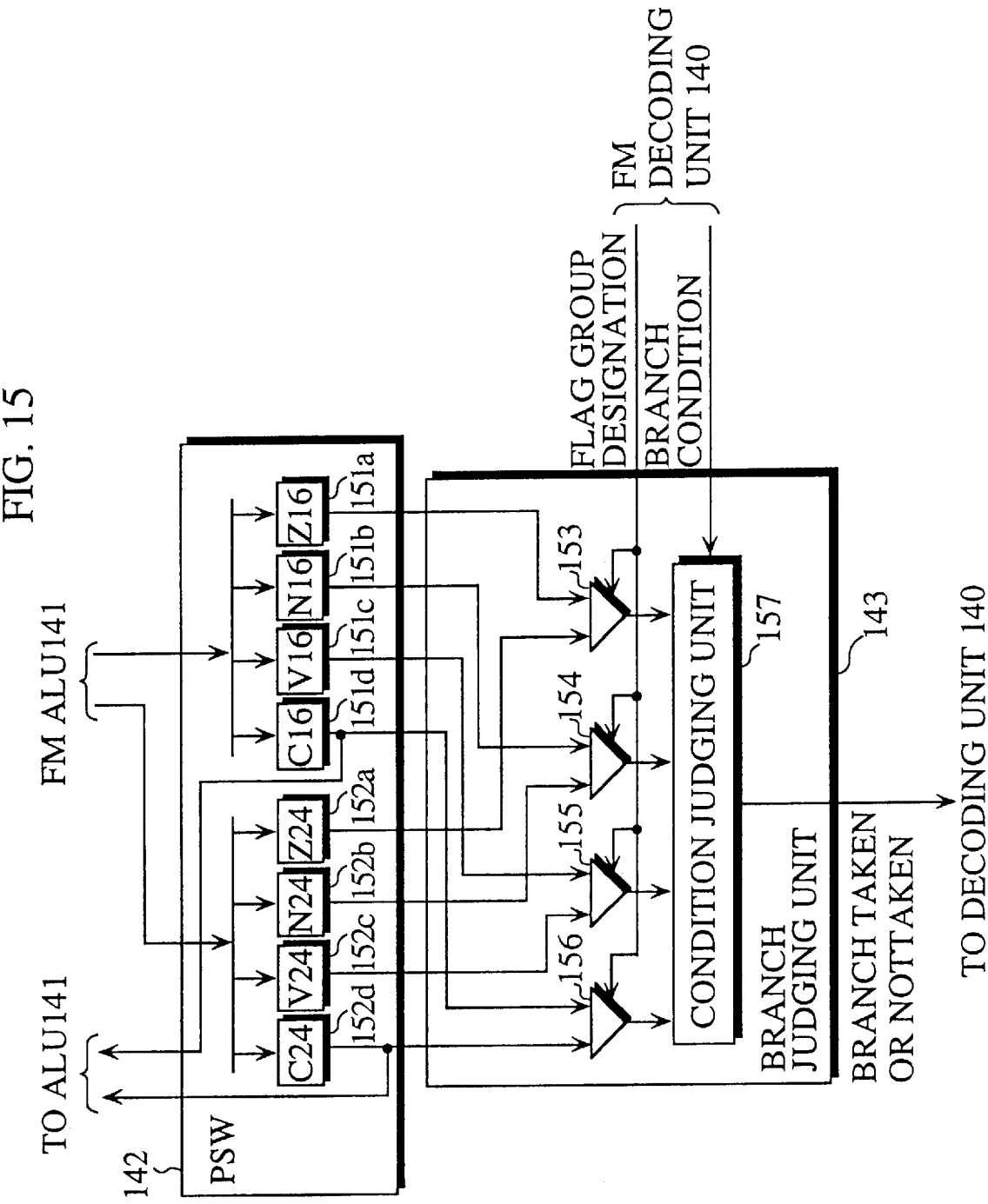

CONDITIONAL BRANCH INSTRUCTION

ADD/SUBTRACT/COMPARE INSTRUCTIONS

FIG. 18A

| OP   | SRC | DEST |
|------|-----|------|
| MOVE | D1  | @A2  |

FIG. 18B

| OP   | SRC | DEST |
|------|-----|------|
| MOVE | A1  | @A2  |

FIG. 20A

SYMBOL TABLE

| SYMBOL | VARIABLE TYPE | | No.of BYTE | HEAD ADDRESS | REGISTER |
|---|---|---|---|---|---|
| | SIGN | TYPE | | | |
| *a | UN-SIGNED | POINTER | 3 | 1000 | |
| b | UN-SIGNED | INTEGER | 2 | 1004 | |
| c | UN-SIGNED | INTEGER | 2 | 1006 | |
| t1 | UN-SIGNED | INTEGER | 2 | | |
| t2 | UN-SIGNED | INTEGER | 2 | | |
| t3 | UN-SIGNED | INTEGER | 2 | | |

FIG. 20B

SYMBOL TABLE

| SYMBOL | VARIABLE TYPE | | No.of BYTE | HEAD ADDRESS | REGISTER |
|---|---|---|---|---|---|
| | SIGN | TYPE | | | |
| a | SIGNED | CHARACTER | 1 | 1000 | |
| b | UN-SIGNED | CHARACTER | 1 | 1001 | |
| c | SIGNED | INTEGER | 2 | 1002 | |
| d | UN-SIGNED | INTEGER | 2 | 1004 | |

FIG. 27

```
            SUB    D0,D0              ——(1)
            MOVI   #H8000,A0          ——(2)
LABEL A
            MOV    @A0,D1             ——(3)
            ADD    D1,D0              ——(4)
            ADDI   #H0010,A0          ——(5)
            CMPI   #H8100,A0          ——(6)
            BLT    LABEL A            ——(7)
LABEL B
            MOV    D0,@H10000000      ——(8)
```

VARIABLE ADDRESS LENGTH COMPILER AND PROCESSOR IMPROVED IN ADDRESS MANAGEMENT This is a continuation of application Ser. No. 08/249,157, filed on May 26, 1994, now abandoned.

BACKGROUND OF THE INVENTION

(1) Field of the Invention

The present invention relates to a program converting unit for converting a high level language program into a machine language program and a processor for running the converted program, and more particularly, to such a processor improved in address management with various types of register groups including address and data registers.

(2) Description of the Related Art

With the recent advancement in the field of electronic technology, data processors such as a microprocessor and a microcomputer have been used widely. Today's typical data processor can process data of various widths, and a data processor furnished with a 16-bit or 32-bit CPU has been developed to meet the needs for more efficient data processing and advanced functions. Such a processor may be additionally furnished with various types of register groups including an address register and a data register to further upgrade the performance. Also, there is a need for a processor with a more efficient address management function as the data and programs have increased in size in response to the sophistication and enlargement of applications. In the following, five conventional processors will be explained while considering both of their improvements and shortfalls in address management.

FIRST CONVENTIONAL PROCESSOR

Firstly, a 16-bit segment-address processor will be explained. This type of processor is described in, for example, "Hardware for Microprocessor", Iwao Morishita, Iwanami-shoten, Nov. 9, 1984. The processor includes a segment register which stores a high order address including bits beyond 16 bits to secure an address space over 64 ($2^{16}$) Kbyte while processing 16-bit data. More precisely, the address space over 64 Kbyte is divided into a set of 64 Kbyte segments to be serially numbered, and the addresses are managed by the segment numbers thus stored in the segment register and an offset, i.e., a distance from the head of each 16-bit segment.

Also, a 32-bit segment-address processor is disclosed in the aforementioned "Hardware for Microprocessor". This processor can secure an address space of 4 Gbyte ($2^{32}$) by managing 32-bit addresses while processing 32-bit data.

These segment-address processors run a machine language program translated by a program converting unit such as a compiler.

An address management of a compiler for a 16-bit processor includes two models: one is a large model and the other is a near-far model.

A large model compiler always sets a pointer variable with a segment number and a 16-bit offset in pairs. Thus, the 16-bit processor that runs an object code from the compiler calculates the content of the segment register to update the same each time an address is calculated. Consequently, the performance efficiency is significantly degraded compared with a 16-bit non-segment-address processor.

A near-far model compiler eliminates this problem by designating one of two pointer variables: a near pointer variable and a far pointer variable; the former is used to access an address within one segment and the latter is used to access an address across a segment boundary. The compiler sets the 16-bit offset alone with the near pointer variable while setting a pair of the segment number and 16-bit offset with the far pointer variable. When the 16-bit near-far model compiler uses the near pointer variable, the performance efficiency is enhanced compared with the 16-bit large model compiler. However, on the other hand, programming efficiency is degraded because it is a programmer that selects one of the two pointer variables by checking the segment boundary.

A compiler for a 32-bit processor is advantageous in that it is free of the aforementioned problems. Because this compiler sets a 32-bit address to the pointer variable for a 32-bit data variable, and thus the programmer does not have to check the segment boundary. Naturally, the 32-bit processor runs the compiled program without degrading performance while securing the address space of 4 Gbyte.

However, most of the applications for an embedded-type microcomputer demand neither the 32-bit data nor address space of 4 Gbyte, but demand the 16-bit data and address space over 64 Kbyte. Thus, if the 32-bit processor and compiler are employed, the hardware is not fully utilized, wasting the cost and running electricity. In addition, the 32-bit processor always designates a 32-bit address in a program, and thus increases a program code size undesirably. Also, the performance is degraded when a 16-bit data bus is used to connect the 32-bit processor to a memory compared with a 32-bit data bus.

Therefore, neither 16-bit and 32-bit segment-address processors nor their corresponding compilers developed to date have met the practical needs.

SECOND CONVENTIONAL PROCESSOR

A second conventional processor includes various types of register groups including address registers and data registers, which is described, for example, in "M68000 8/16/32MICROPROCESSOR USER MANUAL", Motorola Inc.

A structure of the second conventional processor is depicted in FIG. 1. The processor comprises a register unit 11 including a plurality of 32-bit address registers and 32-bit data registers, an instruction decoding unit 12 for decoding an instruction, an external storage unit 13, and an external-access executing unit 14 for inputting and outputting data of a designated bit-width with the external storage memory unit 13. The instruction decoding unit 12 sends register information 15 and bit-width information 16 to the external-access executing unit 14; register information 15 and bit-width information 16 indicate a register subject to data transfer and a bit-width of transmission data, respectively. Assume that a 16-Mbyte address space and 16-bit data are used in an application herein.

A format of an instruction to transfer the data from one of the registers in the register unit 11 to the external storage unit 13 is shown in FIG. 2: OP is an operation field designating a kind of instruction; SIZE is a size field designating the bit-width of the transmission data; SRC is a source field identifying a source register; and DEST is a destination field specifying a destination address in the external storage unit 13.

The second conventional processor executes the above data-transfer instruction in the following way.

To begin with, the instruction decoding unit 12 decodes the data-transfer instruction as: OP designates MOVE; SIZE designates 32-bit data; SRC identifies a register A1; and DEST identifies an address stored in a register A2. Accordingly, the decoding unit 12 outputs the register information 15 and bit-width information 16 to the access executing unit 14, which, in response, writes the content in the register A1 into the external storage unit 13 at the address @A2 in the designated 32-bit width.

However, the second conventional processor demands the size field in each data-transfer instruction, which further demands a size-field decoding function and enlarges an instruction code, or increases the code size.

In addition, since the size field designates one of 32-, 16-, and 8-bit data, 32-bit data are always transferred to the address register when the address for the application is 24-bit or less wide. When 16-bit data are transferred, the execution speed will not be decreased if the compiler designates a 16-bit width by the size filed. Some compilers, however, may not judge the effective 16-bit width when the program uses 16-bit data. In this case, the compiler designates a 32-bit width where 16-bit width should have been designated instead. Thus, if the data are transferred to an 8-bit-width memory, the data are transferred four times per 8 bits and the last two 8-bit data transfer are redundant.

THIRD CONVENTIONAL PROCESSOR

A third conventional processor can process data of a plurality of data widths. For example, immediate data, which directly specifies a value in a program instruction, are processed after the immediate data are sign-extended. This type of processor is described, for example, "Microcomputer Series 14 68000 Microcomputer", Yuzo Kida, Maruzen, March, 1983.

A structure of the third conventional processor is depicted in FIG. 3. The processor comprises a group of data registers 31 for storing 32-bit data, a group of address registers 32 for storing 32-bit addresses, a sign-extender 33 for sign-extending the MSB of 16-bit data to output 32-bit data, an instruction decoding unit 34 for decoding an instruction, and a calculator 35 for operating a calculation in accordance with the decoding result.

The above-constructed processor operates in the following way. To begin with, the instruction decoding unit 34 decodes an input instruction from an external unit, and the other components operate differently in two cases according to the decoded instruction.

(1) In case of an instruction to transfer the data between one of the data registers 31 and one of the address registers 32, or to execute an arithmetic operation using the data therein, the calculator 35 receives 32-bit data from both the registers and operates a calculation using the same to store the result of the operation into a designated register.

(2) In case of an instruction to transfer 16-bit immediate data to one of the data registers 31 or address registers 32, or to execute an arithmetic operation using the same, the immediate data are extended to 32-bit data by the sign-extender 33 to be outputted to the calculator 35; the calculator 35 operates a calculation using the sign-extended data and stores the result of the operation into a designated register.

The operation of the sign-extender 33 will be described more in detail by referring to FIGS. 4A, 4B. When the MSB of 16-bit data exhibits "O" as shown in FIG. 4A, the 16-bit data are extended to 32-bit data by filling the zero's in the 32nd bit. On other hand, when the MSB exhibits "1" as shown in FIG. 4B, the 16-bit data are extended to 32-bit data by filling one's in the 32nd bit.

Assume that the immediate data are shorter than the register designated for calculation and data-storage. The operation of the third conventional processor when executing a program with such immediate data will be explained with referring to FIGS. 5, 6, and 7; FIG. 5 shows an example of a program, FIG. 6 details the flow of the operation for running that program, and FIG. 7 shows an address space.

As understood from FIG. 6, the program in FIG. 5 reads: add up the data at sixteen addresses from the addresses H8000 to H8100 (H represents hexadecimal and each address is H10 addresses away) and write the result at the address H10000000. However, executing Instructions 2, 5, and 6 does not result as detailed by FIG. 6. Thus, to run the program as detailed by FIG. 6, Instructions 2, 5, and 6 are, in effect, re-written to Instructions 2', 5', and 6', respectively.

For further understanding, the program in FIG. 5 will be explained more in detail.

Instruction 1: Clear a data register D0

Instruction 2: Set 16-bit immediate data H8000 in an address register A0.

Since Instruction 2 uses a notation of the 16-bit immediate data H8000, the immediate data H8000 are sign-extended to 32-bit data HFFFF8000 by the sign-extender 33 to be stored into the address register A0.

Instruction 3: Read out the content stored at an address designated by the address register A0 from the memory to store the same into a data register D1.

Instruction 4: Add the content in the data register D1 to that of the data register D0 to store the result in the data register D0.

Instruction 5: Add immediate data H0010 to the address register A0 to store the result into the address register A0.

The 16-bit immediate data H0010 are extended to 32-bit data HFFFF0010 by the sign-extender 33. Subsequently, the calculator 35 adds the address data HFFFF8000 stored in the address register A0 to the extended data HFFFF0010 to output the data HFFFF8010, which are stored into the address register A0.

Instruction 6: Compare the output data with immediate data H8100.

The immediate data H8100 are also sign-extended to 32-bit data HFFFF8100 by the sign-extender 33 to be outputted to the calculator 35. Accordingly, the calculator 35 compares the same with the address data HFFFF8010 read out from the address register A0.

Instruction 7: Return to Instruction 3 labeled A when the former is greater than the latter; otherwise, proceed to Instruction 8.

The loop of Instructions 3–7 is repeated until the initial value of the address register A0, i.e., HFFFF8000, is incremented up to HFFFF8100 by H00000010. This means that the processor proceeds to Instruction 8 when the result of the sixteen addition operations has been stored into the data register D0.

Instruction 8: Store the content in the data register D0 into the memory at the address H10000000.

With the third conventional processor, the immediate data used for an access to the address register may have a value unexpected by the flowchart shown FIG. 6. This will be explained more in detail. In FIG. 5, the immediate data H8000, H0010, and H8100 are used for the access to the address register by Instructions 2, 5, and 6, respectively. In case of the immediate data H8000, they are sign-extended not to H00008000 but HFFFF8000. This is because the MSB thereof exhibits "1" and the higher order is filled with all one's. Naturally, the immediate data HFFFF8000 is stored into the address register A0, and the data at the address HFFFF8000 are read out by Instruction 3 where the data at the address H00008000 should have been read out instead as shown in FIG. 7. Thus, the data unexpected from FIG. 6, are read out as a result.

Similarly, the immediate data H8100 is extended not to H00008100 but to HFFFF8100 by Instruction 6, causing the processor to output an unexpected value as the operation result.

As has been stated, with the third conventional processor, the sign-extension causes the immediate data to exhibit a value unexpected by a programmer from the flowchart in FIG. 6 while running the program. This occurs only when the immediate data's MSB is addressed with a value "1" in the address space. Therefore, to eliminate this problem, a method using a 32-bit notation for the immediate data designation has been proposed. For example, the immediate data are designated as H00008000 instead of H8000 by Instruction 2. However, this method demands the 32-bit notation even when 16-bit data are designated, and thus extending the instruction size and object code unnecessarily.

Given these circumstances, a method for re-writing the program using the 16-bit immediate data has been proposed to eliminate the above problem, which is shown in FIG. 8.

In the re-written program, original Instruction 2 is carried out by two steps: Instructions 2-1, 2-2. The immediate data H8000 given by Instruction 2-1 are sign-extended to HFFFF8000 first, and then, the extended data HFFFF8000 and H0000FFFF are ANDed to clear the higher 16 bits to zero's by Instruction 2-2, outputting 32-bit data H00008000.

Similarly, original instruction 6 is carried out three steps: Instructions 6-1, 6-2, and 6-3. The immediate data H8100 given by Instruction 6-1 are sign-extended to HFFFF8100 to be stored into the address register A1 first, and then the extended data HFFFF8100 and H0000FFFF are ANDed to clear the higher 16 bits to zero's by Instruction 6-2, outputting 32-bit data H00008100. Finally, the address registers A0 and A1 are compared by Instruction 6-3.

This enables the use of the 16-bit immediate data; however, it increases the number of steps compared with the program in FIG. 5.

Thus, a processor that can access to correct data in the address space efficiently using the immediate data shorter than the address register has not been realized yet.

FOURTH CONVENTIONAL PROCESSOR

A fourth conventional processor is either a CISC (Complex Instruction Set Computer) or a RISC (Reduced Instruction Set Computer) processor. The former, such as TRON or MC68040, can execute a variety of kinds of instructions while the latter, such as SPARC or MIPS, can speed up the operation by limiting the kinds of available instructions. Both the CISC and RISC processors generally employ a plurality of 32-bit register and a 32-bit calculator.

In a 32-bit CISC processor, all the 32-bit registers can handle any of 8-, 16-, and 32-bit data for any arithmetic operation instruction. In response, a compiler for the 32-bit CISC processor generates an operation code in accordance with the data width used at the 32-bit registers. For example, to generate an instruction to store an 8-bit character data variable, or 16-bit short-integer data variable into the 32-bit register, a code such that stores these data variables into the lower 8 and 16 bits in the 32-bit register respectively and to leave the higher 24 and 8 bits intact respectively is generated.

However, the number of the instructions increases considerably in the above way, which demands larger and more sophisticated hardware for the instruction decoding and execution. This problem is eliminated by the RISC processor.

Unlike the CISC processor, the RISC processor limits the kinds of the available instructions and does not generate an instruction such that updates only the lower 8 bits or lower 16 bits of the 32-bit register. Instead, it generates a code to update all the 32 bits in the register, and subsequently generates a code to compensate the higher 24 and 16 bits respectively to adjust the bit widths to adequate ranges set forth below. This is done to compensate an overflow possibly caused by the arithmetic operation for the data variables.

ADEQUATE RANGES

| Type of data variable | Range (decimal) |
| --- | --- |
| singed character | −128 to +127 (inclusive) |
| unsigned character | 0 to +255 (inclusive) |
| signed short integer | −32768 to +32767 (inclusive) |
| unsigned short integer | 0 to +65535 (inclusive) |

With the 32-bit register, these data variables may exceed the above ranges as the result of the operation. For example, when a 32-bit register is assigned for a signed character data variable exhibiting +127, adding a value "2" to that 32-bit register yields +129, causing it to hold an incorrect value for a signed character data variable.

To compensate this, the RISC compiler generates a code with the following compensation instructions and the machine language instructions unconditionally each time the content of the register is updated by the operation:

| Kind of data variable | Compensation Instruction |
| --- | --- |
| singed character | left-shift by 24 bits & arithmetic right-shift by 24 bits |
| unsigned character | left-shift by 24 bits & logical right-shift by 24 bits |
| signed short integer | left-shift by 16 bits & arithmetic right shift by 16 bits |
| unsigned short integer | left-shift by 16 bits & logical right-shift by 16 bits |

Left-shift means a shift in the direction of the MSB; arithmetic right-shift means a shift in the direction of the LSB while coping a value "1" in the MSB of the extended data; and a logical right-shift means a shift in the direction of the LSB while copying value "0'" in all the higher bits beyond the lower 8 bits. Thus, the register 24 that stores +129 (100000001in binary number) is shifted to the left by 24 bits to discard the higher 8 bits including the MSB of 1, and shifted back to the right arithmetically to obtain the 32-bit extended data which exhibit a value "1".

However, the RISC compiler compiles the program using the character or short-integer data variables with a considerable number of the compensation instructions, which increases the code size of the resulting machine language program, and hence prolonging the data processing time.

In addition, there is no advantage using the compensation instructions when a program does not have the overflow, or a programmer avoids the overflow by checking the available range for each data variable.

Further, an integer data variable, besides the character and short-integer data variables, causes the same problem in a system where the bit-width of the register exceeds that of the integer data variable. Since the integer data variables are most frequently used, the problem becomes far more serious. Although the effects can be appreciated when the programmer can not avoid or is not aware of the overflow, the code size increases and the program execution time prolongs considerably because the compensated codes includes the left-shift and arithmetic or logical right shift instructions.

FIFTH CONVENTIONAL PROCESSOR

A fifth conventional processor includes two flag groups for an arithmetic operation with different data operation widths, which is disclosed, for example, Japanese Laid-open Patent Application No. 54-117646, and a structure thereof is depicted in FIG. 9. The processor comprises an instruction decoding unit 91, a 16-bit calculator 92 for calculating 16-bit data, a flag group 93 for a conditional branch judgment, another flag group 94 for calculation, and a branch judging unit 95 for judging whether a conditional branch is taken or not.

The above-constructed processor operates in the following way. To begin with, the instruction decoding unit 91 decodes an instruction. When the decoded instruction is an arithmetic operation instruction, the 16-bit calculator performs an arithmetic operation, and the flag groups 93, 94 are changed in accordance with the operation result.

If the following decoded instruction is also an arithmetic operation instruction, the 16-bit calculator 92 operates by referring to the flag group 94. Whereas if the following decoded instruction is a conditional branch instruction, the branch judging unit 95 refers to the flag group 93 to judge whether the conditional branch is taken or not.

Another example of the processor using two flag groups is disclosed in "16-bit Microprocessor 8086 Family" Shokodo, March, 1982. A structure of the processor is depicted in FIG. 10. The processor comprises an instruction decoding unit 101 for decoding an instruction, a 16-bit calculator 102 for calculating 16-bit data, a flag group 103 changed in accordance with the result of the 8- or 16-bit data operation, a flag selector 104 for selecting an input of the flag group 103 which is changed in accordance with the result of 8- or 16-bit data operation, a flag 105 determined in accordance with the result of 4-bit data operation, and a branch judging unit 106 for judging whether a conditional branch is taken or not by using the flag group 103.

A bit-structure of add, subtract, and compare instructions and that of a branch instruction in the machine language is shown in FIGS. 11A, 11B, respectively. With the add, subtract and compare instructions shown in FIG. 11A, the first byte (operation code) designates a kind of an operation and one bit (denoted as W) therein designates either the 8-bit data operation or 16-bit data operation. The second byte designates registers and an addressing mode for memory operands. The third and fourth bytes designate memory address. With the conditional branch instruction shown in FIG. 11B, four bits within the first byte designates a branch condition.

The above-constructed processor operates in the following way. To begin with, the instruction decoding unit 101 decodes an instruction. If the decoded instruction is an arithmetic operation instruction, the 16-bit calculator calculates using the data. Accordingly, the flags in the flag group 103 and flag 105 are changed in accordance with the operation result. At the same time, the instruction decoding unit 101 designates either the 8-bit or 16-bit data operation to the 16-bit calculator 102, and the selector 104 outputs flag changing data determined by the data operation width to the flag group 103.

If the following decoded instruction is a conditional branch instruction, the branch judging unit 106 refers to the flag group 103 to judge whether the conditional branch is taken or not.

Note that in case that an arithmetic operation is followed by an arithmetic operation with decimal data, the calculator 102 refers to the flag 105.

However, in the first example, the flag group 103 and flag 105 are used for the arithmetic operation instruction and branch instruction respectively, and hence when the operation result is shorter than the data operation width the operation result must be extended in the direction of a high order if the conditional branch is taken.

Following is an explanation for a case where 8-bit data are processed in the 16-bit data operation. As shown in FIG. 12A, if the branch is judged based on an 8-bit unsigned data, the data are extended to H0088, H00F8 by copying zero's in the higher 8 bits. Whereas as shown in FIG. 12B, if the branch is judged based on an 8-bit singed data, the data are extended to HFF88, HFFF8 by copying a value "1" up to the MSB from the eighth bit in the low order. This means that the concerned 8-bit data must be extended up to the higher 8 bits, increasing the overhead and hence is not preferable.

With the second example, although the two flags based on the operation results on different data operation widths (4 bits and 8 or 16 bits) are set contemporaneously, the use of the 4-bit flag is limited to the decimal data operation and it can not be used for a 4-bit data conditional branch. Moreover, one flag is selected from the flag group 103 to eliminate the overhead caused in the first example; however, this demands two kinds of arithmetic operation instructions, which further demands a larger instruction decoding unit.

SUMMARY OF THE INVENTION

Accordingly, a first object of the present invention is to provide a program converting unit which adequately selects an operation code to generate an object program in accordance with a data bit-width and an application program's address space, which does not depend on a data bit-width, so as not to degrade operation efficiency caused by address calculation, and to provide a processor that runs the resulting object program.

A second object of the present invention is to provide a program converting unit that reduces the code size of a machine language program independently of a type of data variable when the application program does not have an arithmetic overflow or the application program is constructed to avoid the arithmetic overflow or the one that generates a compensation instruction corresponding to each type of data variable otherwise, and to provide a processor that runs the resulting compensation instruction.

A third object of the present invention is to provide a processor that reduces the program size by simplifying the operation code to execute a data-transfer instruction at a higher speed.

A fourth object of the present invention is to provide a processor that always extends the immediate data as a programmer expects and that does not need the compensation instruction when its register stores the immediate data whose MSB exhibits a value "1".

A fifth object of the present invention is to provide a computer and a data processing method that minimizes the overhead at the execution of a conditional branch when the bit-width of the operation data and operating unit are different.

The first object can be fulfilled by a program converting unit for generating a machine language instruction from a source program for a processor that manages an N-bit address while processing M-bit data, N being greater than M, the program converting unit comprising: a parameter holding unit for holding a data width and a pointer width designated by a user, the data width representing the number of bits of data used in the source program while the pointer width representing the number of bits of an address; and a generating unit for generating an instruction to manage the data width when a variable operated by the instruction represents the data, and for generating an instruction to manage the pointer width when a variable operated by the instruction represents the address.

The M may be 16 and the N may be an integer in a range of 17 to 31 inclusive.

The generating unit may include: a judging unit for judging a kind of the machine language instruction, the machine language instruction including (1) an instruction to access to a memory, (2) an instruction to use a register, and (3) an instruction to use an immediate; a memory managing unit for outputting a direction, in case of the (1) instruction, to manage the data width as an effective memory-access width when a variable to be accessed represents the data, and to manage the pointer width as an effective memory-access width when the variable represents the address; a register managing unit for outputting a direction, in case of the (2) instruction, to manage s effective bit-width when a variable to be read/written from/into the register represents the data, and to manage the pointer width as the effective bit-width when the variable represents the address; an immediate managing unit for outputting a direction, in case of the (3) instruction, to manage the data width as the effective bit-width when the immediate represents the data, and to manage the pointer width as the effective bit-width when the immediate represents the address; and a code generating unit for generating the machine language instruction in accordance with the directions from the memory managing unit, the register managing unit, and the immediate managing unit.

The N may be 24 and the code generating unit may generate an instruction for a 24-bit data operation when the pointer width is greater than 16 bits and less than 24 bits, and generates an instruction for a 16-bit data operation when the pointer width is 16 bits or less.

The first object can be fulfilled by a program converting unit for generating a machine language instruction based on a source program for a processor that manages an N-bit address while processing M-bit data, N being greater than M, the program converting unit comprising: a syntax analyzing unit for analyzing a syntax of the source program to convert the same into an intermediary language comprising intermediary instructions, and subsequently for judging whether or not each variable contained in the intermediary instructions represents data used in an address; a table generating unit for generating a table for each variable in the intermediary instructions, the table holding a name together with a type of each variable, the type representing one of the data and the address; a parameter holding unit for holding a data width and a pointer width designated by a user, the data width representing the number of bits of the data while the pointer width representing the number of bits of the address; and a generating unit for generating an instruction to manage the data width when the variable in the intermediary instruction represents the data, and an instruction to manage the pointer width when the variable represents the address.

The generating unit may include: a judging unit for judging a kind of the machine language instruction, the machine language instruction including (1) an instruction to access to an memory, (2) an instruction to use a register, and (3) an instruction to use an immediate; a memory managing unit for outputting a direction, in case of the (1) instruction, to manage a corresponding bit-width held in the parameter holding unit as an effective memory-access width depending on the type of a variable to be accessed shown in the table; a register managing unit for outputting a direction, in case of the (2) instruction, to manage a corresponding bit-width held in the parameter holding unit as an effective bit-width depending on the type of a variable to be read/written from/in the register shown in the table; an immediate managing unit for outputting a direction, in case of the (3) instruction, to manage a corresponding bit-width held in the parameter holding unit for the immediate as an effective bit-width depending on the type of the immediate shown in the table; and a code generating unit for generating the machine language instruction in accordance with the directions from the memory managing unit, the register managing unit, and the immediate managing unit.

According to the above construction, any arbitrary data width and pointer width can be set into the parameter setting unit. Thus, a programmer does not have to check an irregularity in the address space such as a segment boundary. Also, an address space larger than the one secured by the program application's data-width can be secured without degrading the operation efficiency caused by address calculation: the size of the address space does not depend on the data operation width.

Also, the above construction can be employed for most of the applications for an embedded-type microprocessor that demand neither the 32-bit data nor address space of 4 Gbyte, but demand the 16-bit data and address space over 64 Kbyte.

The first object also can be fulfilled by a processor improved in address management comprising: a memory unit for storing a program including an N-bit data arithmetic operation instruction and both N-bit and M-bit data load/store instructions, N being greater than M; a program counter for holding an N-bit instruction address to output the same to the memory unit; a fetching unit for fetching an instruction from the memory unit using the instruction address from the program counter; and an executing unit for executing all N-bit arithmetic operation instructions and for executing N-bit and M-bit instructions excluding the arithmetic operation instructions, whereby an N-bit address is calculated by the N-bit arithmetic operation independently of a data bit-width, the data bit-width being M.

The processor may further comprise: an address register group including a plurality of N-bit address registers; a data register group including a plurality of N-bit data registers, wherein the executing unit executes the N-bit and M-bit data operation instructions using the address registers, while executing the M-bit data operation instruction using the data registers.

The N may be 24 and the M may be 16, and the processor may be installed in a 1-chip microcomputer, whereby the 1-chip microcomputer becomes suitable for running a program that utilizes a memory over 64 Kbyte for an operation with 16-bit data.

The processor may further comprise: an address register group including a plurality of N-bit address registers; and a data register group including a plurality of M-bit data registers, wherein the executing unit executes one of an N-bit data operation instruction and an M-bit data operation instruction using the address registers, while executing the M-bit data operation instruction using the data registers.

The N may be 24 and the M may be 16, and the processor may be installed in a 1-chip microcomputer, whereby the 1-chip microcomputer becomes suitable for running a program that utilizes a memory over 64 Kbyte for an operation with 16-bit data.

According to the above construction, the processor can secure the address space that does not depend on the data operation width. The processor can secure a $2^N$-byte address space which is larger than a $2^M$-byte address space, while executing N-bit data operation, upgrading the operation efficiency in address calculation.

The above construction can be effectively employed for most of the applications for an embedded-type microprocessor, such as household appliances and controlling devices, that demand neither the 32-bit data nor address space of 4 Gbyte, but demand the 16-bit data and address space over 64 Kbyte.

The second object can be fulfilled by a program converting unit for generating a machine language instruction from a source program for a processor that manages an N-bit address while processing M-bit data, N being greater than M, the program converting unit comprising: a parameter holding unit for holding a data width and a pointer width designated by a user, the data width representing the number of bits of data used in the source program while the pointer width representing the number of bits of an address; a generating unit for generating an instruction to manage the data width when a variable operated by the instruction represents the data, and for generating an instruction to manage the pointer width when a variable operated by the instruction represents the address; an option directing unit for holding a user's direction for an overflow compensation, an overflow being possibly caused by an arithmetic operation; and a compensate instruction generating unit for generating a compensation instruction to compensate an overflow in accordance with a type of a variable used in the arithmetic operation, the type being judged when the option directing unit holds the user's direction for executing the overflow compensation, the compensation instruction being generated when an effective bit-width of a variable designated by an operand is shorter than a register of N-bit wide and the arithmetic operation instruction will possibly cause an overflow exceeding the effective bit-width.

The compensate instruction generating unit may include: an instruction judging unit for judging an arithmetic operation instruction that will possibly cause an overflow for all the machine language instructions when the option instructing unit holds the user's direction for executing the overflow compensation; a variable judging unit, with respect to a variable in the arithmetic operation instruction judged by the instruction judging unit, for judging an effective bit-width and whether the variable is signed or unsigned by referring to the table; a sign-extension instruction generating unit for generating a compensation instruction in case of a signed variable, a logical value of a sign bit being filled into all bits higher than the effective bit-width in a register that is to store the signed variable by the sign-extension compensation instruction; and a zero-extension instruction generating unit for generating a zero-extension compensation instruction in case of an unsigned variable, a logical value "0" being filled into all bits higher than the effective bit width in a register that is to store the unsigned variable by the zero-extension compensation instruction.

The generating unit may include: a judging unit for judging a kind of the machine language instruction, the machine language instruction including (1) an instruction to access to a memory, (2) an instruction to use a register, and (3) an instruction to use an immediate; a memory managing unit for outputting a direction, in case of the (1) instruction, to manage the data width as an effective memory-access width when a variable to be accessed represents the data, and to manage the pointer width as an effective memory-access width when the variable represents the address; a register managing unit for outputting a direction, in case of the (2) instruction, to manage the data width as an effective bit-width when a variable to be read/written from/into the register represents the data, and to manage the pointer width as the effective bit-width when the variable represents the address; an immediate managing unit for outputting a direction, in case of the (3) instruction, to manage the data width as the effective bit-width when the immediate represents the data, and to manage the pointer width as the effective bit-width when the immediate represents the address; and a code generating unit for generating the machine language instruction in accordance with the directions from the memory managing unit, the register managing unit, and the immediate managing unit.

The M may be 16 and the N may be an integer in a range of 17 to 31 inclusive.

The M may be 32, and the N may be an integer in a range of 33 to 63 inclusive.

According to the above construction, the overflow occurred in the RISC processor can be effectively compensated in addition to the aforementioned effects. Since the execution of an overflow compensation is optional, the compensation instruction is not generated when no compensation is necessary, and the compensation instruction is generated in a less code size when the compensation is necessary.

The processor may further comprise: a compensating unit for extending an effective bit-width of the data in one of the address register and the data register to 24 bits, wherein the compensating unit operates in accordance with the compensate instruction entered immediately after a machine language instruction designating an arithmetic operation that will possibly cause an overflow.

The compensating unit may include: a first extending unit for filling a logical value of a sign bit in all bits higher than the effective bit-width in a register; a second extending unit for filling a logical value "0" in all bits higher than the effective bit-width in a register.

According to the above construction, in addition to the aforementioned effect, the execution speed can be increased when the compiler does not generate the compensation instructions. Also, when a programmer can not avoid the overflow or is not aware of the overflow, the compensating unit compensates the overflow with one machine language instruction of the least-word-length, minimizing the delay in the operation speed.

The third object can be fulfilled by a processor for processing data in accordance with instructions in a program comprising: a register unit including a plurality of register groups, each group being identical in bit-width while being different in types; an instruction decoding unit for decoding an instruction to output register information indicating a register designated by an operand contained in a data-transfer instruction; an external-access-width control unit for outputting the number of effective bits as bit-width information indicating a bit-width of transmission data in accordance with a kind of a register group to which the designated register belongs; and an external-access executing unit for executing data transfer between the designated register and an external memory in accordance with the register information and the bit-width information.

The register unit may include: an address register group including a plurality of address registers holding addresses; and a data register group including a plurality of data registers holding data.

The address registers and data registers in the register unit may be all 24-bit wide; the instruction decoding unit may output information that represents one of the address register and the data register as the register information; the external-access-width control unit may output the bit-width information exhibiting 24 bits when the register information representing the address register, and outputs the bit-width information exhibiting 16 bits when the register information representing the data register; and the external-access executing unit may execute the data transfer three times and twice for the 24- and 16-bit-width information respectively for an 8-bit-width external memory, and for twice and once for the 24- and 16-bit-width information respectively for a 16-bit width external memory.

The access executing unit may include: an address generating circuit for holding an address designated by the data-transfer instruction to output one of a byte address and a word address to the external memory; an output data buffer for holding write data designated by the data-transfer instruction to output the same one of per byte and per word to the external memory; an input data buffer for holding data from read out from the external memory; and a sequence circuit for outputting a byte address to the address generating circuit for an 8-bit-width external memory while controlling the number of times for the data-transfer in accordance with the bit-width information via the input/output data buffers with respect to the read/write data, for outputting a word address to the address generating circuit for a 16-bit-width external memory while controlling the number of times for the data-transfer in accordance with the bit-width information via the input/output data buffers with respect to the read/write data.

According to the above construction, the external-access-width control unit selects a register subject to data transfer and determines the data transfer width simultaneously. Thus, the size field can be eliminated from the instruction, which decreases the code size as well as obviating the size field decoding function.

Further, the data are not transferred redundantly by transferring the data independently of the register's bit-width, speeding up the operation.

The fourth object can be fulfilled by a processor for operating certain data in accordance with an instruction in a program, comprising: a first register unit for holding N-bit data; a second register unit for holding N-bit data, an extending unit for extending the M-bit data to N bits by copying an MSB of the M-bit data in a direction of an upper order, M being less than N; a zero-extending unit for extending the M-bit data to N bits by copying a value "0" in a direction of an upper order; an operating unit for operating an arithmetic operation in accordance with an instruction; an instruction control unit for decoding an instruction to zero-extend M-bit immediate data when the M-bit immediate data are to be stored in the first register unit by the decoded instruction and to sign-extend the M-bit immediate data when the M-bit immediate data are to be stored in the second register unit by the decoded instruction, the zero-extended and sign-extended N-bit immediate data being outputted in one of two methods, one method being to send the extended N-bit immediate data from their respective extending unit to their respective register unit directly, the other being to send the same via the operating unit to their respective register unit.

The first register unit may be a group of a plurality of address registers for storing addresses, and the second register unit may be a group of a plurality of register unit for storing data.

The N may be 24 and the M may be 16.

The fourth object can be also fulfilled by a processor for operating certain data in accordance with an instruction in a program, comprising: a first register unit for holding N-bit data; a second register unit for holding N-bit data, a sign-extending unit for extending the M-bit data to N bits by copying an MSB of the M-bit data in a direction of an upper order, M being less than N; a zero-extending unit for extending the M-bit data to N bits by copying a value "0" in a direction of an upper order; an operating unit for operating an arithmetic operation in accordance with an instruction; an instruction decoding unit for decoding an instruction in the program to detect a first type instruction and a second type instruction, the first type instruction including an instruction to store M-bit immediate data into the first register unit, the second type instruction including an instruction to store the M-bit immediate data into the second register unit; and a control unit for outputting the M-bit immediate data to the zero-extending unit when the first type instruction is detected, and for outputting the M-bit immediate data to the sign-extending unit when the second type instruction is detected, the zero-extended N-bit immediate data and sign-extended N-bit immediate data being outputted in one of two methods, one method being to send the extended N-bit immediate data from their respective extending unit to their respective register unit directly, the other being to send the same via he operating unit to their respective register unit.

The first type instruction may include a data-transfer instruction to store the M-bit immediate data to the first register unit, an add instruction to add a value in the first register and the M-bit immediate data, and a subtract instruction to subtract the M-bit immediate data from a value in the first register, and the second type instruction may include a data-transfer instruction to store the M-bit immediate data to the second register unit, an add instruction to add a value in the second register and the M-bit immediate data, and a subtract instruction to subtract the M-bit immediate data from a value in the second register.

According to the above construction, the immediate data are either sign or zero-extended depending on the kind of the access register prior to the arithmetic operation. Thus, the immediate data can be always extended as the programmer expected. Further, the program size can be decreased as no compensation instruction for the extension is necessary, and the immediate data becomes easy to manage for the programmer.

The fifth object can be fulfilled by a processor for executing a program including an N-bit data arithmetic operation instruction, M-bit and N-bit load/store instruction, M being less than N, a conditional branch instruction, a data-transfer instruction with an external memory, and an instruction having immediate data, the processor comprising: a first register unit including a plurality of registers for holding N-bit data; a second register unit including a plurality of registers for holding N-bit data; a program counter for holding an N-bit instruction address to output the same to the memory unit; a fetching unit for fetching an instruction from an external memory using the instruction address from the program counter; an instruction decoding unit for decoding a fetched instruction; an executing unit for executing all N-bit arithmetic operation instructions and for executing N-bit and M-bit instructions excluding the arithmetic operation instructions, a plurality of flag storing units, each for storing a corresponding flag group changed in response to different bit-widths data in accordance with an execution result of the executing unit; a flag selecting unit for selecting a certain flag group from the plurality of flag storing units in accordance with a conditional branch instruction decoded by the instruction decoding unit; a branch judging unit for judging whether a branching is taken or not with a reference to a flag group selected by the flag selecting unit; a sign-extending unit for extending M-bit data to N bits by copying an MSB of the M-bit data in a higher order; a zero-extending unit for extending M-bit data to N bits by filling a value "0" in a higher order; a compensation instruction control unit for compensating contents of the first register unit and the second register unit using the sign-extending unit and the zero-extending unit in accordance with a compensation instruction inserted immediately after a machine language instruction for an arithmetic operation that will possibly cause an overflow, the machine language instruction being decoded by the instruction decoding unit; an external-access-width control unit for outputting bit-width information for transmission data in accordance with a type of the register unit to which a register indicated by register information belongs, the register information indicating one of the first and second register unit; an external-access executing unit for executing a data transfer between the register and an external memory in accordance with the register information and bit-width information; and an immediate control unit for outputting M-bit immediate data to the zero-extending unit when a decoded instruction includes an instruction to store the M-bit immediate data in the first register unit, and for outputting the M-bit immediate data to the sign-extending unit when a decoded instruction includes an instruction to store the M-bit in the second register unit, the zero-extended and sign-extended immediate data being sent to the first and second register unit respectively in two methods, one being to send the same directly to their respective register unit and the other being to send the same via the executing unit.

The N may be 24 and the M may be 16.

According to the above construction, the flag groups are furnished for different data operation widths, and the branch judgment is done by selecting the flag group corresponding to a certain data width. As a result, in addition to the aforementioned effects, the overhead at the conditional branch can be reduced while reducing the number of the instructions.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 5 is an example of a program run by the processor in FIG. 3;

FIG. 8 is an example of a re-written program run by the third conventional processor;

FIG. 15 is a block diagram depicting structures of a PSW and a branch judging unit in FIG. 14 FIGS. 16A and 16B are views showing structures of instruction formats used in the present invention;

FIGS. 18A and 18B are views showing a format for a data-transfer instruction;

FIGS. 20A and 20B are examples of a symbol table;

FIG. 27 is an example of a program including an immediate data transfer.

DESCRIPTION OF THE PREFERRED EMBODIMENT

Figure 13:
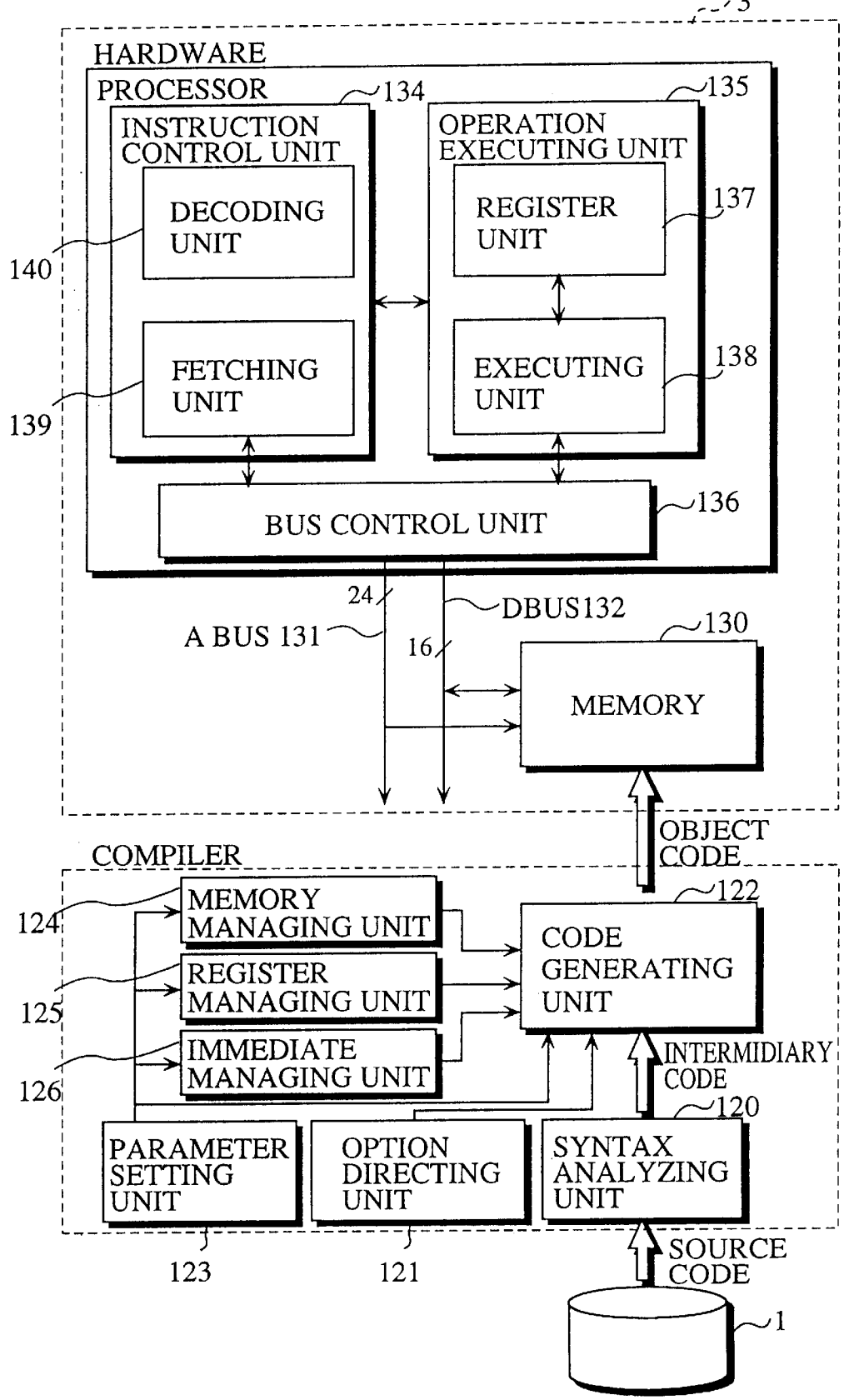
FIG. 13 is a block diagram depicting a processing system of the present invention.

A hardware structure of a data processing system including a computer and a program converting unit (compiler) is depicted in FIG. 13. The data processing system comprises a storage unit 1 for storing a C language program, a compiler 2 for translating the C language program into a machine language program, and a computer 3 for running an object code; the computer 3 includes a processor and a memory.

More precisely, the computer 3 includes a memory 130, an address bus 131, a data bus 132, an instruction control unit 134, an operation executing unit 135, and a bus control unit 136.

The memory 130 stores an object code and data used in a program.

The address bus 131 is of 24-bit wide and sends an address to the memory 130.

The data bus 132 is of 16-bit wide and transfers data to each component within the computer 3.

The instruction control unit 134 includes a fetching unit 139 and a decoding unit 140 to fetch an instruction via the bus control unit 136 and decodes the same: the fetching unit 139 includes an unillustrated 24-bit program counter to designate an instruction address; the decoding unit 140 decodes an instruction to output a corresponding control signal to each component within the computer 3.

The operation executing unit 135 includes a register unit 137 and an executing unit 138 to execute an instruction in accordance with the control signal: the register unit 137 includes a plurality of 24-bit address registers and 24-bit data registers; the executing unit 138 executes a 24- or 16-bit arithmetic logical operation. Note that 24-bit executing unit 138 executes a 24-bit address calculation and 16-bit data operation. This means that the computer 3 executes a 16-bit data operation for the data processing, while executing a 24-bit data operation for the address calculation.

The bus control unit 136 controls the address and data transfer between the components within the computer 3 interconnected via the address bus 131 and data bus 132, and the data transfer with the memory 130 in a bit-width thereof.

Figure 14:
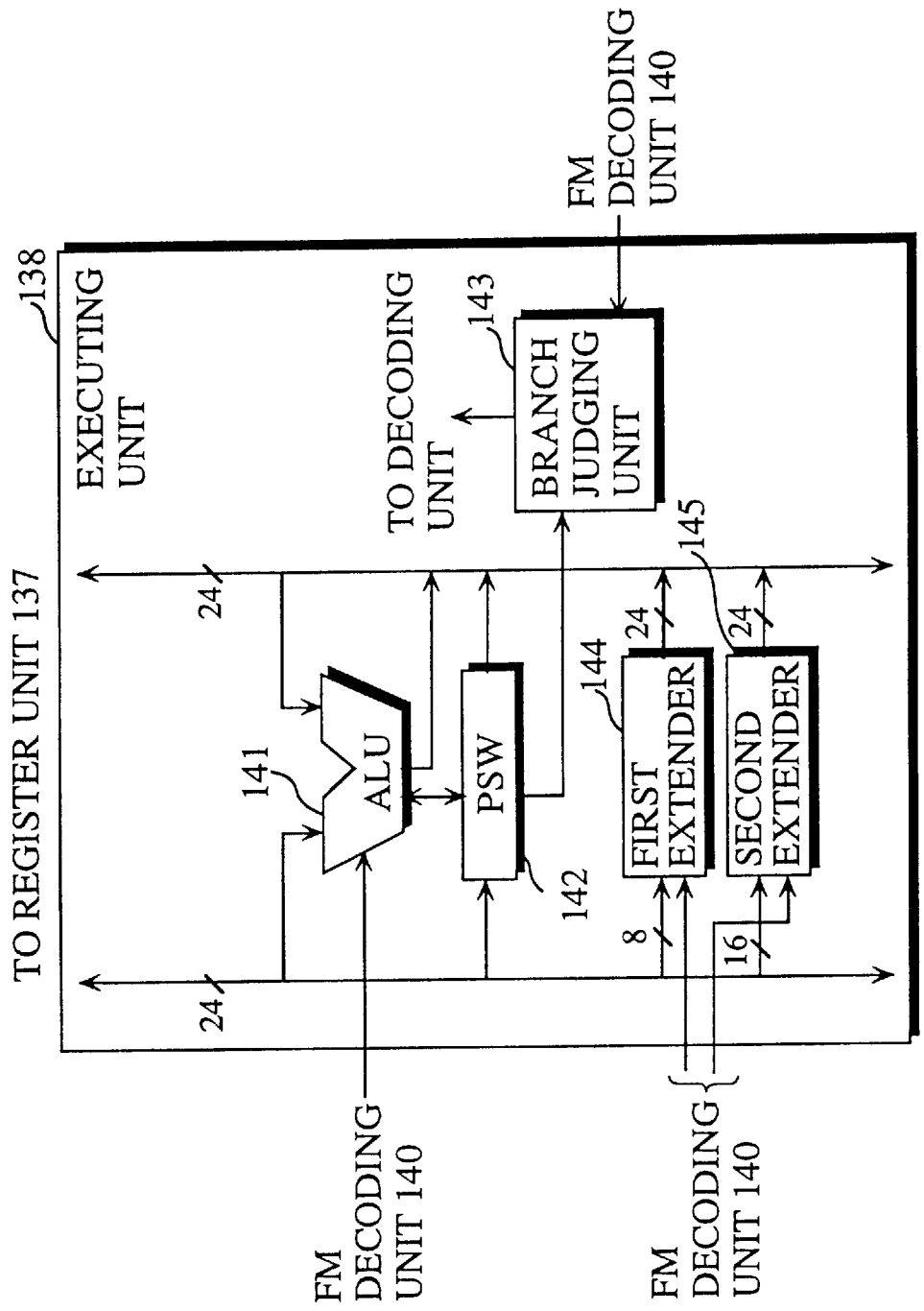
FIG. 14 is a block diagram depicting an executing unit in FIG. 13.

A structure of the executing unit 138 is depicted in FIG. 14, and the executing unit 138 comprises an ALU (Arithmetic Logic Unit) 141, a PSW (Processor Status Word) 142, a branch judging unit 143, a first extender 144, and a second extender 145.

More precisely, the ALU 141 performs a 24-bit arithmetic logical operation using the data stored in the register unit 137.

The PSW 142 is a register holding a variety of flags each indicating the processor's status, and includes flag groups which are changed in accordance with the operation result of the ALU 141. The flag groups include a first flag group exhibiting the result of 16-bit data operation and a second flag group exhibiting the result of 24-bit data operation; note that, however, both the first and second flag groups exhibit each data operation result.

The branch judging unit 143 judges whether a conditional branch instruction is taken or not by referring to the flag groups.

The first extender 144 sign or zero-extends the lower 8 bits of the data in the data register to 24 bits, or it sign or zero-extends an 8-bit immediate data to 24 bits to be sent to the data register.

The second extender 145 sign or zero-extends the lower 16 bits of the data in the data register to 24 bits, or it sign or zero-extends a 16-bit immediate data to 24 bits to be sent to the data register.

Figure 4A:
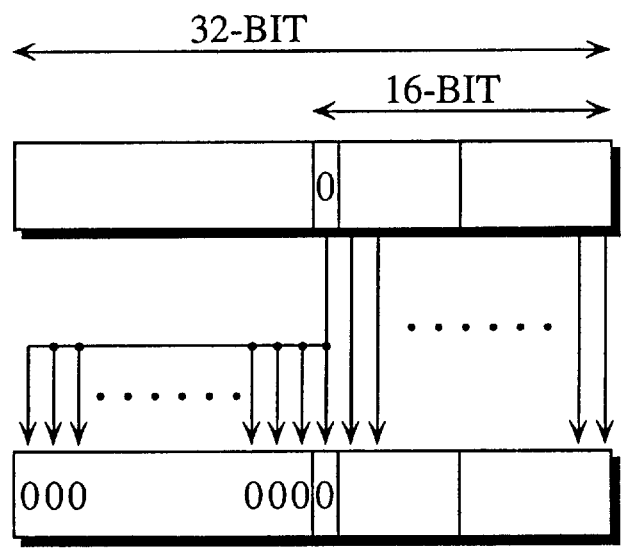
FIGS. 4A and 4B are views explaining the operation of a sign-extender
Figure 4B:
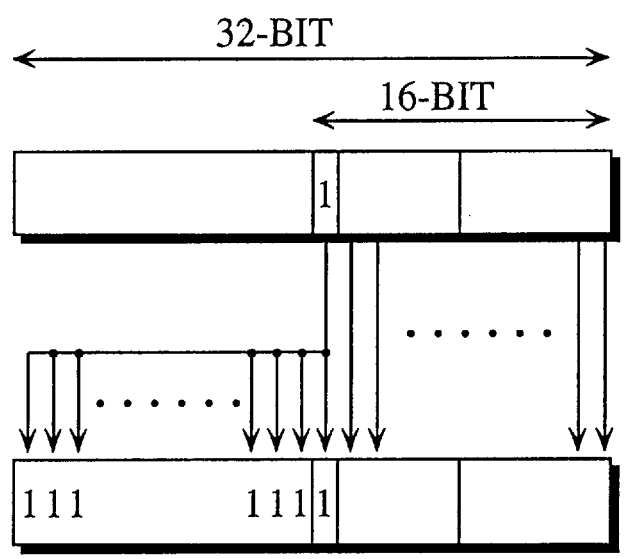
Figure 6:
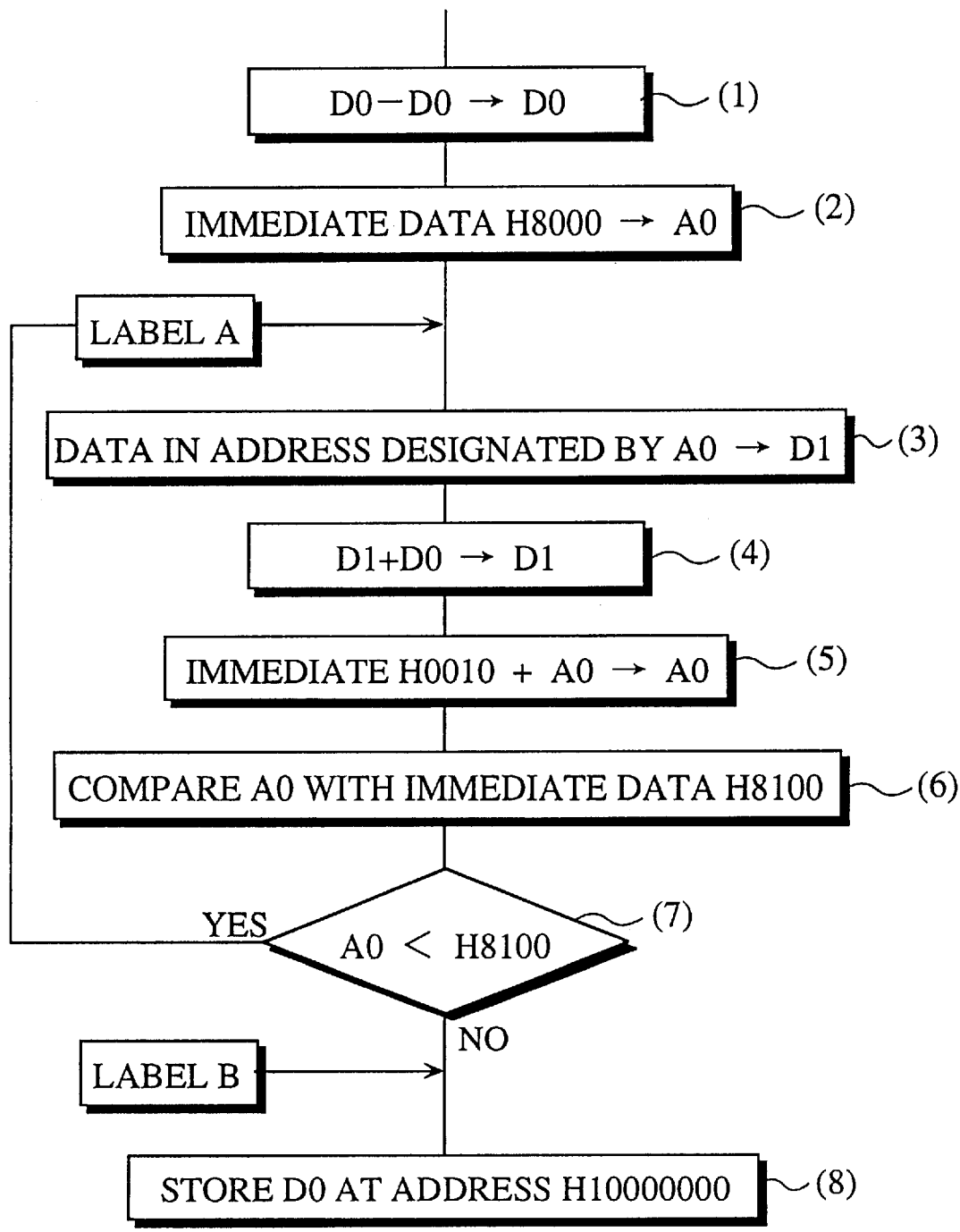
FIG. 6 is a flowchart detailing the operation corresponding to FIG. 5.
Figure 7:
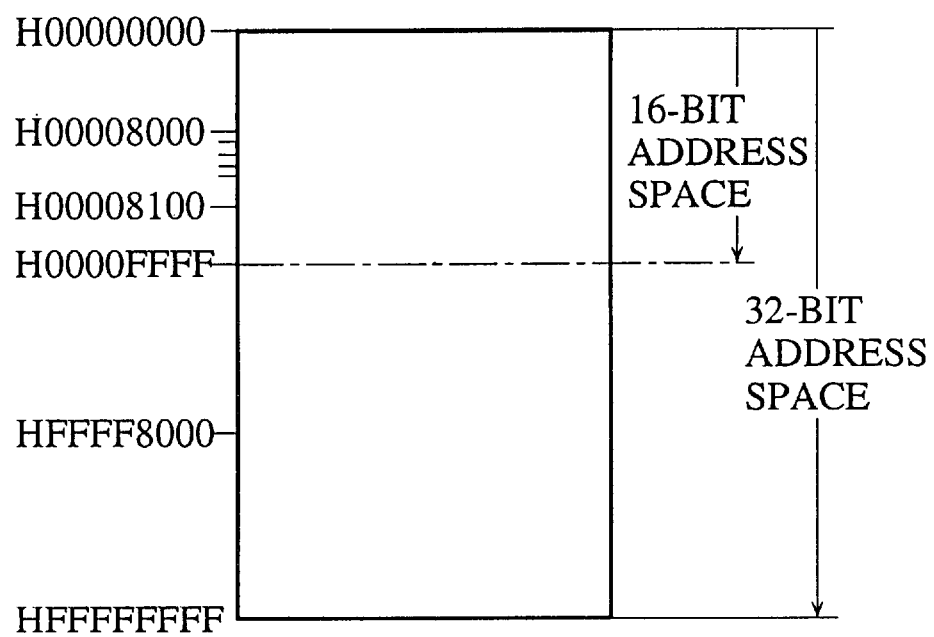
FIG. 7 is a view showing a memory space corresponding to FIG. 5.
Figure 9:
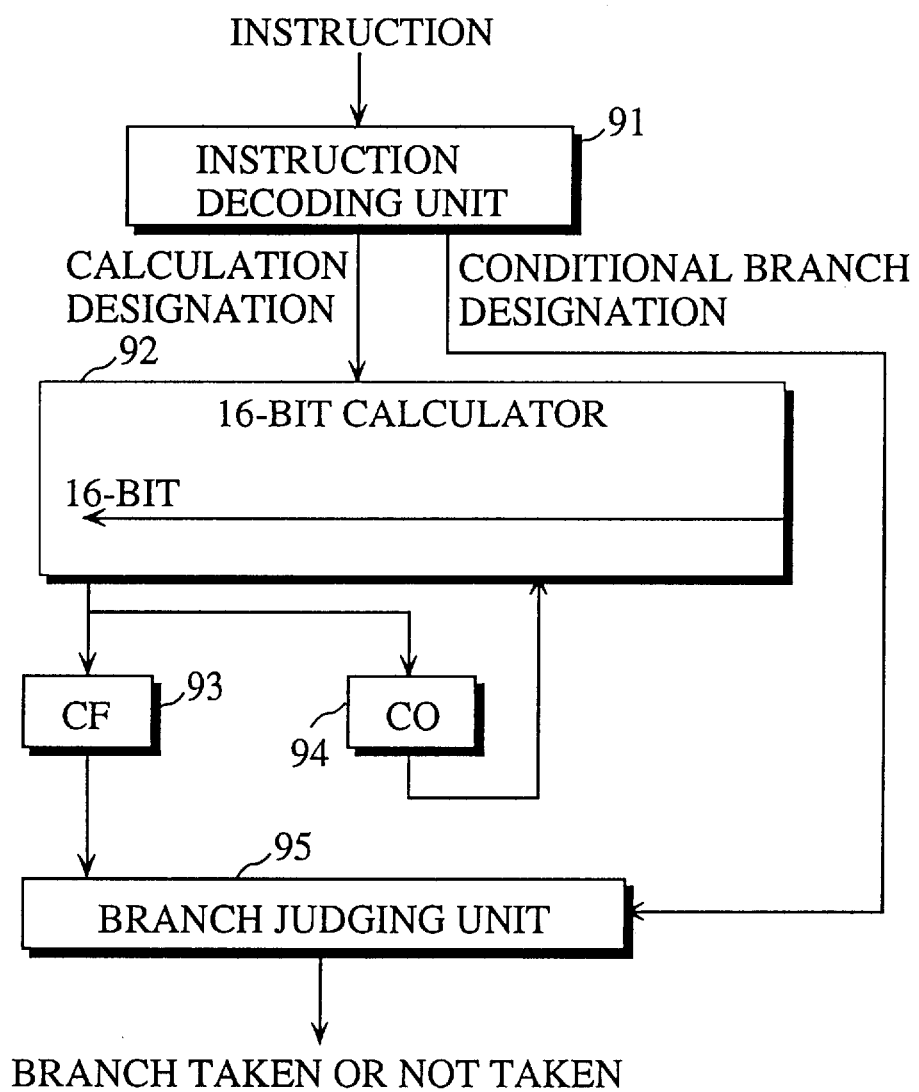
FIG. 9 is a block diagram depicting a structure of the first example of the fifth conventional processor.
Figure 10:
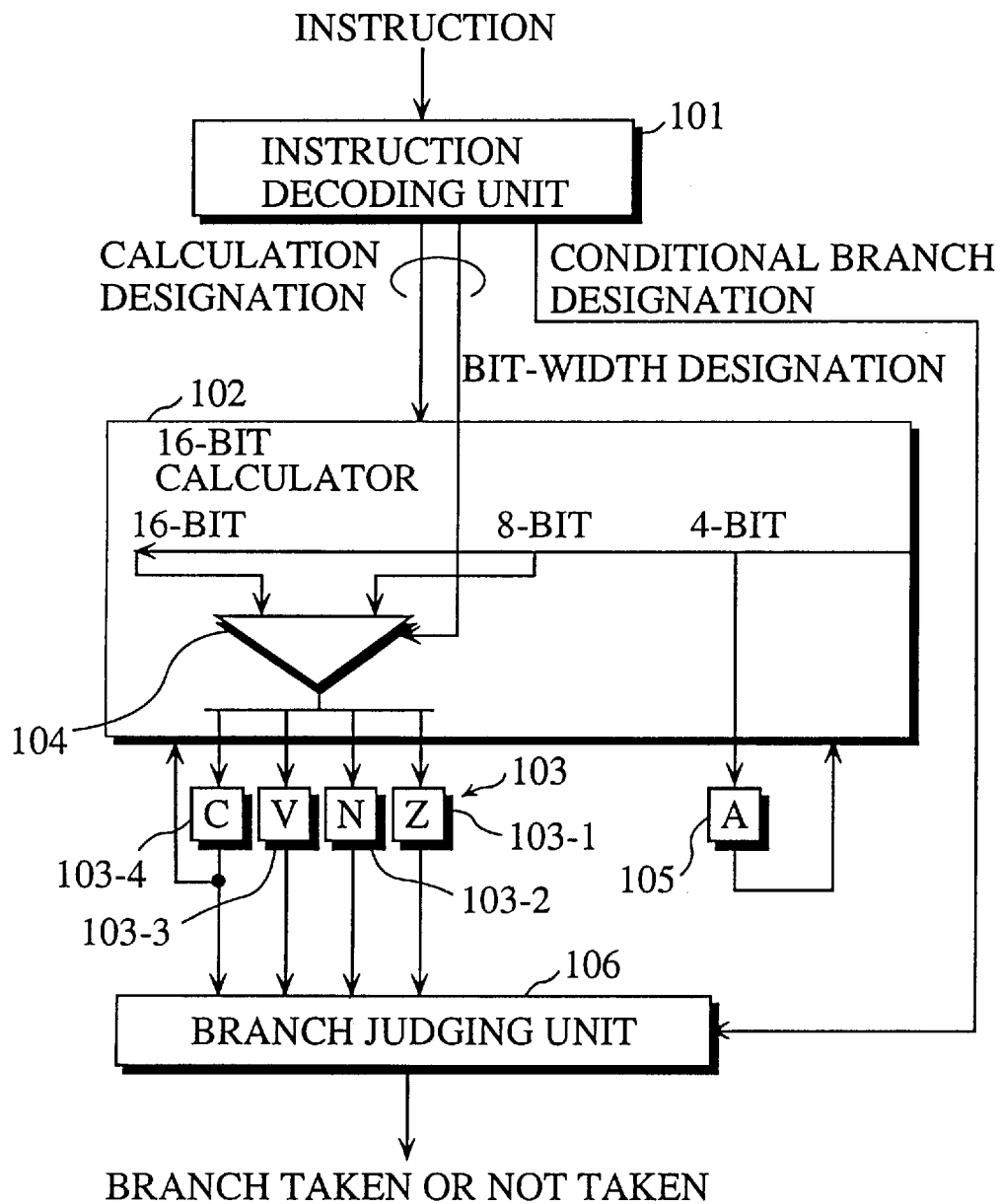
FIG. 10 is a block diagram depicting a structure of the second example of the fifth conventional processor.
Figure 11A:
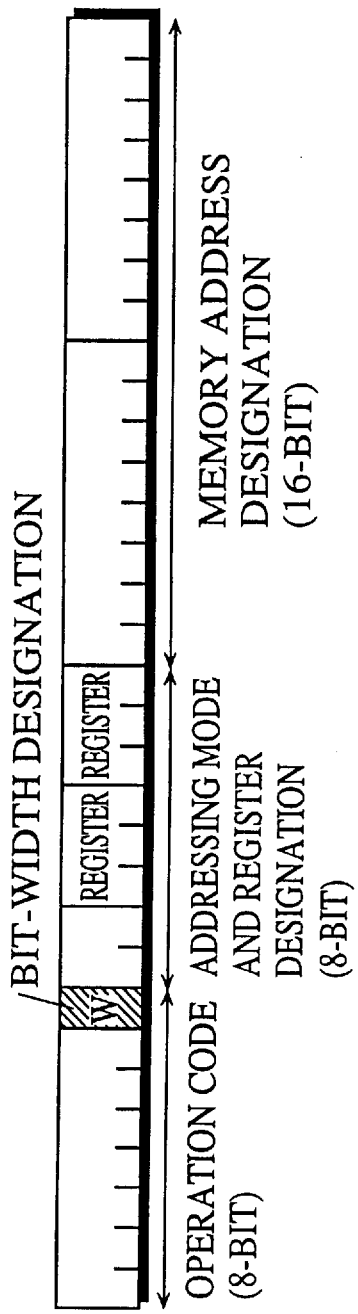
FIGS. 11A and 11B are views explaining the structures of instruction formats used by the processor in FIG. 10.
Figure 11B:
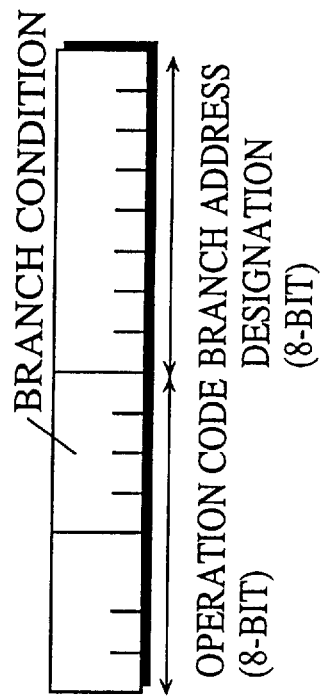
Figure 12A:
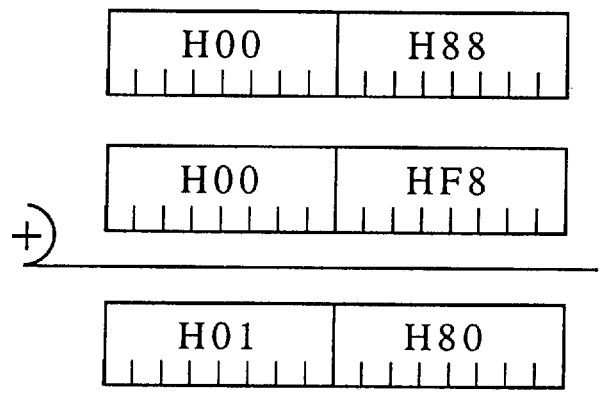
FIGS. 12A and 12B are views explaining the data processing by the processor in FIG. 10.
Figure 12B:
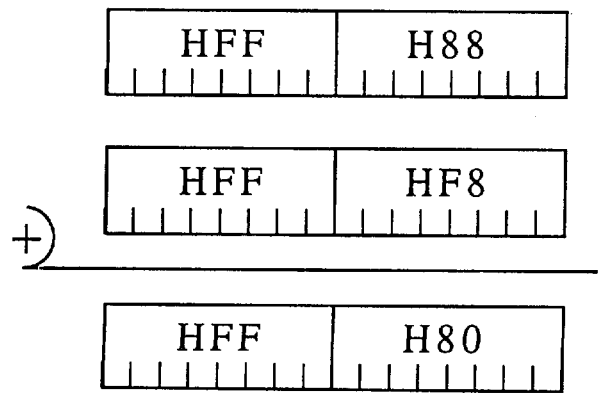

The data are sign-extended in the same way as explained with referring to FIGS. 4A, 4B except for the bit length; N is twenty-four and M is eight in the first extender 144, while N being twenty-four and M sixteen in the second extender 145. Also, the data are zero-extended in the same way as the sign-extension except that zero's are copied in the high order bits. The two extenders selectively operate depending on an instruction, and they only operate on two kinds of instructions: extension instructions to extend the data in the data register, and transfer instructions to transfer and extend transmission data. Each instruction is described below, where Dn is a data register, An is an address register, n being a register number, Mem is a memory data, and #imm8 and #imm16 are immediate data with numerals 8, 16 representing bit lengths.

TRANSFER INSTRUCTION WITH EXTENSION DATA

| | |
|---|---|
| EXTX Dn | ; sign-extend 16 bits to 24 bits |
| EXTXU Dn | ; zero-extend 16 bits to 24 bits |
| EXTXB Dn | ; sign-extend 8 bits to 24 bits |
| EXTXBU Dn | ; zero-extend 8 bits to 24 bits |

EXTENSION INSTRUCTION FOR TRANSMISSION DATA

| | |
|---|---|
| MOVI #imm16, Dn | ; sing extend 16-bit immediate data to 24 bits (#imm16→Dn) |
| MOVI #imm8, Dn | ; sign-extend 8-bit immediate data to 24 bits (#imm8→Dn) |
| MOVI #imm16, An | ; zero-extend 16-bit immediate data to 24 bits (#imm16→An) |
| MOV Mem, Dn | , sign-extend 16 bits to 24 bits (Mem→Dn) |
| MOVB Mem, Dn | ; sign-extend 8 bits to 24 bits (Mem→Dn) |
| MOVBU Mem, Dn | ; zero-extend 8 bits to 24 bits (Mem→Dn) |

Structures of the PSW 142 and branch judging unit 143 are depicted in FIG. 15. The PSW 142 is a 16-bit register with each bit serving as an independent flag or a control flag that sets the current status of the computer 3. Note that only the lower 8 bits that serve as operation flags are shown in the drawing; for the higher 8 bits, which are control flags, are irrelevant to the present invention. The lower 8 bits consists of a first flag group 151 and a second flag group 152; the former includes flags Z16, N16, V16, and C16 which are changed in accordance with the result of 16-bit data operation, and the latter includes flags Z24, N24, V24, and C24 which are changed in accordance with the result of 24-bit data operation.

The flags Z16, Z24 (denoted as 151*a*, 152*a* respectively) are zero flags exhibiting a zero result.

The flags N16, N24 (denoted as 151*b*, 152*b* respectively) are negative flags exhibiting a negative result.

The flags V16, V24 (denoted as 151*c*, 152*c* respectively) are overflow flags exhibiting an overflow if it occurs during the operation.

The flags C16, C24 (denoted as 151*d*, 152*d* respectively) are carry flags exhibiting a carry output.

The branch judging unit 143 includes selectors 153–156 and a condition judging unit 157. The output from either the first flag group 151 or second flag group 152 is selected by the selectors 153–156 in accordance with a designation from the decoding unit 140 when it decodes a conditional branch instruction.

Figure 16A:
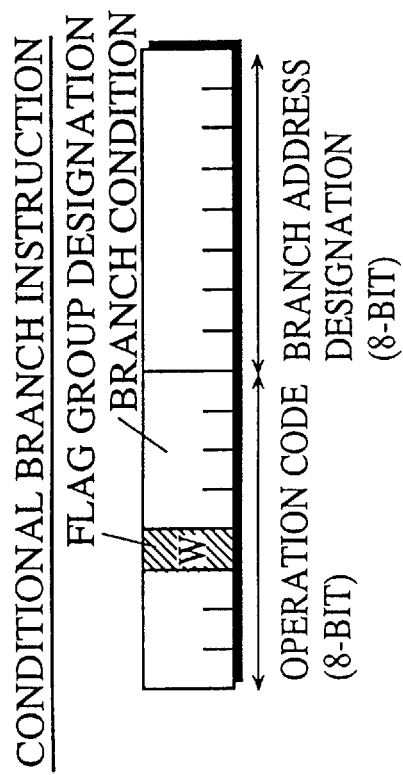

A bit-structure of a conditional branch instruction, which is run by the computer 3, is shown in FIG. 16A. The conditional branch instruction consists of an 8-bit OP code exhibiting a conditional branch and an 8-bit branch destination (relative) address. One bit denoted as W in the OP code designates a flag group, and accordingly, the decoding unit 140 designates that flag group to the selectors 153–156 based on the W's value.

Figure 16B:
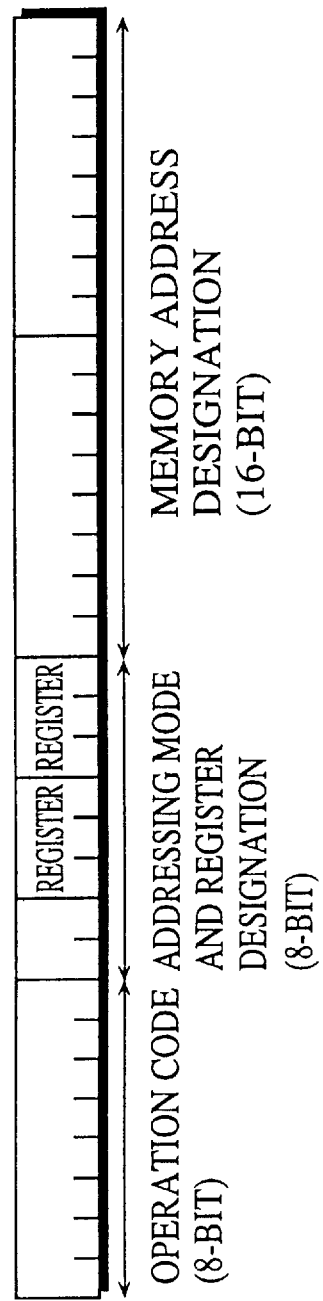

A bit structure of add/subtract/compare instructions between the register and memory 130 is shown in FIG. 16B. These instructions consist of an 8-bit OP code exhibiting an operation kind, 8 bits designating registers, and 16 bits designating a memory address. Note that the OP code does not include any bit exhibiting a data width. This is because both the first and second flag groups 151, 152 are changed at the execution of the add/subtract/compare instructions shown in FIG. 16B, and an appropriate flag group is selected in accordance with the conditional branch instruction shown in FIG. 16A.

Figure 17:
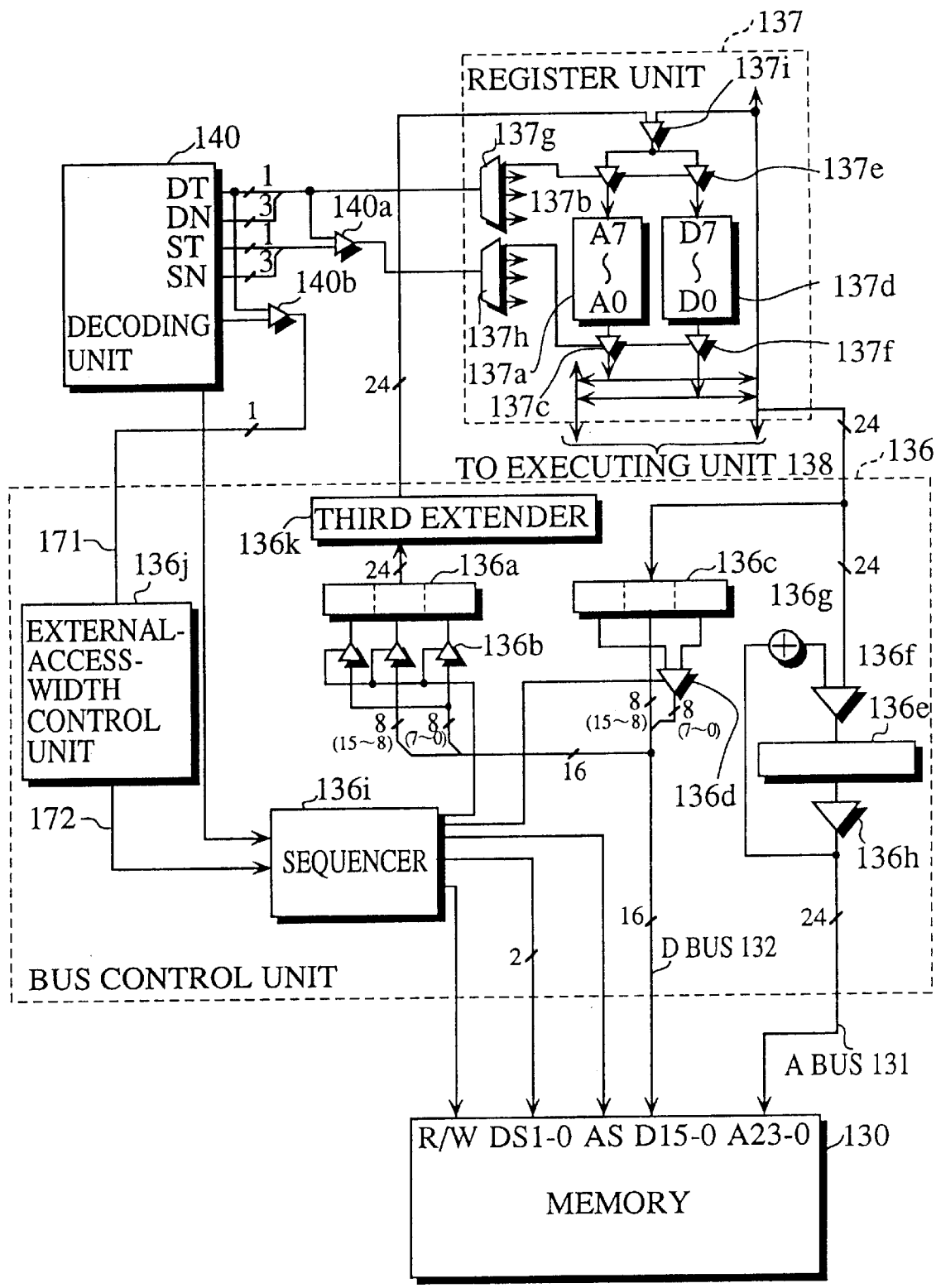
FIG. 17 is a block diagram depicting structures of a register unit, a bus control unit, a decoding unit and a memory in FIG. 13.

Structures of the register unit 137 and bus control unit 136 with the decoding unit 140 and memory 130 are depicted in FIG. 17; assume that the memory 130 is of 16-bit wide.

The register unit 137 includes an address register group 137a, an input buffer gate 137b, an output buffer gate 137c, a data register group 137d, another input buffer gate 137e, another output buffer gate 137f, two decoders 137g, 137h, and a selector 137i.

The address register group 137a includes eight 24-bit address registers A7-A0, and holds input data from the bus control unit 136 or from the executing unit 138 via the selector 137i and input buffer gate 137b in one of the eight registers designated by the decoder 137g, while outputting the data from one of the eight registers designated by the decoder 137h via the output buffer gate 137c.

The data register group 137d includes eight 24-bit data registers D7-D0, and holds the input data from the bus control unit 136 or from the executing unit 138 via the selector 137i and input buffer gate 137e in one of the eight registers designated by the decoder 137g, while outputting the data from one of the eight registers designated by the decoder 137h via the output buffer gate 137f.

The decoder 137g receives a type of a destination register (DT) and its register number (DN) from the instruction decoding unit 140, and accordingly selects a register for data-writing, outputting a selection signal to the selector 137i and a gate control signal from the buffer gates 137b, 137e.

The decoder 137h receives a type of a source register (ST) and its register number (SN), or a destination register (DT) and its register number (DN) from the instruction decoding unit 140, and accordingly selects a register for data-readout, outputting a gate control signal for the buffer gates 137c, 137f. Note that the ST indicates whether the source register is the address or data register, whereas the DT indicates whether the destination register is the address or data register. The register numbers (SN, DN) indicate the registers designated as to be the source and destination registers, respectively.

The decoding unit 140 decodes an instruction to output an appropriate control signal. In case of a data-transfer instruction, the decoding unit 140 outputs the control signal including the ST, SN, DT, and DN: the DT and DN are entered into the decoder 137g, while either the DT and DN, or ST and SN are entered into the decoder 137h via a selector 140a. At the same time, the decoding unit 140 outputs the types of the designated source and destination registers for the transmission data (address), or register information 171, to the bus control unit 136 via a selector 140b, and outputs an activation signal to the bus control unit 136.

The bus control unit 136 includes an external-access-width control unit 136j, a load buffer 136a, an input buffer gate group 136b, a store buffer 136c, a selector 136d, and an address buffer 136e, a selector 136f, an incrementer 136g, an output buffer gate 136h, a sequencer 136i, and a third extender 136k. The bus control unit 136 transfers the data between the registers in the register unit 137 and the memory 130 in the bit-width thereof.

The external-access-width control unit 136j receives the register information 171 and sends bit-width information 172, which contains bit-widths for each register group. More precisely, the external-access-width control unit 136j receives the register information 171 indicating a type of the register subject to the data-transfer instruction. When the address register is designated, the external-access-width control unit 136j outputs the bit-width information 172 indicating 24-bit data transfer. Whereas when the data register is designated, it outputs the bit-width information 172 indicating 16-bit data transfer. The register information 171 referred herein is a 1-bit signal exhibiting "1" for the address register and "0" for the data register. Similarly, the bit-width information 172 is a 1-bit signal exhibiting "1" for the 24-bit data transfer and "0" for the 16-bit data transfer. The bus control unit 136 controls the data transfer bit-widths: 24 bits for the address register and 16 bits for the data register.

The load buffer 136a holds data entered for a plurality of times from the memory 130 via the input buffer gate group 136b and outputs the same to the register unit 137 via the third extender 136k. To be more specific, the load buffer 136a is a 24-bit register, and 16-bit data from the memory 130 are entered in the lower 16 bits (15–0), while 8-bit data from the memory 130 are entered in the lower 8 bits (7–0); if the 8-bit-width bus is used, the bus control unit 136 transfers the 16-bit data twice per 8 bits (bit 7–0 and bit 15–8), and 24-bit data three times per 8 bits (bit 7–0, bit 15–8, bit 23–16). The store buffer 136c holds the 24-bit data entered from the register unit 137, and outputs the 24-bit data to the memory 130 via the selector 136d by dividing the same into the lower 16 bits (15–0) and upper 8 bits (23–16).

The address buffer 136e holds an access address entered from the register unit 137 via the selector 136f, and outputs the same to the memory 130 via the output buffer gate 136h. The incrementer 136g increments the output address from the output buffer gate 136h, which is entered again into the address buffer 136e via the selector 136f.

The sequencer 136i controls the execution of the load/store instruction with the memory 130 in accordance with the bit-width information 172 from the external-access-width control unit 136j: when the bit-width information 172 exhibits 24-bit data transfer, the load/store instruction is executed per 16 bits and 8 bits, whereas when the bit-width information 172 exhibits 16-bit data transfer, it is executed per 16 bits.

The third extender 136k either zero or sign-extends the 8- and 16-bit data from the load buffer 136a to 24-bit data under the control of the decoding unit 140 in accordance with the operation code.

A format of the data-transfer instruction is shown in FIGS. 18A, 18B. The format in FIG. 18A is, for example, an instruction to transfer the data from the data register to the memory 130 (MOVE D1, @A2), and the format in FIG. 18B is, for example, an instruction to transfer the data from the address register to the memory 130 (MOVE A1, @A2). In the drawings, OP is an operation code field exhibiting a kind of the operation, SRC is a source field designating a data-sending register, and DEST is a destination field designating a data-receiving memory. Also, MOVE means a transfer instruction, D1 indicates the data register, A1, A2 indicate the address registers, and @A2 is an address in the memory 130 that the address register A2 indicates. Both the SRC and DEST used herein are 3-bit long, and the transfer instruction includes a plurality of OP's to determine whether the SRC and DEST designate the address or data register. This is done to further reduce the number of bits in the SRC and DEST fields.

A structure of the compiler 2 is depicted in FIG. 13. The compiler 2 comprises a syntax analyzing unit 120, an option directing unit 121, a code generating unit 122, a parameter setting unit 123, a memory managing unit 124, a register managing unit 125, and an immediate managing unit 126.

The syntax analyzing unit 120 analyses a syntax in a C language program to generate an intermediary file composed of intermediary statements or codes.

The option directing unit 121 is used to input a direction for an overflow compensation: it directs the code generating unit 122 to insert a compensation code where a data variable is calculated, which will be described later more in detail.

The code generating unit 122 generates an object code in accordance with the intermediary file.

The parameter setting unit 123 holds the bit-width of an integer data variable and that of a pointer variable. The integer data variable and pointer variable referred herein are 16 bits and 24 bits, respectively.

The memory managing unit 124 designates a memory data readout/write width depending on the type of the variables subject to the load/store instruction generated by the code generating unit 122.

The register managing unit 125 designates an effective bit-width depending on the variables to be read out or written with the register used by the instruction generated by the code generating unit 122.

The immediate managing unit 126 designates immediate data width in the operation code depending on the type of the variable for an instruction using the immediate generated by the code generating unit 122.

Figure 19:
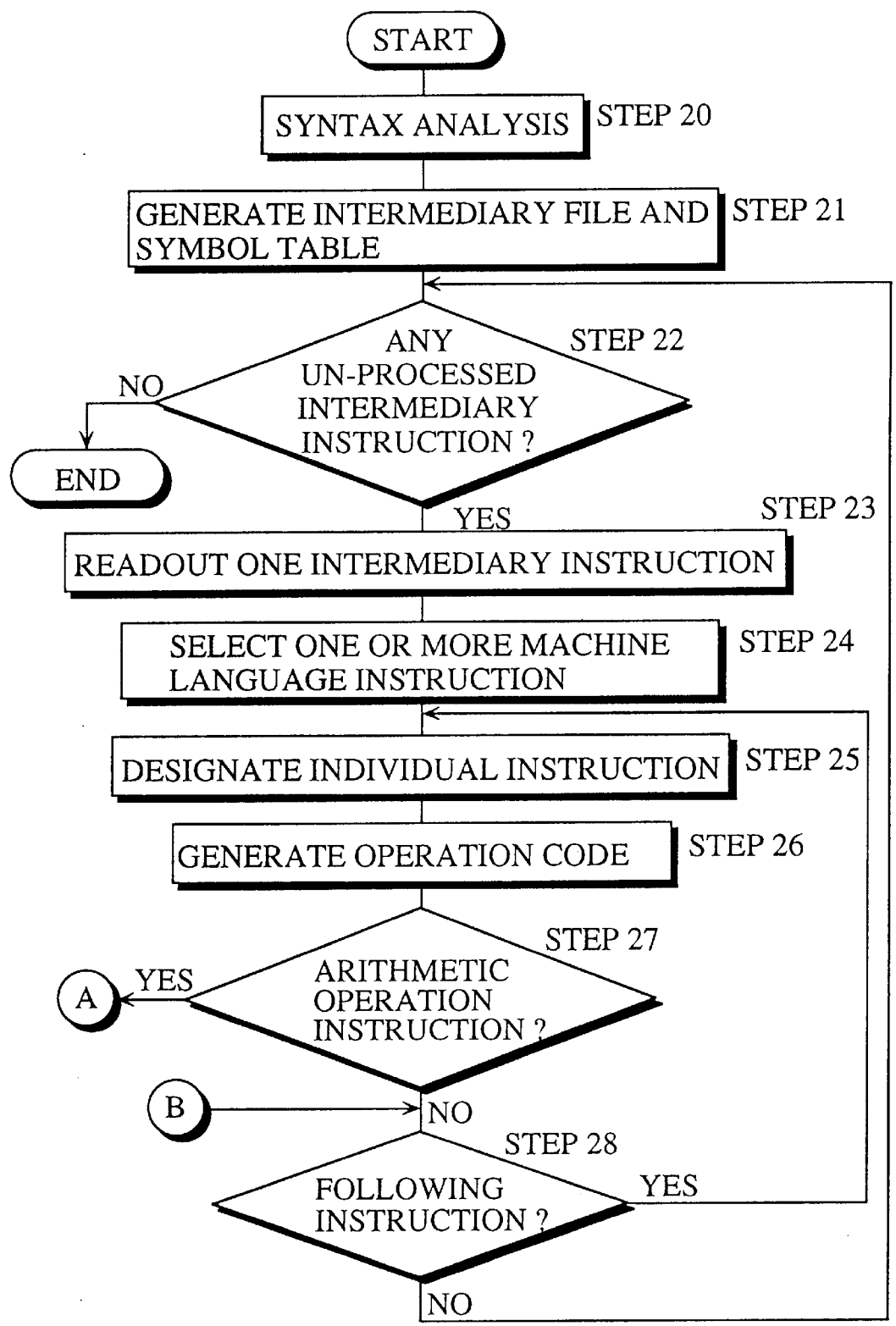
FIG. 19 is a flowchart detailing the operation of a compiler.

The operation of the above-constructed compiler 2 is detailed by the flowchart in FIG. 19.

In Step 20, a C language program is taken out from the storage unit 1, and the syntax thereof is analyzed based on a C language grammar to generate intermediary instructions and an intermediary file comprising intermediary statements.

In Step 21, the data variables are selected from the intermediary file to generate a variable table (symbol table) containing information for each variable. Examples of the symbol table are shown in FIGS. 20A, 20B. In the drawings, the data variable's symbol is set forth in a symbol column, while the data variable's sign and type are set forth in a variable-type column; the variable includes a pointer and an integer (including a character) variables. The number of data variable's bytes is set forth in a byte No. column, and a head address is set forth in a head address column when it is allocated to the memory 130.

In Step 22, whether or not all the instructions have been translated from the intermediary instructions is checked. If yes, the code generation is terminated; otherwise, the flow proceeds to Step 23.

In Step 23, one intermediary instruction to be executed is read out from the intermediary file.

In Step 24, one or more than one machine language instruction is selected to realize the intermediary instruction read out in Step 23.

In Step 25, one of the selected machine language instructions is designated to be executed.

In Step 26, an operation code for the designated machine language instruction (individual instruction) is generated; the code generating process will be referred to as "individual process".

In Step 27, a possibility for an overflow, or whether the generated operation code designates an arithmetic operation instruction is judged. If there is any possibility, the flow proceeds to Step 30, otherwise to Step 28.

In Step 28, whether there is any of the machine language instructions selected in Step 24 left unprocessed is judged. If yes, the flow returns to Step 25, otherwise to Step 22.

The operation of the code generating unit 122 in Step 26 will be detailed by the flowcharts in FIGS. 21-24.

In Step 30, whether or not the individual instruction is a load/store instruction is judged. If so, the judgment is notified to the memory managing unit 124; otherwise the flow proceeds to Step 31. Upon the judgment notice, the memory managing unit 124 operates as is detailed by the flowchart in FIG. 22.

In Step 40, the type of the variable to be loaded/stored from/to the memory 130 by the individual instruction is checked with the reference to the symbol table.

In Step 41, the variable type is judged; in case of the integer data variable, the flow proceeds to Step 42 and to Step 43 in case of the pointer data variable.

In Step 42, a direction to generate a load/store instruction for 2 byte data is sent to the code generating unit 122 and the flow proceeds to Step 31; the load/store instruction herein indicates an access data width of 2 bytes.

In Step 43, a direction to generate a load/store instruction for 3-byte data is sent to the code generating unit 122 to further proceed to Step 31; the load/store instruction herein indicates an access data width of 3 bytes.

In Step 31, whether or not the individual instruction uses a register is judged. If so, the judgment is notified to the register managing unit 125; otherwise the flow proceeds to Step 32. Upon the judgment notice, the register managing unit 125 operates as is detailed by the flowchart in FIG. 23.

In Step 50, the type of the variable to be stored in the register by the individual instruction is checked with the reference to the symbol table.

In Step 51, the variable type is judged; in case of the integer data variable, the flow proceeds to Step 52 and to Step 53 in case of the pointer data variable.

In Step 52, a direction that the lower 16 bits of the register to be used is effective is sent to the code generating unit 122 to further proceed to Step 32.

In Step 53, a direction that the lower 24 bits of the register to be used is effective is sent to the code generating unit 122 to further proceed to Step 32.

In Step 32, whether or not the individual instruction uses immediate data is judged. If so, the judgment is notified to the immediate managing unit 126; otherwise the flow proceeds to Step 33. Upon the judgment notice, the immediate managing unit 126 operates as is detailed by the flowchart in FIG. 24.

In Step 60, the type of the variable used with the immediate data, which the individual instruction uses, is checked with the reference to the symbol table.

In Step 61, the variable type is judged; in case of the integer data variable, the flow proceeds to Step 62 and to Step 63 in case of the pointer data variable.

In Step 62, a direction to generate an instruction using 2-byte immediate data is sent to the code generating unit 122, and the flow proceeds to Step 33.

In Step 63, a direction to generate an instruction using 3-byte immediate data is sent to the code generating unit 122, and the flow proceeds to Step 33.

In Step 33, an operation code for the individual instruction is generated in accordance with any direction from the memory managing unit 124, register managing unit 125, and immediate managing unit 126.

Figure 25:
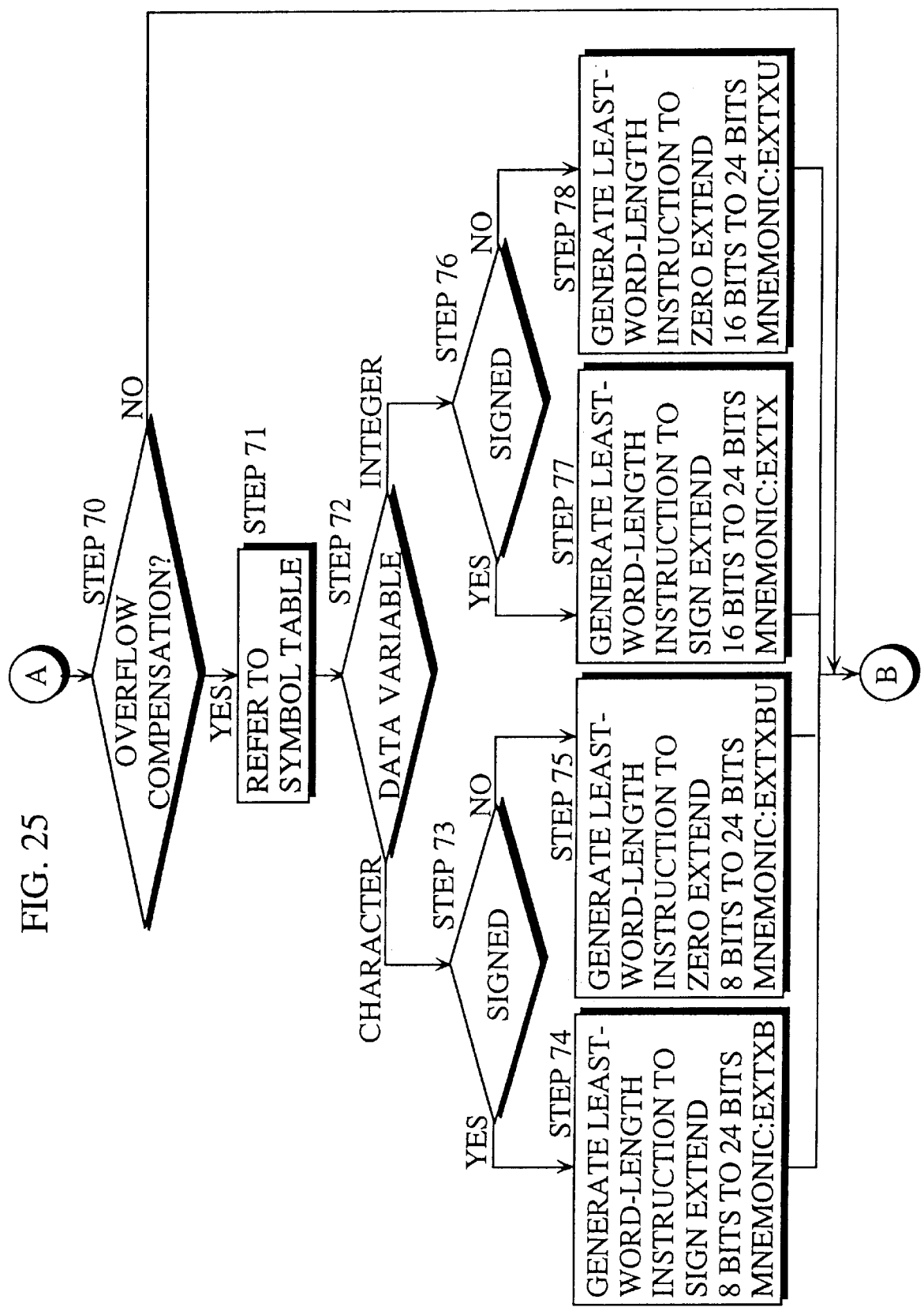
FIG. 25 is a flowchart detailing an overflow compensation operation.

Next, the overflow compensation proceeded from Step 27 will be detailed by the flowchart in FIG. 25.

In Step 70, whether there is any direction to realize the overflow compensation from the option directing unit 121 is checked. If so, the flow proceeds to Step 71 and to Step 72 otherwise.

In Step 71, the type of the variable for the individual instruction is checked with the reference to the symbol table.

In Step 72, the variable type is judged; in case of the character data variable, the flow proceeds to Step 73 and to Step 76 in case of the integer data variable.

In Step 73, whether the character data variable is signed or not is judged. If they are signed, the flow proceeds to Step 74 and to Step 75 otherwise.

In Step 74, the signed-character data variable is sign-extended: a least-word-length instruction to sign-extend the 8 bits to 24 bits is generated.

In Step 75, the unsigned-character data variable is zero-extended: a least-word-length instruction to zero-extend 8 bits to 24 bits is generated.

In Step 76, whether the integer data variable is signed or not is judged. If they are signed, the flow proceeds to Step 77 and to Step 78 otherwise.

In Step 77, the signed-integer data variable is sign-extended: a least-word-length instruction to sign-extend 16 bits to 24 bits is generated.

In Step 78, the unsigned-integer data variable is zero-extended: a least-word-length instruction to zero-extend 16 bits to 24 bits is generated.

Next, the operation of the computer 3 and compiler 2 will be explained in the five following cases to highlight the improvement compared with the conventional processors explained in the related art column.

(1) Parameter setting
(2) Overflow compensation
(3) The data transfer with the memory 130
(4) The data transfer and operation including the immediate data
(5) The conditional branch (1) Parameter Setting Assume that the option directing unit 121 instructs no overflow compensation herein, and a C language program in the storage unit 1 reads as follows:

```
main ( )
{
int *a, b, c, ;
c = *a + b + 1 ;
}
```

The syntax analyzing unit 120 takes out the C language program from the storage unit 1 to generate an intermediary file by analyzing the syntax with the C language grammar. The intermediary file if written easier to understand is as follows:

Intermediary Statement 1: (int *a, b, c)
Intermediary Instruction 1: t1:=*a
Intermediary Instruction 2: t2:=t1+b
Intermediary Instruction 3: t3:=t2+1
Intermediary Instruction 4: c:=t3

Intermediary Statement 1 corresponds to the declaration statement int *a, b, c, while Intermediary Instructions 1–4 correspond to the operation expression c=*a+b+1.

These intermediary statement and instructions are converted into object codes in the following way.

When the intermediary file is entered, the code generating unit 122 extracts the data variables, both with and without the declarations, to check their respective types. If necessary, the code generating unit 122 allocates the data variables to the memory 130 to generate the symbol table as shown in FIG. 20A (Step 21 in FIG. 19).

Herein, the variables *a, b, c are declared explicitly and thus extracted from Intermediary Statement 1. The variable *a declared as to be a pointer variable is allocated to an area in the memory 130; since the pointer variable is fixed to 24 bits by the parameter setting unit 123, a 24-bit (3-byte) area is secured. The variables b, c declared to be the integer data variables are also allocated to their respective areas in the memory 130; since the integer data variable is fixed to 16 bits by the parameter setting unit 123, 16-bit (2-byte) areas are secured, respectively. Assume that the variables *a, b, c are allocated to the 3-byte area starting from the address H1000, 2-byte area starting from the address H1004, and 2-byte area starting from the address H1006, respectively; note that a 1-byte at the address H1003 is not used.

Further, temporary variables t1, t2, t3 are selected from Intermediary Instructions 1–4, which are managed as to be the integer data variables in response to the variables subject to operation.

Accordingly, information for these variables is written into the symbol table, which is shown in FIG. 20A; the register column and head address column for the temporary variables are blank because any data have not been allocated yet; the symbol table is updated dynamically each time the register allocation changes.

Subsequently, the code generating unit 122 generates machine language instructions for the above intermediary instructions, which will be explained separately in the following.

Intermediary Instruction 1

The code generating unit 122 judges whether there is any non-executed intermediary instruction in the intermediary file (Step 22 in FIG. 19). Since Intermediary Instructions 1–4 have not been executed herein, the code generating unit 122 proceeds to Step 23.

Then, the code generating unit 122 reads out a leading intermediary instruction (Step 23) to select one or more than one machine language instruction to realize that intermediary instruction (Step 24).

The one or more than one machine language instruction is selected as follows.

Intermediary Instruction 1 reads (1) Find the address H1000 to which the data variable *a is allocated;
(2) Read out 3 bytes starting from the address H1000;
(3) Read out 2 bytes starting from the address obtained by the 3-byte readout to store the same in the temporary variable t1.

Correspondingly, the code generating unit 122 selects the following three data-transfer instructions in machine language:

(1) MOV instruction using the address H1000 as the immediate data and storing the same in the first address register;

(2) MOV instruction using the content of the pointer variable *a as an address to read out the data therein to the second address register using the first address register.

(3) MOV instruction reading out the data designated by the pointer to the data register using the second address register.

The first and second address registers are allocated with the registers A0, A1, respectively, which are accordingly written into the symbol table.

The code generating unit 122 designates one instruction (Individual Instruction 1) from the above three instructions (Step 25) to generate a corresponding operation code (Step 26).

The process of this code generation will be explained with referring to FIGS. 21–24.

The code generating unit 122 judges that Individual Instruction 1 is not a load/store instruction to access the memory 130 (Step 30 in FIG. 21), but an instruction using the register A0; the judgement is notified to the register managing unit 125 (Step 31).

The register managing unit 125 refers to the symbol table (Step 50 in FIG. 23), and judges that the variable to be stored in the register A0 is the pointer (Step 51). Thus, the register managing unit 125 directs the code generating unit 122 to generate an instruction to effect all the 24 bits in the register (Step 53).

Further, the code generating unit 122 notifies to the immediate managing unit 126 that Individual Instruction 1 uses the immediate data (Step 32). Thus, the immediate managing unit 126 refers to the symbol table (Step 60 in FIG. 24), and judges that the immediate to be stored in the register A0 is the pointer (Step 61). Thus, the immediate managing unit 126 directs the code generating unit 122 to generate an instruction that includes 3-byte immediate data (Step 63).

In accordance with Steps 53, 63, the code generating unit 122 generates Instruction 1 corresponding to Individual Instruction 1 as follows (Step 33):

Instruction 1: MOV #H001000,A0

Subsequently, the code generating unit 122 acknowledges that two machine language instructions (Individual Instructions 2, 3) have not been executed yet (Step 28), and thus proceeds to Step 25.

The code generating unit 122 designates Individual Instruction 2 (Step 25) to generate a corresponding operation code (Step 26).

The process of this operation code generation will be explained with referring to FIGS. 21–24.

Figure 21:
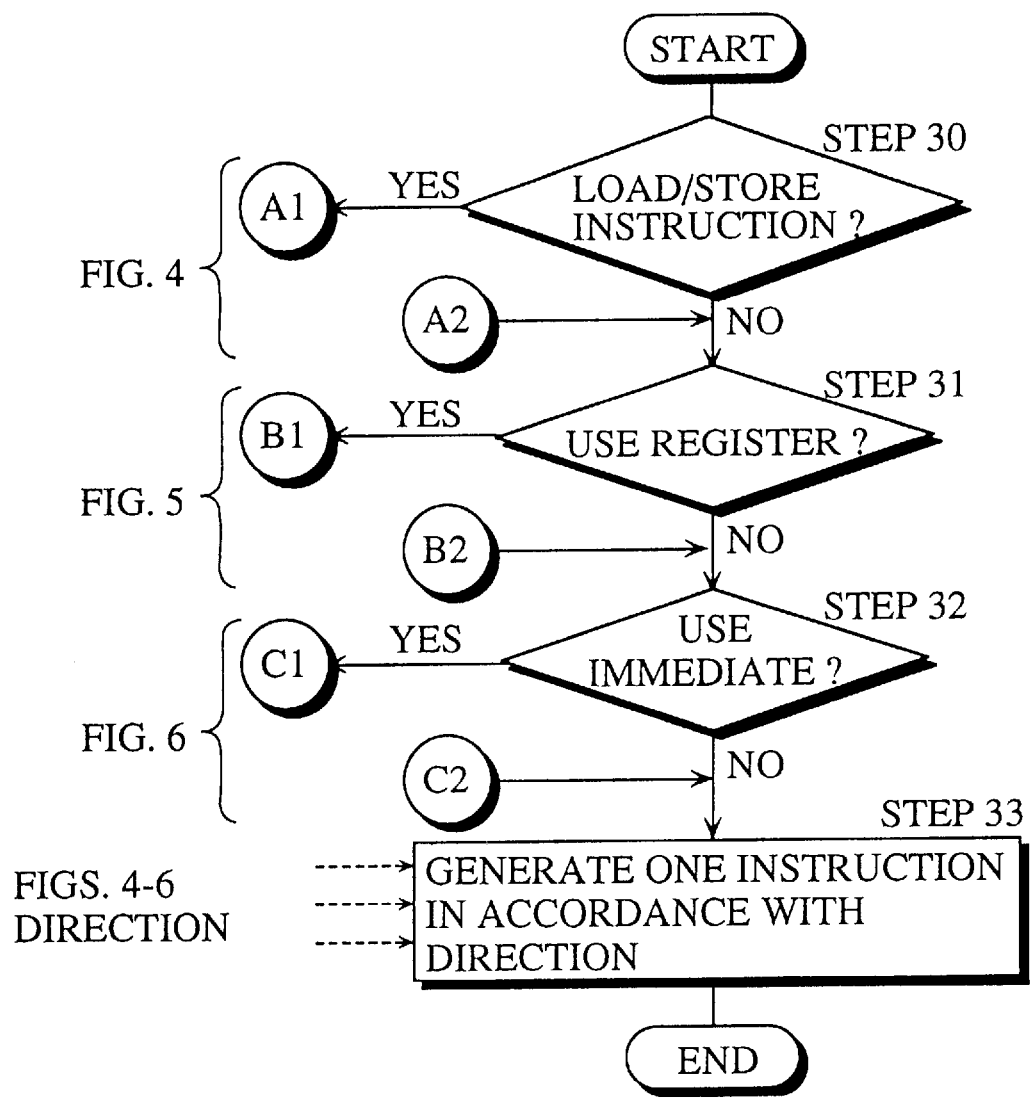
FIG. 21 is a sub-chart of Step 26 in FIG. 19.
Figure 22:
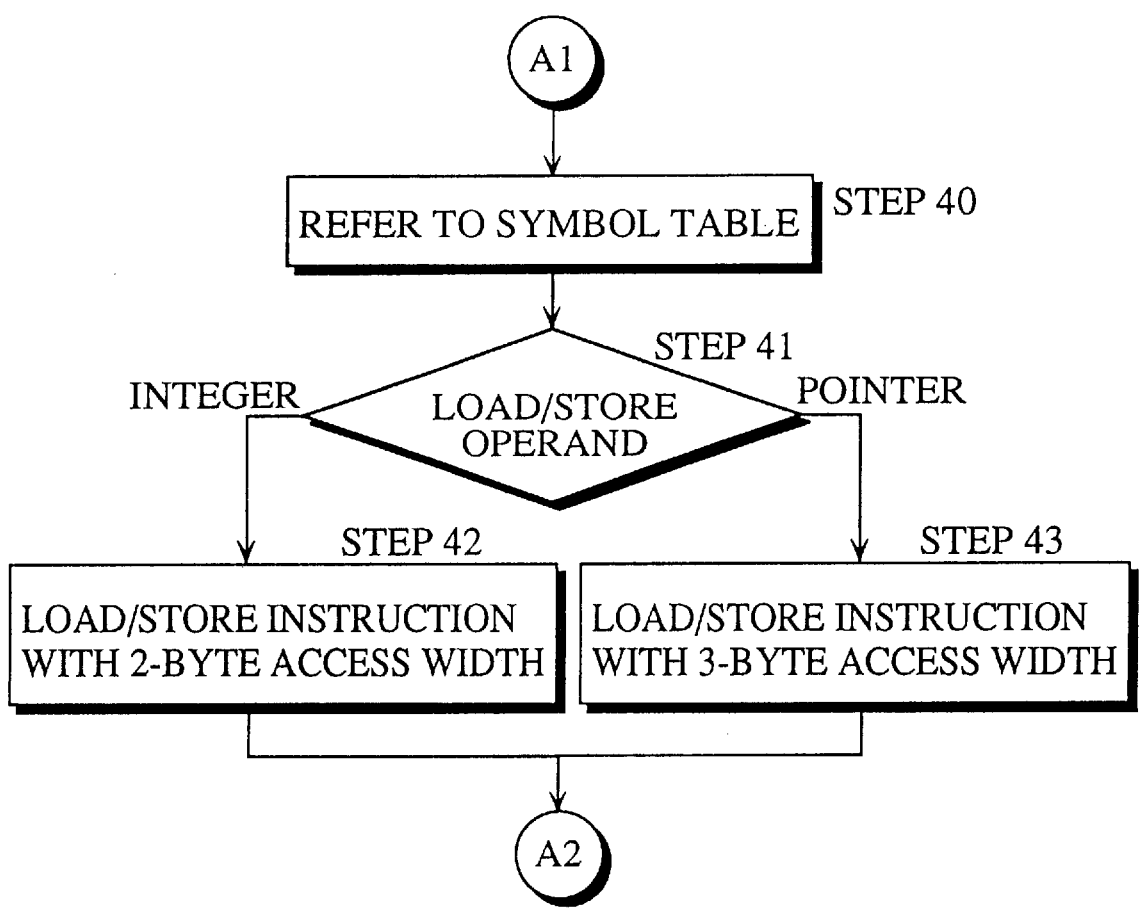
FIG. 22 is a flowchart detailing the operation of a memory managing unit.
Figure 23:
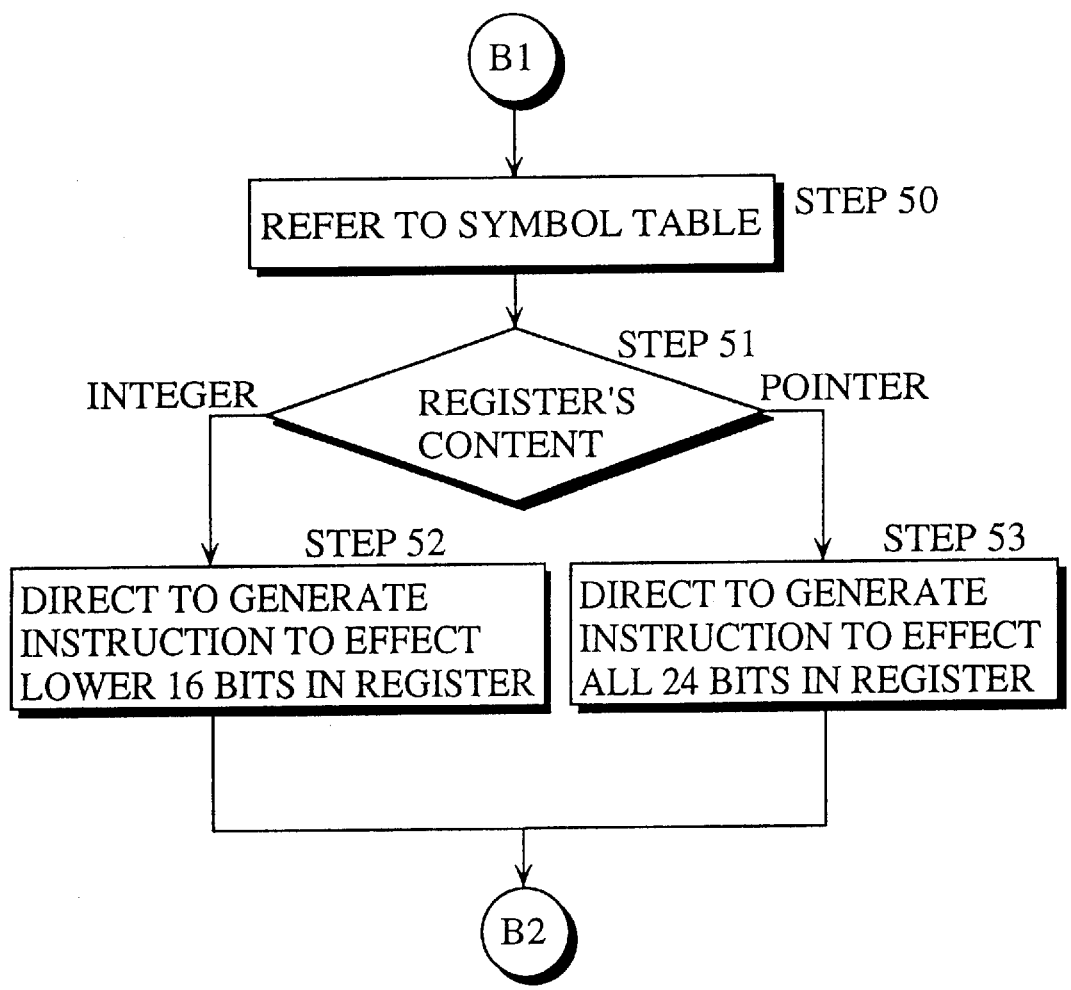
FIG. 23 is a flowchart detailing the operation of a register managing unit.
Figure 24:
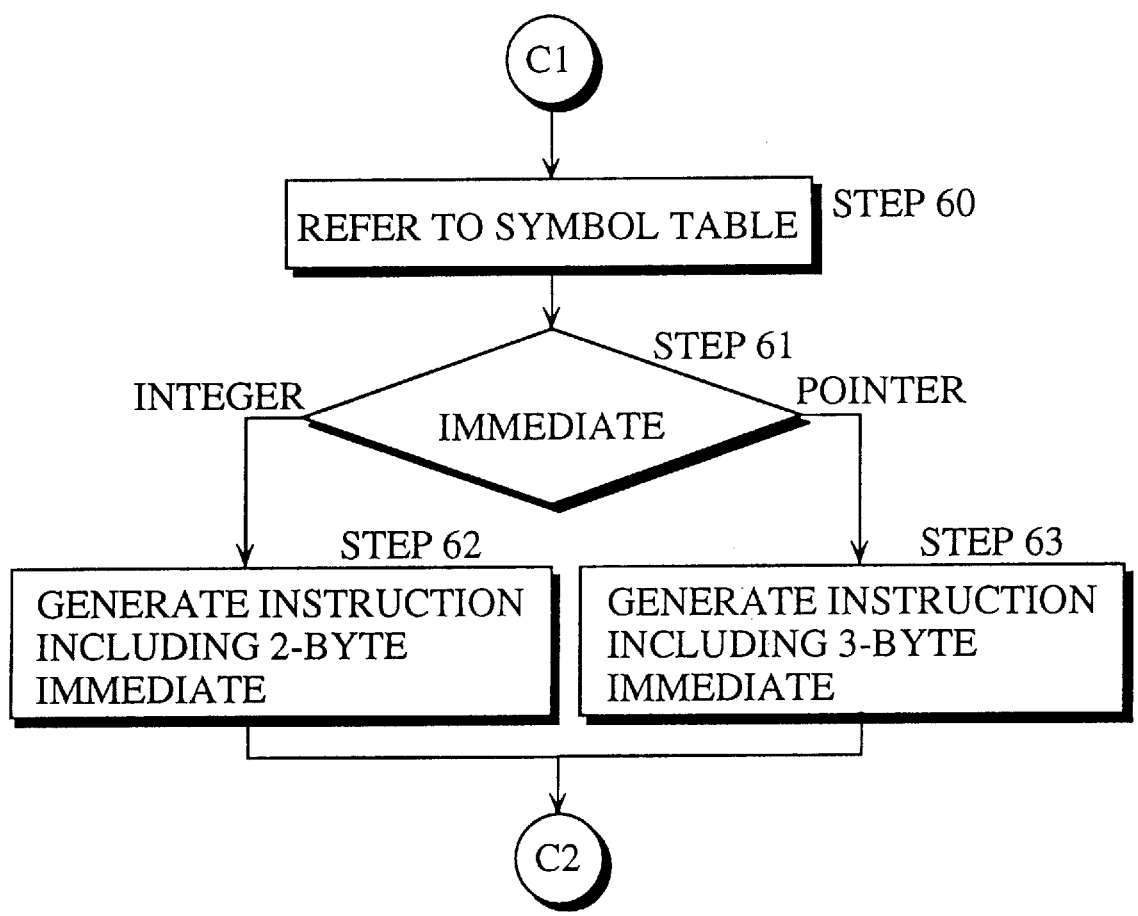
FIG. 24 is a flowchart detailing the operation of an immediate managing unit.

The code generating unit 122 judges that Individual Instruction 2 is a load/store instruction to access the memory 130, and notifies the judgment to the memory managing unit 124 (Step 30 in FIG. 21).

The memory managing unit 124 refers to the symbol table (Step 40 in FIG. 22), and judges that the variable to be stored in the second register A1 is the pointer (Step 41). Thus, the memory managing unit 124 instructs the code generating unit 122 to generate a load instruction whose access width is 3 bytes (Step 43).

Further, the code generating unit 122 judges that Individual Instruction 2 uses the registers A0, A1, and notifies the judgment to the register managing unit 125 (Step 31).

The register managing unit 125 refers to the symbol table (Step 50 in FIG. 23), and judges that the variable to be stored in the second register A1 is the pointer (Step 51). Thus, the register managing unit 125 directs the code generating unit 122 to generate an instruction to effect all the 24 bits in the register (Step 53).

Subsequently, since Individual Instruction 2 does not use the immediate data (Step 32), the code generating unit 122 proceeds to Step 33.

In accordance with the instructions from Step 43, 53, the code generating unit 122 generates Instruction 2 below corresponding to Individual Instruction 2 (Step 33):

Instruction 2: MOV @A0, A1

The code generating unit 122 acknowledges that Individual Instruction 3 has not been executed yet (Step 28), and thus proceeds to Step 25.

The code generating unit 122 generates Instruction 3 below in the same way as above (Steps 25, 26); the temporary variable t1 is allocated to the register D0 at this time.

Instruction 3: MOV @A1, D0

Each intermediary instruction is processed in the loop of Steps 22–28, and each individual instruction is executed in Steps 24, 25, 26 in the same way as above, and the explanation is not repeated.

Intermediary Instruction 2

Intermediary Instruction 2 reads:

(4) Read out 2 bytes starting from the address H1004 to which the variable b is allocated.

(5) Add the readout 2 bytes to the temporary variable t1 to store the result into the temporary variable t2.

The code generating unit 122 generates Instruction 4 to load from the address, four bytes away from the address H1000, stored in the register A0 for Individual Instruction 4. The memory managing unit 124 refers to the symbol table (Step 40), and judges that Individual Instruction 4 loads the integer data variable (Step 41). Thus, the memory managing unit 124 directs the code generating unit 122 to generate a load instruction whose access width is 2 bytes (Step 42). The register managing unit 125 refers to the symbol table (Step 50), and stores the integer data into the register (Step 51). Thus, the register managing unit 125 directs the code generating unit 122 to generate an instruction to effect the lower 16 bits in the register (Step 52); the variable b is stored into the register D1 at this time.

Instruction 4: MOV @(04,A0), D1

Subsequently, the code generating unit 122 generates Instruction 5 to add the variable b stored in the register D1 to the temporary variable t1 indicated by the register D0 to store the result in the register D1. Accordingly, the register managing unit 125 refers to the symbol table (Step 50), and stores the integer data variable in the register (Step 51). Thus, the register managing unit 125 directs the code generating unit 122 to generate an instruction to effect the lower 16 bits in the register (Step 52); the temporary variable t2 is allocated to the register D1 at this time.

Instruction 5: ADD D0, D1

Intermediary Instruction 3

Intermediary Instruction 3 reads:

(6) Add a value "1" to the temporary variable t2 to store the result into the temporary variable t3.

In accordance with the directions from the register managing unit 125 and immediate managing unit 126, the code generating unit 122 generates Instruction 6 below to add 2-byte immediate #H0001 to the register D1 and store the result in the register D1; the temporary variable t3 is allocated to the register D1 at this time.

Instruction 6: ADD #H00001, D1

Intermediary Instruction 4

Intermediary Instruction 4 reads:

(7) Write the temporary variable t3 in two bytes starting from the addresses H1006 where the variable c is allocated.

In accordance with the direction from the memory managing unit 124, the code generating unit 122 generates Instruction 7 to store the register D1's content at six bytes away from the address specified by the register A0's content.

Instruction 7: MOV D1,@(06, A0)

The intermediary instructions are processed in the above sequence, and as a result, the code generating unit 122 outputs the object codes to the memory 130 as follows. Assume that Instructions 1–7 are located on the addresses H100000, H100005, H100007, H100008, H10000a, H10000b, and H10000f in the memory 130, respectively.

| Instruction 1 : | H100000 | MOV | #H001000,A0 |
| Instruction 2 : | H100005 | MOV | @A0, A1 |
| Instruction 3 : | H100007 | MOV | @A1, D0 |
| Instruction 4 : | H100008 | MOV | @(04,A0),D1 |
| Instruction 5 : | H10000a | ADD | D0, D1 |
| Instruction 6 : | H10000b | ADD | #H0001, D1 |
| Instruction 7 : | H10000f | MOV | D1,@(06,A0) |

These instructions are the object code expressed in the mnemonic object codes (assembly language) for the explanation's convenience. They are hexadecimal numbers, but in effect they are stored in the binary numbers in the memory 130.

The computer 3 runs the object codes thus located in the memory 130 in the following way.

Instruction 1

The bus control unit 136 and instruction control unit 134 outputs a value H100000 held in the program counter in the fetching unit 139 to the address bus 131, and fetches Instruction 1 via the data bus 132 to decode the same. In accordance with the decoding result, the operation executing unit 135 receives the immediate H001000 designated by Instruction 1's operand from the instruction control unit 134 to store the same into the register A0 in the register unit 137.

Instruction 2

Similarly, the bus control unit 136 and instruction control unit 134 fetch and decode Instruction 2 in the same way. The operation executing unit 135 reads out the register A0's content to read out the memory 130 by outputting the same to the address bus 131, storing the 16-bit data read out via the data bus 132 in the lower 16 bits of the register A1. Subsequently, the operation executing unit 135 adds a value "2"to the register A0's value H001000 by the executing unit 138 to read out the memory 130 by outputting the H001002 to the address bus 131 by the bus control unit 136. The operation executing unit 135 stores the 8-bit data read out via the data bus 132 into the higher 8 bits in the register A1.

Instruction 3

The bus control unit 136 and instruction control unit 134 fetch and decode Instruction 3. The operation executing unit 135 reads out the register A1's content to read out the memory 130 by sending the same to the address bus 131. Subsequently, the operation executing unit 135 stores the 16-bit value read out via the third extender 136k, which sign-extends the lower 16 bits to 24 bits to store the same into the register D1; the register D0 thus holds the data designated by the pointer *a.

Instruction 4

The bus control unit 136 and instruction control unit 134 fetch and decode Instruction 4. The operation executing unit 135 receives a displacement "04" from the instruction control unit 134 to add the same to the register A0's value H001000 read out by the executing unit 138, and reads out the memory 130 by sending the result to the address bus 131 by the bus control unit 136. Subsequently, the operation executing unit 135 stores the 16-bit value read out via the third extender 136k, which sign-extends the lower 16 bits to 24 bits to store the same into the register D1; the register D1 thus holds the variable b.

Instruction 5

The bus control unit 136 and instruction fetch and decode Instruction 5. The operation executing unit 135 adds the register D1's value to the register D0's value read out from the register unit 137 to store the 24-bit result into the register D1. Although the executing unit 138 operates the 24-bit data, the lower 16 bits are effective in the register D1. The register D1 thus holds the addition result of the data pointed by the pointer variable *a and variable b.

Instruction 6

The bus control unit 136 and instruction control unit 134 fetch and decode Instruction 6. The operation executing unit 135 adds the register D1's value read out from the register unit 137 by the executing unit 138 to the immediate H0001 received from the instruction managing unit 134 to store the result in the register D1; the register D1 thus holds the addition result of the data pointed by the pointer variable *a, variable b, and immediate value H0001.

Instruction 7

The bus control unit 136 and instruction control unit 134 fetch and decode Instruction 7. The operation executing unit 135 receives a displacement "06" from the instruction control unit 134. Accordingly, the executing unit 138 adds the register A0's value H001000 read out from the register unit 137 by the executing unit 138 to the received displacement "06", and outputs the addition result H001006 to the data bus 132 via the bus control unit 136, while outputting the register D1's lower 16 bits to the data bus 132, writing the 16 bits in the memory 130; the addition result of the data indicated by the pointer variable *a, variable b, and immediate H0001 are thus written into the memory 130 at the address H001006.

In this way, the object code translated from the C language program by the compiler 2 will be run by the computer 3.

As has been explained, the compiler 2 manages the locations of all the variables and the object codes in the memory 130 with 24-bit addresses. The computer 3 calculates these 24-bit addresses using the 24-bit register unit 137 and executing unit 138 to access the memory 130 via the 24-bit address bus 131. Thus, the data processing system of the present invention can secure an even 16-Mbyte address space with no segment division. As a result, a C language programmer does not have to check the space's irregularity, or the segment boundaries. Moreover, the performance efficiency is not degraded by the address computation as is with the segment register. Thus, the program can be constructed more efficiently.

The data processing system of the present invention is suitable for the application that operates 16-bit data while demanding an address space of 16 Mbyte. This is because the computer 3 includes the 24-bit register unit 137 and executing unit 138, eliminating the problem of the cost for the excess hardware and running electricity.

The computer 3 runs an instruction includes the immediate data showing the address, the immediate includes 24 bits at most. In contrast, with the conventional machine language instruction of 16- or 32-bit wide, the word length exceeds 32 bits because the address's immediate is 32 bits at its maximum. Thus, the size of the object code can be reduced significantly compared with the conventional 32-bit processor. Also, the code size is hardly increased compared with the 16-bit processor managing the 64-Kbyte address space, because the code size is increased by one byte only due to the address's immediate in the instruction.

In the foregoing embodiment, 16-bit data bus 132 is used in the computer 3; a 24-bit data bus can be used as well. Although the data readout/writing execution time from/in the memory 130 is prolonged compared with the 24-bit data bus 132, this latency is negligible compared with a case where the 16-bit data bus 132 is utilized in the 32-bit processor because only the execution time prolongs by a read-out time for a value for the 24-bit address stored in the register unit 137 from the memory 130.

In the foregoing embodiment, the address bus 131 in the computer 3, the program counter in the fetching unit 139, the register unit 137 and the executing unit 138 are all 24 bits, and the pointer variable in the parameter setting unit 123 is also 24 bits. However, they can be 17 to 31 bits depending on the address space size; the hardware for the bits exceeding the address bit-width is eliminated and the excess costs and electricity consumption can be saved appropriately.

The address bus 131 in the computer 3, the program counter in the fetching unit 139, the register unit 137, executing unit 138, the pointer variable in the parameter setting unit 123 in the compiler 2 are all 24 bits, and the data variable in the parameter setting unit 123 in the compiler 2 is 16 bits in the foregoing embodiment. However, the bit widths of these components are not limited to as above. Assume that 24 is replaced with an address bit-width N and 16 is replaced with a data bit-width M, where N is greater than M, the data processing system of the present invention can secure a $2^N$-byte address space, which exceeds $2^M$-byte address space.

The data variable whose bit-width is set by the parameter setting unit 123 is not limited to the integer data variable; it can be of any data variable available for the C language program.

In the foregoing embodiment, the C language is compiled to be run; however, any program language can be compiled by adjusting the compiler 2 accordingly.

(2) Overflow Compensation

The explanation of the overflow compensation will be described in the following. For simplification, the C language program as follows is used as an example.

```
main ( )
{
    char a ;
    unsigned char b ;
    int c ;
    unsigned int d;
    a = a + 1 ;
    b = b + a ;
    c = c + b ;
    d = d + c ;
}
```

This C language program is read out from the storage unit 1 by the code generating unit 122, and the syntax is analyzed with the C language grammar. Accordingly, the code generating unit 122 generates an intermediary file in an intermediary language (Steps 20, 21 in FIG. 19). The intermediary file written in a source level is as follows:

Intermediary Statement 1: (char a)

Intermediary Statement 2: (unsigned char b)

Intermediary Statement 3: (int c)

Intermediary Statement 4: (unsigned int d)

Intermediary Instruction 1: (a=a+1)

Intermediary Instruction 2: (b=b+a)

Intermediary Instruction 3: (c=c+b)

Intermediary Instruction 4: (d=d+c)

When the intermediary file is entered, the code generating unit 122 extracts the data variables, both with and without the declarations, in the intermediary file to check their respective types. If necessary, the variables are allocated to the memory 130 to generate the symbol table as shown in FIG. 20B (Step 21).

The variables a, b, c, d, which are declared explicitly, are extracted from Intermediary Statements 1–4. The type of each variable is judged based on the declaration to be registered in the symbol table (FIG. 20B) while being allocated to the memory 130. The variables a, b, c, d are allocated to areas at one byte starting from the address 1000 address, one byte starting from the address 1001, two byte starting from the address 1002, two byte from the address 1004, respectively as shown in FIG. 20B. The symbol table is updated dynamically with every change in the content thereof.

Subsequently, the code generating unit 122 generates machine language instructions for each Intermediary Instruction. This process is explained in two cases: with and without overflow compensation.

No Overflow Compensation

The code generating unit 122 reads out a leading intermediary instruction among the unprocessed intermediary instructions (Step 23), and selects one or more than one machine language instruction to realize the extracted intermediary instruction (Step 24).

The one or more than one intermediary instruction is selected in the following way.

Intermediary Instruction 1 (a=a+1) reads:

1) Read out one byte starting from the address 1000 where the signed character variable a is allocated.

2) Add a value "1" to the readout data.

3) Store the addition result into the address 1000.

The code generating unit 122 selects the machine language instructions corresponding to the above three instructions. The machine language instructions are 1) MOVB instruction for reading out one byte starting from the address 1000 to store the same in the data register (herein D0).

2) ADD instruction for adding a value "1" to the register's content.

3) MOVB instruction for restoring the addition result into the address 1000.

Further, the code generating unit 122 generates three Individual Instructions 1, 2, 3, by repeating the loop of Steps 24–28 three times.

| Instruction 1 : | address 100000 | MOVB @1000, D0 |
| Instruction 2 : | address 100004 | ADD #1, D0 |
| Instruction 3 : | address 100006 | MOVB D0, @1000 |

Similarly, the code generating unit 122 generates Instructions 4–6 as follow from the Intermediary Instruction 2 (b=b+a).

| Instruction 4 : | address 100009 | MOVBU @1001, D1 |
| Instruction 5 : | address 10000c | ADD D0, D1 |
| Instruction 6 : | address 10000d | MOVB D1, @1001 |

The code generating unit 122 generates Instructions 7–9 as follow from the Intermediary Instruction 3 (c=c+b).

| Instruction 7 : | address 100010 | MOV @1002, D0 |
| Instruction 8 : | address 100013 | ADD D1, D0 |
| Instruction 9 : | address 100014 | MOV D0, @1002 |

The code generating unit 122 generates Instructions 10–12 as follow from the Intermediary Instruction 4 (d=d+c).

| Instruction 10 : | address 100017 | MOV @1004, D1 |
| Instruction 11 : | address 10001b | ADD D1, D0 |
| Instruction 12 : | address 10001 | MOV D1, @1004 |

Instructions 1–12 are the object code written in the mnemonic object codes (assembly language) for the use of convenience. They are hexadecimal numbers, but in effect, they are stored in the binary numbers into the memory 130. Assume that Instructions 1–12 are allocated to 31 bytes, from the addresses 100000 to 10001e. No overflow-compensation instruction is generated herein.

The object code stored in the memory 130 is run by the computer 3 in the following way.

Instruction 1

The executing unit 138 reads out the variable a, or an 8-bit value, from the address 001000 in the memory 130 via the bus control unit 136 to sign-extend the same to 24 bits to be stored in the register D1 in the register unit 137.

Instruction 2

The executing unit 138 adds a value "1" to the register D0's content in the register 137 by the ALU 141 to restore the addition result in the register D0. The executing unit 138 executes 24-bit data operation.

Instruction 3

The executing unit 138 writes the register D0's lower 8 bits at the address 001000 in the memory 130.

Instruction 4

The executing unit 138 reads out the variable b, or an 8-bit value, from the address 001001 in the memory 130 via the bus control unit 136 to zero-extend the same to 24 bits to store the same in the register D1 in the register unit 137.

Instruction 5

The executing unit 138 adds the register D1's content to the register's D0's content by the ALU 141, and restores the addition result into the register D1. The register D0 holds the value of the variable a updated by Instruction 2 prior to the addition, and the executing unit 138 executes 24-bit data operation.

Instruction 6

The executing unit 138 writes the register D1's lower 8 bits at the address 001001 in the memory 130.

Instruction 7

The executing unit 138 reads out a 16-bit value, or the variable c, from the address 001002 in the memory 130 via the bus control unit 136 to sign-extend the same to 24 bits to be stored in the register D1.

Instruction 8

The executing unit 138 adds the register D0's content to the register D1's content by the ALU 141 to restore the result in the register D0. Note that the register D1 holds the value of the variable b updated by Instruction 5 prior to the addition, and the executing unit 138 executes a 24-bit data operation.

Instruction 9

The executing unit 138 writes the register D0's lower 16 bits at the address 001002 in the memory 130.

Instruction 10

The executing unit 138 reads out a 16-bit value, or the variable d, from the address 001004 in the memory 130 via the bus control unit 136 to zero-extend the same to 24 bits to be stored in the register D1.

Instruction 11

The execution unit 138 adds the register D1's content to the register D0's register by the ALU 141 to restore the result in the register D1. Note that the register D0 holds the value of the variable c updated by Instruction 8 prior to the addition, and the executing unit 138 executes a 24-bit data operation.

Instruction 12

The executing unit 138 writes the register D1's lower 16 bits at the address 001004 in the memory 130.

In this way, the C language program is compiled by the compiler 2, and the resulting object code is run by the computer 3. Since no overflow is compensated in this case, the code size is not increased nor the operation speed is reduced.

Overflow Compensation

The operation is substantially the same as the above case except that the code generating unit 122 compensates an overflow in Step 70 in FIG. 25. Thus, only the difference will be explained for simplification. Since the overflow is compensated only when an arithmetic operation instruction is generated in Step 27 in FIG. 19, the operation after the following four instructions in Step 70 are different, which will be detailed in the following:

| Instruction 2 : | ADD #1, D0 |
|---|---|
| Instruction 5 : | ADD D0, D1 |
| Instruction 8 : | ADD D1, D0 |
| Instruction 11: | ADD D0, D1 |

Overflow Compensation for Instruction 2

After Instruction 2 is generated (Step 26), the code generating unit 122 refers to the symbol table; for Instruction 2 is an arithmetic operation direction (Step 27 in FIG. 19) and an optional instruction for the overflow compensation has been entered (Step 70 in FIG. 25). At this point, the symbol table shown in FIG. 20B shows that the register D0 is allocated to the variable a in the register column, and that the register D0 subject to operation has the signed character variable a (Step 71). Accordingly, the code generating unit 122 judges that the variable a is the character variable (Step 72) and that the variable a is the signed variable (Step 73). Thus, the code generating unit 122 generates Instruction 2' of the least word length to sign-extend the 8-bit data in the register D0 to 24 bits (Step 74).

| Instruction 2' : | EXTXB | D0 |
|---|---|---|

Overflow Compensation for Instruction 5

After the generation of Instruction 5 (Step 26), the code generating unit 122 refers to the symbol table; for Instruction 5 is an arithmetic operation instruction (Step 27 in FIG. 19) and an optional direction for the overflow compensation has been entered (Step 70 in FIG. 25). At this point, the symbol table shown in FIG. 20B shows that the register D1 is allocated for the variable b in the register column, and that the register D1 subject to operation is the unsigned character variable b (Step 71). Accordingly, the code generating unit 122 judges that the variable b is a character variable (Step 72), and that it is an unsigned variable (Step 73). Thus, the code generating unit 122 generates Instruction 5' of the least word length to zero-extend the 8-bit data in the register D1 to 24 bits (Step 75).

| Instruction 5' : | EXTXBU | D1 |
|---|---|---|

Overflow compensation for Instruction 8

After the generation of Instruction 8 (Step 26), the code generating unit 122 refers to the symbol table; for Instruction 8 is an arithmetic operation direction (Step 27 in FIG. 19) and an optional instruction to compensate the overflow has been entered (Step 70 in FIG. 25). At this point, the symbol table shown in FIG. 20 shows that the register D0 is allocated for the variable c in the register column, and that the register D0 subject to operation is the signed integer variable c (Step 71). Accordingly, the code generating unit 122 judges that the variable c is an integer variable (Step 72), and that it is a signed variable (Step 76). Thus, the code generating unit 122 generates Instruction 8' of the least word length to sign-extend the 16-bit data in the register D0 to 24 bits (Step 77).

| Instruction 8 : | EXTX | D0 |
|---|---|---|

Overflow Compensation for Instruction 11

After the generation of Instruction 11 (Step 26), the code generating unit 122 refers to the symbol table; for Instruction 11 is an arithmetic operation instruction (Step 27 in FIG. 19) and an optional instruction for the overflow compensation has been entered (Step 70 in FIG. 25). At this point, the symbol table shown in FIG. 20 shows that the register D1 is allocated to the variable d in the register column, and that the register D1 subject to operation is the unsigned integer variable d (Step 71). Accordingly, the code generating unit 122 judges that the variable d is an integer variable (Step 72) and that it is an unsigned variable (Step 76). Thus, the code generating unit 122 generates Instruction 11' of the least word length to sign-extend the 16-bit data in the register D1 to 24 bits (Step 78).

| Instruction 11' : | EXTXU D1 |
|---|---|

In this way, the code generating unit 122 generates an object code as follows:

| Instruction 1 : | address 100000 | MOVB | @1000, D0 |
|---|---|---|---|
| Instruction 2 : | address 100004 | ADD | #1, D0 |
| Instruction 2' : | address 100006 | EXTXB | D0 |
| Instruction 3 : | address 100007 | MOVB | D0, @1000 |
| Instruction 4 : | address 10000a | MOVBU | @1001, D1 |
| Instruction 5 : | address 10000d | ADD | D0, D1 |
| Instruction 5' : | address 10000e | EXTXBU | D1 |
| Instruction 6 : | address 10000f | MOVB | D1, @1001 |
| Instruction 7 : | address 100012 | MOV | @1002, D0 |
| Instruction 8 : | address 100015 | ADD | @D1, D0 |
| Instruction 8' : | address 100016 | EXTX | D0 |
| Instruction 9 : | address 100017 | MOV | D0, @1002 |
| Instruction 10 : | address 10001a | MOVU | @1004, D1 |
| Instruction 11 : | address 10001e | ADD | D0, D1 |
| Instruction 11' : | address 10001f | EXTXU | D1 |
| Instruction 12 : | address 100020 | MOV | D1, @1004 |

Assume that Instructions 1–12 are allocated to 35 bytes, from the addresses 100000 to 100022, in the memory 130. Instructions 2', 5', 8', and 11' are the compensation instructions for the signed character variable a, unsigned character variable b, signed integer variable c, and unsigned integer variable d, respectively; they compensate overflows caused by Instructions 2, 5, 8, and 11 (add instruction), respectively.

The object code thus stored in the memory 130 is run by the computer 3 substantially in the same way as the overflow compensation case, and only the difference will be explained in the following.

Instruction 2'

The executing unit 138 sing extends the lower 8 bits in the register D0 by the first extender 144 to restore the result in the register D0.

Instruction 5'

The executing unit 138 zero-extends the lower 8 bits in the register D1 by the first extender 144 to restore the result in the register D1.

Instruction 8'

The executing unit 138 sign-extends the lower 16 bits in the register D0 by the second extender 145 to restore the result in the register D0.

Instruction 11'

The executing unit 138 zero-extends the lower 16 bits in the register D1 by the second extender 145 to restore the result in the register D1.

Thus, the overflows possibly caused by Instructions 2, 5, 8, and 11 will be compensated duly by the above operation under Instructions 2', 5', 8', and 11', respectively.

In this way, the C language program is compiled by the compiler 2, and the resulting object code is run by the computer 3. In this case, Instructions 8', 11' for the overflow compensation for the integer variables are generated. However, each instruction that includes Instructions 2', 5' respectively for the overflow compensation is of 1-byte word long, thus minimizing the code size increase and operation speed decrease.

As has been stated, when a user compiles an program which will not have the overflow, or when he avoids the overflow by checking a range of values for each variable, he only has to enter an optional direction for no overflow compensation to the compiler 2 to prevent the object code size from being increased and the operation speed from being slowed down independently of the variable type.

When the user can not avoid the overflow because the bit-width of the register unit 137 (24-bit) exceeds the integer bit width (16-bit), or when he is not aware of the overflow, i.e., when he enters an optional direction for the overflow compensation in the compiler 2, the object code size increases less and operation speed decreases less compared with the conventional compilers.

The ALU 141 may also serve as the first extender 144 and second extender 145 instead of installing these two components separately.

The address bus 131, the register unit 137, ALU 141, the first and second extenders 144, 145 in the computer 3, and the pointer variable used in the code generating unit 122 in the compiler 2 are all 24-bit wide in the foregoing embodiment. However, they can be of 17-bit to 31-bit wide depending on the size of the address space; the hardware exceeding the bit-width of the address will be utilized as well, saving the cost and running electricity.

The outputs from the address bus 131, register unit 137, ALU 141, first and second extenders 144, 145 in the computer 3, and the pointer variable used in the code generating unit 122 in the compiler 2 are not limited to 24-bit wide; likewise, the integer data variable used in the code generating unit 122 in the compiler 2 is not limited to 16-bit wide.

Assume that 24 is replaced with M and 16 is replaced N, where N is greater than M, the data processing system of the present invention can secure a $2^N$-byte address space, which exceeds $2^M$-byte address space.

The data variable whose bit-width is set by the parameter setting unit 123 is not limited to the integer data variable; it can be of any data variable available for the C language program.

(3) Data Transfer to Memory 130

The data-transfer operation by the data processing system constructed as above will be explained by referring to the transfer instruction shown in FIGS. 18A, 18B.

The transfer instruction shown in FIG. 18A instructs to transfer the 16-bit data in the register D1 to the memory 130 at an address designated by the address register A2.

1) The decoding unit 140 decodes the instruction in FIG. 18A as follows:

The operation field (OP) means a transfer instruction MOVE to the memory 130 from the data register; the source field (SRC) indicates the sending register is the register D1 and the destination field DEST indicates the receiving memory is designated by the register A2. As the result of the decoding, the decoding unit 140 outputs an activation signal to the bus control unit 136 by changing the source type ST to "0", source register number ST to "001", destination type to "1", and destination register number "010". At the same time, the selector 140b outputs the register information 171 by changing it to "0".

(2) In the register unit 137, the 16-bit data are read out from the data register D1 designated by ST="0" and SN="001"to be outputted through the output buffer gate 137f. The output data are held in the store buffer 136c at the bus control unit 136. Subsequently, the 24-bit data from the address register A2 designated by DT="1" and DN="010" to be outputted to the output buffer 137c. The output data are sent to the address buffer 136e via the selector 136f.

(3) The external access-width control unit 136j receives the register information 171 and judges the register to be transferred is one of the data registers based on the ST="0". Accordingly, the external access-width control unit 136j outputs the bit-width information 172 by setting it to "0" that specifies 16-bit data transfer to the sequencer 136i.

(4) The sequencer 136i receives the activation signal, and since the bit-width information exhibits "0", it then transfers the 16-bit data to the memory 130 in the following way.

The sequencer 136i directs to output an address held in the address buffer 136e to the address bus 131 via the buffer gate 136h, while selectively outputting the first byte (bit 7–0) of the data held in the store buffer 136c to the lower byte (bit 7–0) of the data bus 132 via the selector 136d, and the second byte (bit 15–8) to the higher byte (bit 15–8) of the data bus 132 to the memory 130. At the same time, the sequencer 136i outputs a control signal to the memory 130 to write the 16-bit data from the store buffer 136c therein.

In this way, the transfer instruction shown in FIG. 18A is executed.

A transfer instruction shown in FIG. 18B instructs to transfer the 24-bit data in the address register A1 to the memory 130 at the address designated by the address register A2.

(1) The decoding unit 140 decodes the instruction shown in FIG. 18B as follows:

The operation field (OP) means a transfer instruction MOVE to the memory 130 from the data register. SRC indicates that the sending register is the register A1, and DEST indicates the receiving memory is designated by the register A2. As the result of the decoding, the decoding unit 140 outputs an activation signal to the bus control unit 136 by changing the source type ST to "1", source register number SN to "001", destination type to "1", and the destination register number to "010". At the same time, the selector 140b outputs the register information 171 by changing it to "1".

(2) In the register unit 137, the 24-bit data are read out from the address register A1 designated by ST="1" and SN="001" to be outputted through the output buffer gate 137c. The output data are held in the store buffer 136c at the bus control unit 136. Subsequently, the 24-bit data from the address register A2 designated by DT="1" and DN="010" to be outputted to the output buffer 137c. The output data are sent to the address buffer 136e via the selector 136f.

(3) The external access-width control unit 136j receives the register information 171 and judges the register subject to transfer is one of the address registers based on the ST="1". Accordingly, the external access-width control unit 136j outputs the bit-width information 172 by setting it to "1"that specifies 24 bits to the sequencer 136i.

(4) The sequencer 136i receives the activation signal, and since the bit-width information exhibits "1", it transfers the 24-bit data by 16 bits and 8 bits to the memory 130 in the following way.

The sequencer 136i directs to output an address held in the address buffer 136e to the address bus 131 via the buffer gate 136h, while selectively outputting the first byte (bit 70) of the data held in the store buffer 136c to the lower byte (bit 7–0) of the data bus 132 to the memory 130 via the selector 136d, and the second byte (bit 15–8) to the higher byte (bit 15–8) of the data bus 132 to the memory 130. At the same time, the sequence 136i outputs a control signal to the memory 130 to write the 16-bit (bit 15–0) data from the store buffer 136c therein.

Once the 16-bit data are written into the memory 130, the sequencer 136i selects the output from the incrementer 136g to be held in the address buffer 136e by means of the selector 136f. Accordingly, the address buffer 136e holds an address incremented by two.

Subsequently, the sequencer 136i directs to output an address held in the address buffer 136e via the output buffer gate 136h, while selectively outputting the third byte (most significant byte; bit 23–16) of the data held in the store buffer 136c to the lower 8 bits (bit 7–0) in the data bus 132 to the memory 130 via the selector 136d. Although the higher byte (bit 15–8) in the data bus 132 is ineffective, there will be no trouble since the data are written per byte. The sequencer 136i then outputs a control signal to the memory 130 to write the third byte from the selector 136d into the memory 130.

In this way, the transfer instruction shown in FIG. 18B is executed.

As has been stated, the address register transfers 24-bit data while the data register transferring the 16-bit data. By so doing, the instruction obviates the size field, shortening the instruction length. Thus, the code size can be reduced and the decoding function for the size field can be eliminated.

The address and data registers are not limited to 24 bits; the external-access width may determine the bit widths of the address and data registers other than 24-bit and 16-bit, respectively; they can be of any arbitrary width. As well the destination can be designated by methods other than the address-register-indirect (@A2). Also, the data may be transferred between the register and the memory 130 in both ways; in case of 8- or 16-bit data transfer from the memory 130 to one of the registers, note that the 16-bit data are extended to 24-bit data by the third extender 136k.

The ST indicating the register type and the bit width information 172 are 1-bit signals; however, they may be 2- or more bit signals.

The bus control unit 136 transfers the 24-bit data in the order of the lower 2 bytes and the most significant 1 byte. However, the 24-bit data may be transferred in a reversed order. In this case, the sequencer 136i controls the selector 136d to select the data in the higher-to-lower order and incrementer 136g to decrement by two.

Further, an 8-bit data bus may be used instead of the 16-bit data bus 132. In this case, the memory 130 is accessed for two times and three times in case of the 16-bit and 24-bit data transfer, respectively.

(4) Data Transfer and Operation Including Immediate Data

Instructions including the immediate data are, for example, "MOVI #H0010, D0", or "ADDI #H0010, D0".

The fetching unit 139 activates the bus control unit 136 to sequentially read out the program instructions stored in the memory 130. The readout instructions are outputted to the decoding unit 140 via the fetching unit 139.

Figure 26:
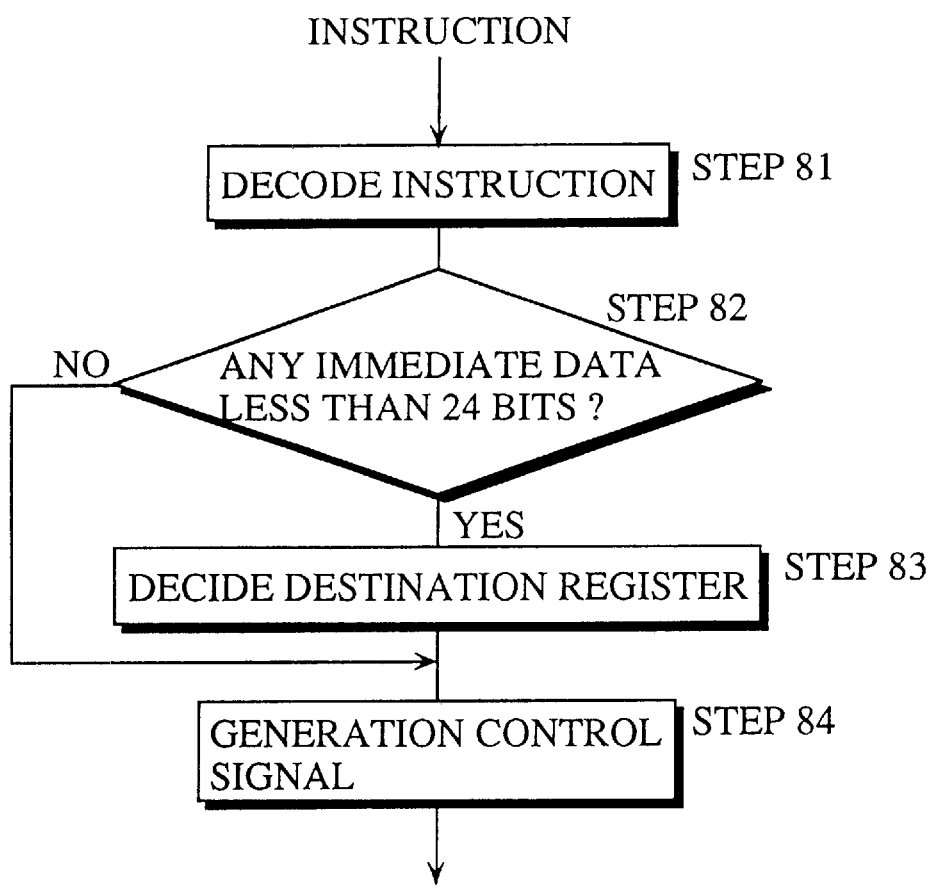
FIG. 26 is a flowchart detailing the operation of a decoding unit.

The decoding unit 140, which comprises a microprogram and a wired logic, processes the immediate data in a way detailed by a flowchart in FIG. 26. More precisely, the decoding unit 140 decodes the readout instruction (Step 81). As a result, the operation code designating an arithmetic operation, logic operation, inter-register-transfer, register-memory-transfer, or branch instruction, as well as the data, immediate data, register number, and an operand for the memory address are decoded. In accordance with the decoding result, the decoding unit 140 judges whether or not the instruction designates the less than 24-bit immediate data (Step 82). If so, the program proceeds to Step 83; otherwise to Step 84.

When the less than 24-bit immediate data are detected, whether the access register (destination register) for the instruction is one of the registers in the data register group 137d or address register group 137a is checked (Step 83).

Further, the decoding unit 140 outputs the control signals to the ALU 141, the first extender 144, and the second extender 145 depending on the type of destination register (Step 84).

The processor operates as follows for each instruction.

(1) Transfer the data between the registers in the data register group 137d and address register group 137a, or operate an instruction using the data stored in these registers. (For example, "MOVE D0, D1" or "ADD A0, A1")

In the former case, the 24-bit data read out from the source register are stored in the designated register.

In the latter case, 24-bit data readout from the two designated registers are entered in the ALU 141 and stored in the designated register after the designated operation.

(2) Store 16-bit immediate data in the data register group 137d or operate 16-bit immediate data with the data register group 137d (For example, "MOVI #H0010, D0" or "ADDI #H0010, D0")

In the former case, the decoding unit 140 decodes that the instruction designates the 16-bit immediate data, and that the destination register is one of the registers in the data register group 137d. Thus, the 16-bit immediate data are sign-extended to 24 bits by the second extender 145 to be stored in the designated data register.

Similarly, in the latter case, the 16-bit immediate data are sign-extended to 24 bits by the second extender 145 to be inputted one of the input terminals of the ALU to be calculated and stored in the designated data register.

(3) Store the 16-bit immediate data in the address register group 137a or operate the 16-bit immediate data with the address register group 137a (For example, "MOVI #H0010, A0", "ADDI #H0010, A0")

In the former case, the decoding unit 140 decodes that the instruction designates the 16-bit immediate data, and that the destination register is one of the registers in the address register group 137a. Thus, the 16-bit immediate data are zero-extended to 24 bits by the second extender 145 to be outputted to the designated address register.

Similarly, in the latter case, the 16-bit immediate data are zero-extended to 24 bits to be inputted into one of the input terminals of the ALU 141 further to be outputted to the designated address register group 137a after the designated operation.

Further, the operation involving the 16-bit immediate data will be explained. The same program used in the related art will be used.

A corresponding program to the programs shown in FIGS. 5, 8 is shown in FIG. 27; only the address length is 24 bits herein. The program is to add up the sixteen data stored from the addresses H8000 to the H8100 (H represents hexadecimal and each address is H10 addresses away), and store the addition result at the address H100000.

Instruction 1: Clear a data register D0

Instruction 2: Set 16-bit immediate data H8000 to an address register A0

As the decoding unit 140 decodes this instruction by referring to FIG. 26 (Step 81), and judges that the instructions use 16-bit immediate data H8000 (Step 82). Further it judges that the instruction is the instruction to transfer the immediate data into one of the registers in the address register group 137a (Step 83). Thus, the decoding unit 140 outputs the control signal to the second extender 145 by means of the decoding unit 140 (Step 84). Accordingly, the second extender 145 zero-extends the 16-bit immediate data H8000 to 24-bit data H008000 to be held in the address register A0.

Instruction 3: Read out the content in an address designated by the address register A0 to store the same into a data register D1.

Instruction 4: Add the content in the data register D1 to that of the register D0.

Instruction 5: Add the address register A0 and immediate H0010 to store the result into the address register A0.

This instruction uses the 16-bit immediate data H0010 and instruct to transfer the immediate data in the address resigner A0. Thus, the decoding unit 140 outputs the control signal to the second extender 145 by means of the decoding unit 140. Accordingly, the second extender 145 zero-extends the 16-bit immediate data H0010 to 24-bit data H000010 to be outputted to one of the input terminals of the ALU 141.

Also, upon the receipt of the control signal from the decoding unit 140, data H008000 stored in the address register A0 is read out to be outputted to the other input terminal of the ALU 141.

Thus, the ALU 141 adds the H008000 and H000010, both being 24-bit data, to store the result in the address register A0.

Instruction 6: Compare the output data with immediate data H8100.

This instruction uses 16-bit immediate data H8100 and instructs the comparison with the data in the address register A0. Thus, the decoding unit 140 outputs the control signal to the second extender 145 first. Accordingly, the second extender 145 zero-extends the 16-bit immediate data H8100 to 24-bit data H008100 in accordance with the control signal to be outputted to one of the input terminals of the other ALU 141.

Further, the address register 105b, upon the receipt of the control signal from the control signal generating unit 103a, reads out the 24-bit data H008010 from the address register A0 to output the same to the other input terminal of the ALU 141.

The ALU 141 compares the two input 24-bit data.

Instruction 7: When the former is smaller than the latter, return to Instruction 3 labeled A; otherwise, proceed to Instruction (8).

The loop of Instructions 3–7 is repeated until the initial value of the address register A0, H008000 is incremented up to H008100 by H0000010. Thus, the sequence proceeds to Instruction 8 when the result of the sixteen addition operations has been stored into the data register D0.

Instruction 8: Store the content of the data register D0 into the address H100000 in the memory 130.

As has been stated, Instructions 2, 6 use the 16-bit immediate data while designating 24-bit addresses without causing any unexpected extension. For example, if 16-bit immediate data H8000-HFFFF are designated to designate the 24-bit addresses H008000-HFFFF, they are not extended to 24-bit HFF8000-HFFFFFF as are in the conventional processor. As a result, the program size can be reduced compared with the conventional program.

Further, in the system where the instruction and data are accessed by the same bus, the operation speed can be increased because the conflict in the bus access is reduced.

Note that, unlike the foregoing embodiment, an address register of N(16, 32 etc) bits can be used for M(4, 8, 16 etc) bits immediate data, as long as the former is greater than the latter.

(5) Conditional Branch

In FIG. 13, the fetching unit 139 activates the bus control unit 136 to obtain the instruction from the memory 130.

Then, the decoding unit 140 decodes the obtained instruction; the one shown in FIG. 16B is used herein.

The decoding unit 140 decodes the instruction and outputs the control signal to the ALU 141, register unit 137 and bus control unit 136 based on the kind of operation and the destination register for the operation data.

In case of the data operation instruction, the ALU 141 refers to one of the first flag group 151 and second flag group 152 whichever predetermined to operate the readout data from the register unit 137. The operation result is stored in the register unit 137, and the predetermined flags are changed in both the first and second flag groups 151, 152.

In case of conditional branch instruction, the decoding unit 140 outputs either the 16-bit or 24-bit data-width designating information (flag group designation) to the selector 153–156 in the branch judging unit 143 shown in FIG. 15. The selectors 153–156 selects either the first or second flag groups 151, 152 in accordance with the flag group designating information. The condition judging unit 157 refers to the flag groups from the selector 153–156 to judge whether the branch condition is taken or not.

In this way, the data processing system can selectively designate the flag group with the consideration of the data operation width under the conditional branch and not under the data operation instruction. By so doing, the number of allocations for the operation code can be increased. For example, the add/subtract/compare instructions shown in FIG. 16B designate the type of operation with the first 8 bits, and thus enabling $2^8$ (=256) allocations. With the conditional branch instruction, one bit is added to designate the bit width besides the 4-bit branch condition, enabling $2^3$ (=8) allocations. Thus, 264 (256+8) allocations are available in total.

Figures 1, 2:
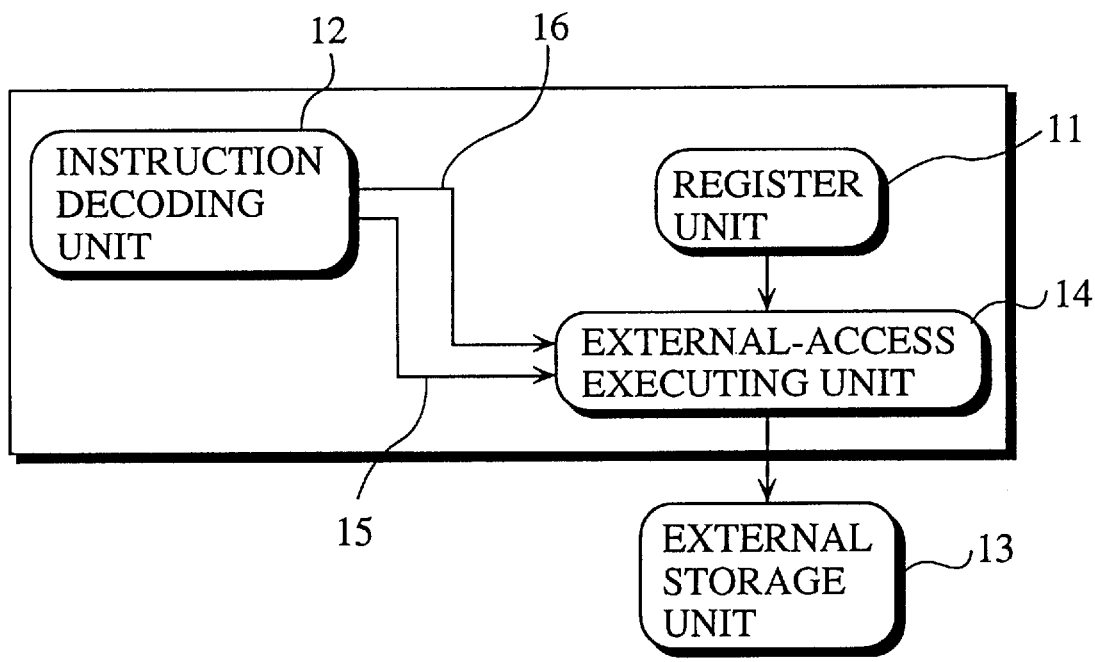
FIG. 1 is a block diagram depicting a structure of the second conventional processor.
FIG. 2 is a view showing an instruction format for the second conventional processor.
Figure 3:
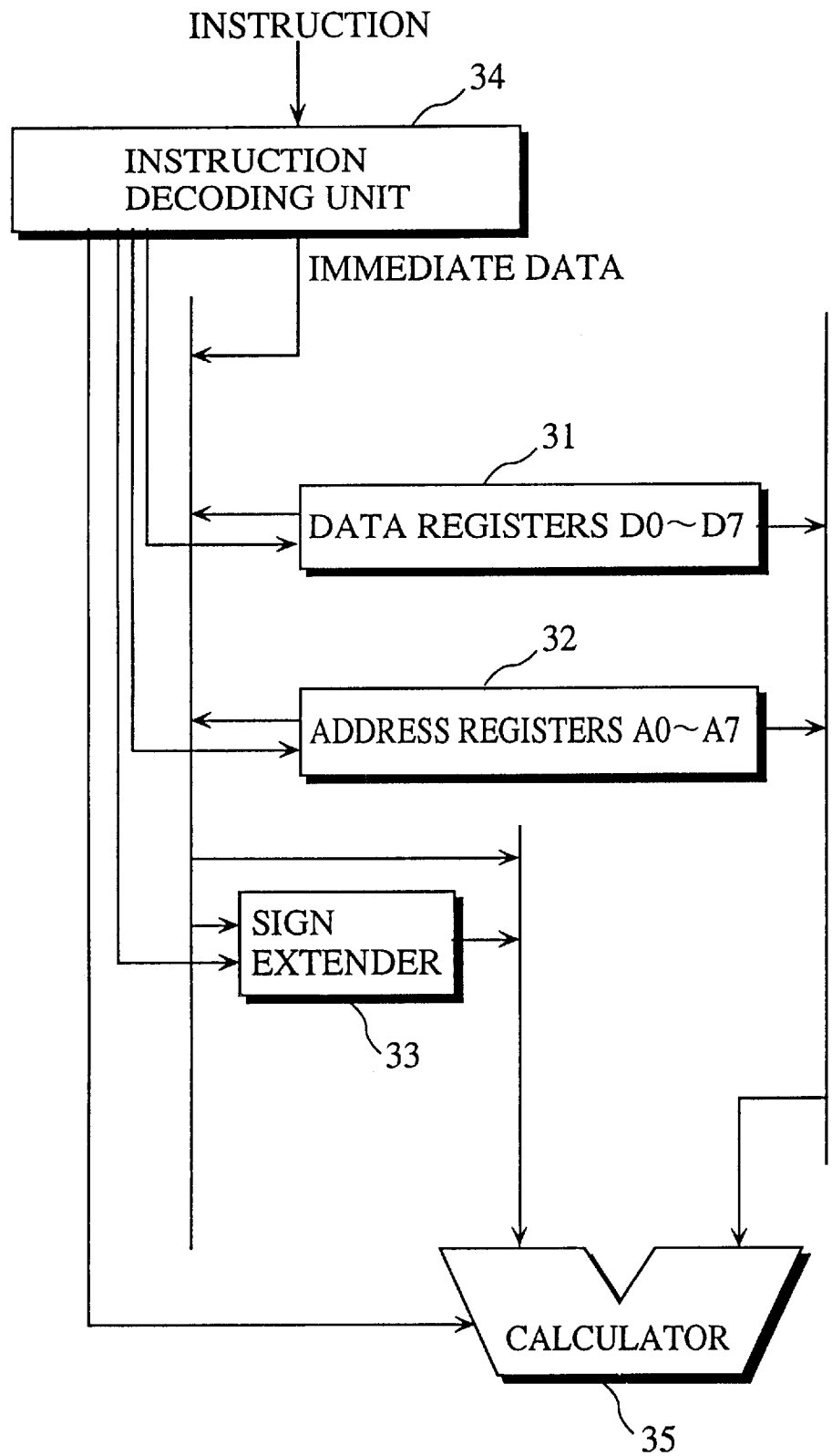
FIG. 3 is a block diagram depicting a structure of the third conventional processor.

On the other hand, in the second conventional processor shown in FIG. 2, $2^7$ (=128) allocations and $2^4$ (=16) allocations are available for the add etc. and conditional branch instructions respectively, making a total of 144 allocations. This means that 120 allocations are increased. In other words, when the same instruction set is allocated, the number of instructions can be reduced to a half while simplifying the structure of the decoding unit 140 that decodes the bit-width designation, because bit-width designation can be eliminated in the operation code in the add/subtract/compare instructions.

Further, when the ALU 141's bit-width (N-bit) is not the two's power ($2^P$) and the flags are changed in accordance with the result of the two's-power-bit (less than N) data operation, a user can utilize one of the flag groups for a data operation whose bit-width is two's power and greater than N. For example, the user can use the 24-bit calculator using the flag group changed in accordance with the results of the 16-bit data operations to realize the 32-bit data operation; the data widths of the ALU 141 can be determined independently of the data bit-width.

Also, since the two groups of flag are changed simultaneously, using the flag group of the concerned bit width eliminates the overhead, which is described in the fifth convectional processor, at the execution of the conditional branch.

Note that the flag group can be made to the data of any bit-width.

A new operation code may be generated to designate the flag group prior to the conditional branch instruction instead of designating the bit-width by the conditional branch instruction.

Further, the calculator can be of 24-bit wide or any other arbitrary bit-width.

Although the present invention has been fully described by way of example with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A program converting unit for generating a machine language instruction from a source program for a microprocessor having an address width N and a data width M, N being greater than M, N and M being inputs to the program converting unit as specified by a user, the value of N depending on a program size of the source program, said program converting unit comprising:

parameter holding means for holding a data width M and a pointer width N, said data width M representing the number of bits of data used in the source program, said pointer width N representing the number of bits of an address, said N and M being input by a user during an execution of the program converting unit, the value of N depending on the program size; and generating means for generating an instruction to manage said data width M when a variable operated by said instruction represents the data, and for generating an instruction to manage said pointer width N when a variable operated by said instruction represents the address, wherein the program converting unit generates a unique set of machine language instructions from the source program for each N specified by the user.

2. The program converting unit of claim 1, wherein said M is 16 and said N is in a range of integers from 17 to 31 inclusive, said N being determined depending on the program size as follows:

N=17, when the program size≦128 Kbytes
N=18, when the program size≦256 Kbytes
N=19, when the program size≦512 Kbytes
N=20, when the program size≦1 Mbyte
N=21, when the program size≦2 Mbytes
N=22, when the program size≦4 Mbytes
N=23, when the program size≦8 Mbytes
N=24, when the program size≦16 Mbytes
N=25, when the program size≦32 Mbytes
N=26, when the program size≦64 Mbytes
N=27, when the program size≦128 Mbytes
N=28, when the program size≦256 Mbytes
N=29, when the program size≦512 Mbytes
N=30, when the program size≦1 Gbyte
N=31, when the program size≦2 Gbytes.

3. The program converting unit of claim 1, wherein said generating means includes:

determining means for determining a kind of the machine language instruction, the machine language instruction including (1) an instruction to access to a memory, (2) an instruction to use a register, and (3) an instruction to use an immediate;

memory managing means for outputting a direction, in case of the (1) instruction, to manage said data width as an effective memory-access width when a variable to be accessed represents the data, and to manage said pointer width as an effective memory-access width when said variable represents the address;

register managing means for outputting a direction, in case of the (2) instruction, to manage said data width as an effective bit-width when a variable to be read/written from/into the register represents the data, and to manage said pointer width as the effective bit-width when said variable represents the address;

immediate managing means for outputting a direction, in case of the (3) instruction, to manage said data width as the effective bit-width when said immediate represents the data, and to manage said pointer width as the effective bit-width when said immediate represents the address; and code generating means for generating the machine language instruction in accordance with the directions from said memory managing means, said register managing means, and said immediate managing means.

4. The program converting unit of claim 3, wherein said M is 16 and said N is an integer in a range of 17 to 31 inclusive.

5. The program converting unit of claim 4, wherein:

said N is 24; and said code generating means generates an instruction for a 24-bit data operation when said pointer width is greater than 16 bits and less than 24 bits, and generates an instruction for a 16-bit data operation when said pointer width is 16 bits or less.

6. A program converting unit for generating a machine language instruction based on a source program for a processor that manages an N-bit address while processing M-bit data, N being greater than M, said program converting unit comprising:

syntax analyzing means for analyzing a syntax of the source program to convert the same into an intermediary language comprising intermediary instructions, and subsequently for judging whether or not each variable contained in said intermediary instructions represents data used in an address;

table generating means for generating a table for each variable in said intermediary instructions, said table holding a name together with a type of each variable, said type representing one of the data and the address;

parameter holding means for holding a data width and a pointer width, said pointer width designated by a user as an input during an execution of the program converting unit, said data width representing the number of bits of the data while said pointer width represents the number of bits of the address; and generating means for generating an instruction to manage said data width when the variable in said intermediary instruction represents the data, and an instruction to manage said pointer width when said variable represents the address.

7. The program converting unit of claim 6, wherein said M is 16 and said N is an integer in a range of 17 to 31 inclusive.

8. The program converting unit of claim 6, wherein said generating means includes:

judging means for judging a kind of the machine language instruction, the machine language instruction including (1) an instruction to access to an memory, (2) an instruction to use a register, and (3) an instruction to use an immediate;

memory managing means for outputting a direction, in case of the (1) instruction, to manage a corresponding bit-width held in said parameter holding means as an effective memory-access width depending on the type of a variable to be accessed shown in said table;

register managing means for outputting a direction, in case of the (2) instruction, to manage a corresponding bit-width held in said parameter holding means as an effective bit-width depending on the type of a variable to be read/written from/in the register shown in said table;

immediate managing means for outputting a direction, in case of the (3) instruction, to manage a corresponding bit-width held in said parameter holding means for the immediate as an effective bit-width depending on the type of the immediate shown in said table; and code generating means for generating the machine language instruction in accordance with the directions from said memory managing means, said register managing means, and said immediate managing means.

9. The program converting unit of claim 8, said M is 16 and said N is an integer in a range of 17 to 31 inclusive.

10. The program converting unit of claim 9, wherein:

said N is 24; and said code generating means generates an instruction for a 24-bit data operation when said pointer width is greater than 16 bits and less than 24 bits, and generates an instruction for a 16-bit data operation when said pointer width is 16 bits or less.

11. A program converting unit for generating a machine language instruction based on a source program for a processor that manages an N-bit address while processing M-bit data, N being greater than M, said program converting unit comprising:

syntax analyzing means for analyzing a syntax of the source program to convert the same into an intermediary language comprising intermediary instructions, and subsequently for judging whether or not each variable contained in said intermediary instructions represents data used in an address;

table generating means for generating a table for each variable in said intermediary instructions, said table holding a name together with a type of each variable, said type representing one of the data and the address;

parameter holding means for holding a data width and a pointer width designated by a user, said data width representing the number of bits of the data while said pointer width representing the number of bits of the address;

judging means for judging a kind of the machine language instruction, the machine language instruction including (1) an instruction to access to an memory, (2) an instruction to use a register, and (3) an instruction to use an immediate;

memory managing means for outputting a direction, in case of the (1) instruction, to manage a corresponding bit-width held in said parameter holding means as an effective memory-access width depending on the type of a variable to be accessed shown in said table;

register managing means for outputting a direction, in case of the (2) instruction, to manage a corresponding bit-width held in said parameter holding means as an effective bit-width depending on the type of a variable to be read/written from/in the register shown in said table;

immediate managing means for outputting a direction, in case of the (3) instruction, to manage a corresponding bit-width held in said parameter holding means for the immediate as an effective bit-width depending on the type of the immediate shown in said table; and code generating means for generating the machine language instruction in accordance with the directions from said memory managing means, said register managing means, and said immediate managing means.

12. The program converting unit of claim 11, wherein said code generating means generates an instruction for a 24-bit data operation when said pointer width is greater than 16 bits and less than 24 bits, and generates an instruction for a 16-bit data operation when said pointer width is 16 bits or less.

13. A program converting unit for generating a machine language instruction from a source program for an embedded microprocessor series that manages an N-bit address while processing M-bit data, N being greater than M, N being an input to the program converting unit depending on a program size, said program converting unit comprising:

parameter holding means for holding a data width M and a pointer width N, said data width M representing the number of bits of data used in the source program, said pointer width N representing the number of bits of an address, said N being input by a user during an execution of the program converting unit, the value of N depending on the program size;

generating means for generating an instruction to manage said data width M when a variable operated by said instruction represents the data, and for generating an instruction to manage said pointer width N when a variable operated by said instruction represents the address;

option directing means for holding a user's direction for an overflow compensation, an overflow being possibly caused by an arithmetic operation; and compensate instruction generating means for generating a compensation instruction to compensate an overflow in accordance with a type of a variable used in the arithmetic operation, said compensation instruction being generated when an effective bit-width of a variable designated by an operand is shorter than a register of N-bit wide and the arithmetic operation instruction will possibly cause an overflow exceeding said effective bit-width; and prohibition means for prohibiting a generation of a compensation instruction by the compensate instruction generating means when the option directing means is storing an indication denoting not to compensate, wherein the program converting unit converts the source program into one of a plurality of different machine language programs depending on the values of N and M.

14. The program converting unit of claim 13, wherein said M is 16 and said N is an integer in a range of 17 to 31 inclusive.

15. The program converting unit of claim 13, wherein said M is 32, and said N is an integer in a range of 33 to 63 inclusive.

16. The program converting unit of claim 13, wherein said compensate instruction generating means includes:

instruction judging means for judging an arithmetic operation instruction that will possibly cause an overflow for all the machine language instructions when said option instructing means holds the user's direction for executing the overflow compensation;

variable judging means, with respect to a variable in the arithmetic operation instruction judged by said instruction judging means, for judging an effective bit-width and whether said variable is signed or unsigned by referring to said table;

sign-extension instruction generating means for generating a compensation instruction in case of a signed variable, a logical value of a sign bit being filled into all bits higher than the effective bit-width in a register that is to store said signed variable by said sign-extension compensation instruction; and zero-extension instruction generating means for generating a zero-extension compensation instruction in case of an unsigned variable, a logical value "0" being filled into all bits higher than the effective bit width in a register that is to store said unsigned variable by said zero-extension compensation instruction.

17. The program converting unit of claim 16, wherein said generating means includes:

determining means for determining a kind of the machine language instruction, the machine language instruction including (1) an instruction to access to a memory, (2) an instruction to use a register, and (3) an instruction to use an immediate;

memory managing means for outputting a direction, in case of the (1) instruction, to manage said data width as an effective memory-access width when a variable to be accessed represents the data, and to manage said pointer width as an effective memory-access width when said variable represents the address;

register managing means for outputting a direction, in case of the (2) instruction, to manage said data width as an effective bit-width when a variable to be read/written from/into the register represents the data, and to manage said pointer width as the effective bit-width when said variable represents the address;

immediate managing means for outputting a direction, in case of the (3) instruction, to manage said data width as the effective bit-width when said immediate represents the data, and to manage said pointer width as the effective bit-width when said immediate represents the address; and code generating means for generating the machine language instruction in accordance with the directions from said memory managing means, said register managing means, and said immediate managing means.

18. The program converting unit of claim 17, wherein said M is 16 and said N is an integer in a range of 17 to 31 inclusive.

19. The program converting unit of claim 17, wherein said M is 32, and said N is an integer in a range of 33 to 63 inclusive.

20. A program converting unit for generating a machine language instruction based on a source program for a processor that manages an N-bit address while processing M-bit data, N being greater than M, said program converting unit comprising:

syntax analyzing means for analyzing a syntax of the source program to convert the same into an intermediary language comprising intermediate instructions, and subsequently for judging whether or not each variable contained in said intermediary instructions represents data used in an address;

table generating means for generating a table for each variable in said intermediary instructions, said table holding a name together with a type of each variable, said type representing one of the data and the address, and one of signed and unsigned data;

parameter holding means for holding a data width and a pointer width designated by a user during an execution of the program converting unit, said data width representing the number of bits of the data, said pointer width representing the number of bits of the address;

option directing means for holding a user's direction for an overflow compensation, an overflow being possibly caused by an arithmetic operation;

generating means for generating an instruction to manage said data width when the variable in said intermediary instruction represents the data, and an instruction to manage said pointer width when said variable represents the address; and compensate instruction generating means for generating a compensation instruction to compensate an overflow in accordance with a type of a variable used in the arithmetic operation, said type being judged when said option directing means holds the user's direction for executing the overflow compensation, said compensation instruction being generated when an effective bit-width of a variable designated by an operand is shorter than a register of N-bit wide and the arithmetic operation instruction will possibly cause an overflow exceeding said effective bit-width; and prohibition means for prohibiting a generation of a compensation instruction by the compensate instruction generating means when the option directing means is storing an indication denoting not to compensate.

21. The program converting unit of claim 20, wherein said M is 16 and said N is an integer in a range of 17 to 31 inclusive.

22. The program converting unit of claim 21, wherein said M is 16 and said N is an integer in a range of 17 to 31 inclusive.

23. The program converting unit of claim 21, wherein said M is 32, and said N is an integer in a range of 33 to 63 inclusive.

24. The program converting unit of claim 20, wherein said M is 32, and said N is an integer in a range of 33 to 63 inclusive.

25. The program converting unit of claim 20, wherein said compensate instruction generating means includes:

instruction judging means for judging an arithmetic operation instruction that will possibly cause an overflow for all the machine language instructions when said option instructing means holds the user's direction for executing the overflow compensation;

variable judging means, with respect to a variable in the arithmetic operation instruction judged by said instruction judging means, for judging an effective bit-width and whether said variable is signed or unsigned by referring to said table;

sign-extension instruction generating means for generating a compensation instruction in case of a signed variable, a logical value of a sign bit being filled into all bits higher than the effective bit-width in a register that is to store said signed variable by said sign-extension compensation instruction; and zero-extension instruction generating means for generating a zero-extension compensation instruction in case of an unsigned variable, a logical value "0" being filled into all bits higher than the effective bit width in a register that is to store said unsigned variable by said zero-extension compensation instruction.

26. The program converting unit of claim 25, wherein said generating means includes:

determining means for determining a kind of the machine language instruction, the machine language instruction including (1) an instruction to access to an memory, (2) an instruction to use a register, and (3) an instruction to use an immediate;

memory managing means for outputting a direction, in case of the (1) instruction, to manage a corresponding bit-width held in said parameter holding means as an effective memory-access width depending on the type of a variable to be accessed shown in said table;

register managing means for outputting a direction, in case of the (2) instruction, to manage a corresponding bit-width held in said parameter holding means as an effective bit-width depending on the type of a variable to be read/written from/in the register shown in said table;

immediate managing means for outputting a direction, in case of the (3) instruction, to manage a corresponding bit-width held in said parameter holding means for the immediate as an effective bit-width depending on the type of the immediate shown in said table; and code generating means for generating the machine language instruction in accordance with the directions from said memory managing means, said register managing means, and said immediate managing means.

27. A program converting unit for generating a machine language instruction based on a source program for a processor that manages an N-bit address while processing M-bit data, N being greater than M, said program converting unit comprising:

syntax analyzing means for analyzing a syntax of the source program to convert the same into an intermediary language comprising intermediary instructions, and subsequently for judging whether or not each variable contained in said intermediary instructions represents data used in an address;

table generating means for generating a table for each variable in said intermediary instructions, said table holding a name together with a type of each variable, said type representing one of the data and the address, and one of signed and unsigned data;

parameter holding means for holding a data width and a pointer width designated by a user during an execution of the program converting unit, said data width representing the number of bits of the data, said pointer width representing the number of bits of the address;

option directing means for holding a user's direction for an overflow compensation, an overflow being possibly caused by an arithmetic operation;

generating means for generating an instruction to manage said data width when the variable in said intermediary instruction represents the data, and an instruction to manage said pointer width when said variable represents the address;

compensate instruction generating means for generating a compensation instruction to compensate an overflow in accordance with a type of a variable used in the arithmetic operation, said type being judged when said option directing means holds the user's direction for executing the overflow compensation, said compensation instruction being generated when an effective bit-width of a variable designated by an operand is shorter than a register of N-bit wide and the arithmetic operation instruction will possibly cause an overflow exceeding said effective bit-width; and prohibition means for prohibiting a generation of a compensation instruction by the compensate instruction generating means when the option directing means is storing an indication denoting not to compensate, wherein said generating means includes:

determining means for determining a kind of the machine language instruction, the machine language instruction including (1) an instruction to access to a memory, (2) an instruction to use a register, and (3) an instruction to use an immediate;

memory managing means for outputting a direction, in case of the (1) instruction, to manage a corresponding bit-width held in said parameter holding means as an effective memory-access width depending on the type of a variable to be accessed shown in said table;

register managing means for outputting a direction, in case of the (2) instruction, to manage a corresponding bit-width held in said parameter holding means as an effective bit-width depending on the type of a variable to be read/written from/in the register shown in said table;

immediate managing means for outputting a direction, in case of the (3) instruction, to manage a corresponding bit-width held in said parameter holding means for the immediate as an effective bit-width depending on the type of the immediate shown in said table; and code generating means for generating the machine language instruction in accordance with the directions from said memory managing means, said register managing means, and said immediate managing means, and wherein said compensate instruction generating means includes:
instruction judging means for judging an arithmetic operation instruction that will possibly cause an overflow for all the machine language instructions when said option instructing means holds the user's direction for executing the overflow compensation;
determining means, with respect to a variable in the arithmetic operation instructions determined by said instruction determining means, for determining an effective bit-width and whether said variable is signed or unsigned by referring to said table;
sign-extension instruction generating means for generating a compensation instruction in case of a signed variable, a logical value of a sign bit being filled into all bits higher than the effective bit-width in a register that is to store said signed variable by said sign-extension compensation instruction; and
zero-extension instruction generating means for generating a zero-extension compensation instruction in case of an unsigned variable, a logical value "0" being filled into all bits higher than the effective bit width in a register that is to store said unsigned variable by said zero-extension compensation instruction.

28. A processor for processing data in accordance with instructions in a program comprising:
register means including a plurality of register groups, each group being identical in bit-width while being different in types;
instruction decoding means for decoding an instruction to output register information indicating a register designated by an operand contained in a data-transfer instruction;
external-access-width control means for outputting the number of effective bits as bit-width information indicating a bit-width of transmission data in accordance with a kind of a register group to which said designated register belongs; and
external-access executing means for executing data transfer between said designated register and an external memory in accordance with said register information and said bit-width information.

29. The processor of claim 28, wherein said register means includes:
an address register group including a plurality of address registers holding addresses; and
a data register group including a plurality of data registers holding data.

30. The processor of claim 29, wherein
said external-access-width control means, as the bit-width information, outputs a bit-width determined in accordance with the effective bit-width of the data used in the program when said register information represents the data registers, and outputs a bit-width determined in accordance with a sufficiently large address space for a program size and data area size of the program when said register information represents the address registers.

31. The processor of claim 29, wherein:
the address registers and data registers in said register means are all 24-bit wide;
said instruction decoding means outputs information that represents one of the address register and the data register as the register information;

said external-access-width control means outputs the bit-width information exhibiting 24 bits when the register information representing the address register, and outputs the bit-width information exhibiting 16 bits when the register information representing the data register; and
the external-access executing means executes the data transfer three times and twice for the 24- and 16-bit-width information respectively for an 8-bit-width external memory, and for twice and once for the 24- and 16-bit-width information respectively for a 16-bit-width external memory.

32. The processor of claim 31, wherein said access executing means includes:
an address generating circuit for holding an address designated by the data-transfer instruction to output one of a byte address and a word address to the external memory;
an output data buffer for holding write data designated by the data-transfer instruction to output the same one of per byte and per word to the external memory;
an input data buffer for holding data from read out from the external memory; and
a sequence circuit for outputting a byte address to said address generating circuit for an 8-bit-width external memory while controlling the number of times for the data-transfer in accordance with the bit-width information via the input/output data buffers with respect to the read/write data, for outputting a word address to said address generating circuit for a 16-bit-width external memory while controlling the number of times for the data-transfer in accordance with the bit-width information via the input/output data buffers with respect to the read/write data.

33. The processor of claim 29, wherein:
the address registers and data registers in said register means are all 32-bit wide;
said instruction decoding means outputs register information indicating whether the instruction uses the address register or data register;
said external-access-width control means outputs the bit-width information exhibiting 24 bits when the register information representing the address register, and outputs the bit-width information exhibiting 16 bits when the register information representing the data register; and
the external-access executing means executes the data transfer three times and twice for the 24- and 16-bit-width information respectively for an 8-bit-width external memory, and for twice and once for the 24- and 16-bit-width information respectively for a 16-bit-width external memory.

34. The processor of claim 33, wherein said access executing means includes:
an address generating circuit for holding an address designated by the data-transfer instruction to output one of a byte address and a word address to the external memory;
an output data buffer for holding write data designated by the data-transfer instruction to output the data one of per byte and per word to the external memory;
an input data buffer for holding data read out from the external memory; and
a sequence circuit for controlling said address generating circuit to output the byte address for an 8-bit-width external memory while controlling the input and output data buffers to input and output the byte data to transfer the read/write data to the external memory in a matching number of times to the bit-width of the external memory, and for controlling said address generating circuit to output the word address for a 16-bit-width external memory while controlling the input and output data buffers to input and output the word data to transfer the read/write data to the external memory in a matching number of times for the bit-width of the external memory.

35. A processor for operating certain data in accordance with an instruction in a program, comprising:

a first register means for holding N-bit data;

a second register means for holding N-bit data;

sign-extending means for extending said M-bit data to N bits by copying an MSB of said M-bit data in a direction of an upper order, M being less than N;

zero-extending means for extending said M-bit data to N bits by copying a value "0" in a direction of an upper order;

operating means for operating an arithmetic operation in accordance with an instruction;

instruction control means for decoding an instruction to zero-extend M-bit immediate data when said M-bit immediate data are to be stored in said first register means by the decoded instruction and to sign-extend said M-bit immediate data when said M-bit immediate data are to be stored in said second register means by the decoded instruction, said zero-extended and sign-extended N-bit immediate data being outputted in one of two methods, one method being to send the extended N-bit immediate data from their respective extending means to their respective register means directly, the other being to send the same via the operating means to their respective register means, with said instruction including an indication for storing in the first register means and said instruction including an indication for storing in the second register means being of two different kinds of instructions, both kinds of instructions having a same operation code but having different destination operands.

36. The processor of claim 35, wherein said first register means is a group of a plurality of address registers for storing addresses, and said second register means is a group of a plurality of register means for storing data.

37. The processor of claim 36, wherein said N is 24 and said M is 16.

38. A processor for operating certain data in accordance with an instruction in a program, comprising:

a first register means for holding N-bit data;

a second register means for holding N-bit data;

sign-extending means for extending said M-bit data to N bits by copying an MSB of said M-bit data in a direction of an upper order, M being less than N;

zero-extending means for extending said M-bit data to N bits by copying a value "0" in a direction of an upper order;

operating means for operating an arithmetic operation in accordance with an instruction;

instruction decoding means for decoding an instruction in the program to detect a first type instruction and a second type instruction, said first type instruction including an instruction to store M-bit immediate data into said first register means, said second type instruction including an instruction to store said M-bit immediate data into said second register means; and control means for outputting said M-bit immediate data to said zero-extending means when the first type instruction is detected, and for outputting said M-bit immediate data to said sign-extending means when the second type instruction is detected, said zero-extended N-bit immediate data and sign-extended N-bit immediate data being outputted in one of two methods, one method being to send the extended N-bit immediate data from their respective extending means to their respective register means directly, the other being to send the same via the operating means to their respective register means, with said first-type instruction and said second-type instruction both having a same operation code but having different destination operands.

39. The processor of claim 38, wherein said first register means is a group of a plurality of address registers for storing addresses, and said second register means is a group of a plurality of register means for storing data.

40. The processor of claim 39, wherein said first type instruction includes a data-transfer instruction to store the M-bit immediate data to said first register means, an add instruction to add a value in said first register and the M-bit immediate data, and a subtract instruction to subtract the M-bit immediate data from a value in said first register, and said second type instruction includes a data-transfer instruction to store the M-bit immediate data to said second register means, an add instruction to add a value in said second register and the M-bit immediate data, and a subtract instruction to subtract the M-bit immediate data from a value in said second register.

41. The processor of claim 40, wherein said N is 24 and said M is 16.

42. A data processing method for executing an instruction that includes an operation code to store M-bit immediate data in an N-bit first register and an N-bit second register, both M and N being integers, with M being less than N, said method comprising the steps of:

decoding the instruction for selecting one of the first register and second register in accordance with an operand of the decoded instruction;

zero-extending said M-bit immediate data to N bits when said decoded instruction designates the first register, and sign-extending said M-bit immediate data to N bits when said decoded instruction designates the second register; and storing extended N-bit immediate data to the designated register.

43. The method of claim 42, wherein said first register means is a group of a plurality of address registers for storing addresses, and said second register means is a group of a plurality of register means for storing data.

44. The method of claim 43, wherein said N is 24 and said M is 16.

45. A processor being one out of an embedded processor series of processors with different address bit widths, having an address bit width which can be input by a user in accordance with program size, comprising:

memory means for storing a program including an N-bit data arithmetic operation instruction and other instructions operating both N-bit and M-bit data, N being greater than M, as well as for storing a program including conditional branch instructions, transfer instructions for external memory and instructions using immediate data;

a first register means including a plurality of registers for holding N-bit data;

a second register means including a plurality of registers for holding N-bit data;

a program counter for holding an N-bit instruction address to output the same to said memory means;

fetching means for fetching an instruction from an external memory using the instruction address from said program counter;

instruction decoding means for decoding a fetched instruction;

executing means for executing all arithmetic operation instructions at N-bit length and for executing instructions operating both N-bit and M-bit data excluding the arithmetic operation instructions;

a plurality of flag storing means, each for storing a corresponding flag group changed in response to different bit-widths data in accordance with an execution result of said executing means;

flag selecting means for selecting a certain flag group from said plurality of flag storing means in accordance with a conditional branch instruction decoded by said instruction decoding means;

branch judging means for judging whether a branching is taken or not with a reference to a flag group selected by said flag selecting means;

sign-extending means for extending M-bit data to N bits by copying an MSB of said M-bit data in a higher order;

zero-extending means for extending M-bit data to N bits by filling a value "0" in a higher order;

compensation instruction control means for compensating contents of said first register means and said second register means using said sign-extending means and said zero-extending means in accordance with a compensation instruction inserted after a machine language instruction for an arithmetic operation that will possibly cause an overflow, said machine language instruction being decoded by said instruction decoding means;

external-access-width control means for outputting bit-width information for transmission data in accordance with a type of said register means to which a register indicated by register information belongs, said register information indicating one of said first and second register means;

external-access executing means for executing a data transfer between the register and an external memory in accordance with said register information and bit-width information; and immediate control means for outputting M-bit immediate data to said zero-extending means when a decoded instruction includes an instruction to store said M-bit immediate data in said first register means, and for outputting said M-bit immediate data to said sign-extending means when a decoded instruction includes an instruction to store said M-bit in said second register means, said zero-extended and sign-extended immediate data being sent to said first and second register means respectively in two methods, one being to send the same directly to their respective register means and the other being to send the same via said executing means, wherein said memory means stores a program of a size which is up to $2^N$ bytes.

46. The processor of claim 45, wherein said N is 24 and said M is 16.

47. A program converting unit for generating a machine language instruction from a source program, the machine language program being generated for a selected microprocessor in an embedded microprocessor series comprising a plurality of microprocessors, each of the plurality of microprocessors being able to process M-bit data and having a different address bit width N, said program converting unit comprising:

parameter holding means for holding a data width M and a selected pointer width N, N and M being integers greater than zero and N being greater than M, said data width M representing a bit-width of data used in the source program to be converted, said pointer width N representing an address bit-width to be used with the converted machine language program and being set by a user, depending on an estimated size of the object program after conversion, in order to identify the selected microprocessor in the embedded microprocessor series; and generating means for generating an instruction to manage said data width M when a variable operated by said instruction represents the data, and for generating an instruction to manage said pointer width N when a variable operated by said instruction represents the address.

48. A program converting unit for generating a machine language instruction from a source program, the machine language program being generated for a selected microprocessor in an embedded microprocessor series comprising a plurality of microprocessors, each of the plurality of microprocessors being able to process M-bit data and having a different address bit width N, said program converting unit comprising:

parameter holding means for holding a data width M and a selected pointer width N, N and M being integers greater than zero and N being greater than M, said data width M representing a bit-width of data used in the source program to be converted, said pointer width N representing an address bit-width to be used with the converted machine language program and being set by a user, depending on an estimated size of the object program after conversion, in order to identify the selected microprocessor in the embedded microprocessor series;

generating means for generating an instruction to manage said data width M when a variable operated by said instruction represents the data, and for generating an instruction to manage said pointer width N when a variable operated by said instruction represents the address;

option directing means for holding a user's direction for an overflow compensation, an overflow being possibly caused by an arithmetic operation;

compensate instruction generating means for generating a compensation instruction to compensate an overflow in accordance with a type of a variable used in the arithmetic operation, said compensation instruction being generated when an effective bit width of a variable designated by an operand is shorter than a register of N-bit wide and the arithmetic operation instruction will possibly cause an overflow exceeding said effective bit-width; and prohibition means for prohibiting a generation of a compensation instruction by the compensate instruction generating means when the option directing means is storing an indication denoting not to compensate.

49. A computer system comprising a processor and a program converting unit, wherein said processor is one out of a series of embedded-type processors, each processor in the series having a different address bit width N, N being longer than a data width M, the address bit width N of said processor being selected in accordance with a program size, said program converting unit generates a machine language instruction from a source program for a processor out of an embedded-type custom processor series which has an address width N in accordance with a necessary program size, and said processor comprises:

memory means for storing a program, the memory means having a minimum storage capacity of $2^N$ bytes to store the program and having N address lines, the program including an N-bit data arithmetic operation instruction and other instructions operating on both N-bit and M-bit data, N being greater than M; and a processor core having an address bus of N bits which is equal in size to the number of address lines of the memory means, the processor core being selected from a plurality of processor cores, wherein the processor core includes:

a program counter for holding an N-bit instruction address to output an instruction at the N-bit address to the memory means, the program counter having an N-bit address length which is equal in size to the number of address lines of the memory means;

fetching means for fetching an instruction from the memory means using an N-bit instruction address from said program counter; and executing means for executing all N-bit arithmetic operation instructions and for executing other instructions except for arithmetic operation instructions at one of N-bit length and M-bit length, the executing means having N-bit length, whereby an N-bit address is calculated by the N-bit arithmetic operation independently of a data bit-width, said data bit-width being M, and said program converting unit comprises:

parameter holding means for holding a data width M and a pointer width N, said data width M representing the number of bits of data used in the source program, said pointer width N representing the number of bits of an address, said N and M being input by a user in accordance with program size; and generating means for generating an instruction based on the source program to set the data width M as valid when a variable used in a machine language instruction to be generated is a variable showing data, and for generating an instruction to set the address width N as valid when a variable used in a machine language instruction to be generated is a variable representing an address, wherein the program converting unit generates a unique set of machine language instructions from the source program for each N specified by the user.

50. The computer system of claim 49, wherein the processor further comprises:

an address register group including a plurality of N-bit address registers;

a data register group including a plurality of N-bit data registers, wherein said executing means executes the N-bit and M-bit data operation instructions using the address registers, while executing the M-bit data operation instruction using data registers.

51. The computer system of claim 50, wherein:

said N is 24 and said M is 16; and said processor is installed in a 1-chip microcomputer, whereby said 1-chip microcomputer becomes suitable for running a program that utilizes a memory over 64 Kbytes for an operation with 16-bit data.

52. The computer system of claim 51, wherein the processor further comprises:

compensating means for extending an effective bit-width of the data in one of the address registers and the data register to 24 bits, wherein said compensating means operates in accordance with a compensate instruction entered after a machine language instruction designating an arithmetic operation that will possibly cause an overflow.

53. The computer system of claim 52, wherein said compensating means includes:

a first extending unit for filling a logical value of a sign bit in all bits higher than the effective bit-width in a register; and a second extending unit for filling a logical value "0" in all bits higher than the effective bit-width in a register.

54. The computer system of claim 50, wherein the processor further comprises:

compensating means for extending an effective bit-width of the data in one of the address registers and the data register to N bits, wherein said compensating means operates in accordance with a compensate instruction entered after a machine language instruction designating an arithmetic operation that will possibly cause an overflow.

55. The computer system of claim 54, wherein said compensating means includes:

a first extending unit for filling a logical value of a sign bit in all bits higher than the effective bit-width in a register; and a second extending unit for filling a logical value "0" in all bits higher than the effective bit-width in a register.

56. The computer system of claim 49, wherein the processor further comprises:

an address register group including a plurality of N-bit address registers; and a data register group including a plurality of M-bit data registers, wherein said executing means executes one of an N-bit data operation instruction and an M-bit data operation instruction using the address registers, while executing the M-bit data operation instruction using the data registers.

57. The computer system of claim 56, wherein:

said N is 24 and said M is 16; and said processor is installed in a 1-chip microcomputer, whereby said 1-chip microcomputer becomes suitable for running a program that utilizes a memory over 64 Kbytes for an operation with 16-bit data.

58. The computer system of claim 57, wherein the processor further comprises:

compensating means for extending an effective bit-width of the data in one of the address registers and the data register to 24 bits, wherein said compensating means operates in accordance with a compensate instruction entered after a machine language instruction designating an arithmetic operation that will possibly cause an overflow.

59. The computer system of claim 58, wherein said compensating means includes:

a first extending unit for filling a logical value of a sign bit in all bits higher than the effective bit-width in a register;

a second extending unit for filling a logical value "0" in all bits higher than the effective bit-width in a register.

60. The computer system of claim 49 wherein the pointer width N and the data width M are input by a user during an execution of the program converting unit.

61. A computer system comprising a central processing unit and a software program compiler, wherein the central processing unit is one of a series of processing units, each processing unit having a different address length N, N being longer than a data width M, the address length of the processing unit selected based on a size of a source program, the processing unit comprising:

memory means for storing a program, the memory means having a minimum storage capacity of $2^N$ bytes to store the program and having N address lines, the program including an N-bit data arithmetic operation instruction and other instructions operating on both N-bit and M-bit data, N being greater than M; and a processor core having an address bus of N bits which is equal in size to the number of address lines of the memory means, the processor core being selected from a plurality of processor cores, wherein the processor core includes:

a program counter for holding an N-bit instruction address to output an instruction at the N-bit address to the memory means, the program counter having an N-bit address length which is equal in size to the number of address lines of the memory means;

fetching means for fetching an instruction from the memory means using an N-bit instruction address from said program counter; and executing means for executing all N-bit arithmetic operation instructions and for executing other instructions except for arithmetic operation instructions at one of N-bit length and M-bit length, the executing means having N-bit length, compensating means for extending an effective bit-width of the data in one of the address registers and the data register to N bits, wherein the compensating means compensates as directed by a compensate instruction which is entered after a machine language arithmetic instruction which may cause an overflow;

whereby an N-bit address is calculated by the N-bit arithmetic operation independently of a data bit-width, said data bit-width being M, and the software compiler comprises:

parameter holding means for holding a data width M and a pointer width N, the data width M representing the number of bits of data used in the source program, the pointer width N representing the number of bits of an address, N and M being inputs to the compiler input by a user during an execution of the compiler, N and M selected by the user based on the size of the source program; and generating means for generating an instruction based on the source program to set the data width M as valid when a variable used in a machine language instruction to be generated is a variable showing data, and for generating an instruction to set the address width N as valid when a variable used in a machine language instruction to be generated is a variable representing an address, wherein the program converting unit generates a unique set of machine language instructions from the source program for each N specified by the user.

* * * * *